(12) United States Patent
Arai et al.

(10) Patent No.: US 7,304,920 B2
(45) Date of Patent: Dec. 4, 2007

(54) OPTICAL HEAD THAT DETECTS TILT IN AN OPTICAL DISK

(75) Inventors: Akihiro Arai, Kyoto (JP); Takao Hayashi, Toyonaka (JP); Toru Nakamura, Katano (JP); Takayuki Nagata, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 620 days.

(21) Appl. No.: 10/312,471

(22) PCT Filed: Jun. 22, 2001

(86) PCT No.: PCT/JP01/05366

§ 371 (c)(1),
(2), (4) Date: Sep. 3, 2003

(87) PCT Pub. No.: WO02/01554

PCT Pub. Date: Jan. 3, 2002

(65) Prior Publication Data

US 2004/0062158 A1 Apr. 1, 2004

(30) Foreign Application Priority Data

Jun. 26, 2000 (JP) ............................. 2000-190893
Jul. 14, 2000 (JP) ............................. 2000-214050

(51) Int. Cl.
*G11B 7/00* (2006.01)
(52) U.S. Cl. .................................. 369/44.32; 369/53.19
(58) Field of Classification Search .................... None
See application file for complete search history.

(56) References Cited

U.S. PATENT DOCUMENTS 4,663,751 A   5/1987   Kaku et al.

(Continued)

FOREIGN PATENT DOCUMENTS

CN       1240986 A      1/2000

(Continued)

OTHER PUBLICATIONS

Optical Disk Technologies, Feb. 10, 1989, pp. 93-96, Radio Technology, Inc. (with partial translation).

(Continued)

*Primary Examiner*—Wayne Young
*Assistant Examiner*—Lixi Chow
(74) *Attorney, Agent, or Firm*—RatnerPrestia

(57) ABSTRACT

An optical head that detects a tilt in an optical disk. The optical head includes a condensing means, a light receiving means, a tracking error signal detection means, and an optical tilt detecting means. The light receiving means includes at least first and second light receiving areas, the first light receiving area being a rectangle having long sides that extend in a direction perpendicular to information tracks on the optical disk. The tracking error signal detection means detect error signals corresponding to light signals received in the first and second light receiving areas. The optical disk tilt detection means compare the tracking error signals to detect a radial tilt in the optical disk. In an alternative embodiment, the long sides of first light receiving area extend in a direction parallel to the information tracks, and the optical disk tilt detecting means detect a tangential tilt in the optical disk.

7 Claims, 30 Drawing Sheets

U.S. PATENT DOCUMENTS

| | | | |
|---|---|---|---|
| 4,707,816 A | 11/1987 | Yonezawa et al. | |
| 4,748,609 A | 5/1988 | Yonezawa et al. | |
| 4,855,991 A | 8/1989 | Kaku et al. | |
| 5,523,989 A | 6/1996 | Ishibashi | |
| 5,828,634 A | 10/1998 | Ohno et al. | |
| 5,978,332 A | 11/1999 | Itakura et al. | |
| 6,157,600 A | 12/2000 | Nakamura et al. | |
| 6,507,009 B1 | 1/2003 | Ohnishi et al. | |
| 6,507,544 B1 * | 1/2003 | Ma et al. | 369/44.41 |
| 6,721,242 B2 | 4/2004 | Ohnishi et al. | |

FOREIGN PATENT DOCUMENTS

| | | |
|---|---|---|
| DE | 43 35 175 | 4/1995 |
| EP | 0 336 328 | 10/1989 |
| EP | 0 936 603 | 8/1999 |
| EP | 0 882 292 | 4/2001 |
| JP | 59-19250 | 1/1984 |
| JP | 61-158044 | 4/1986 |
| JP | 62-134830 | 6/1987 |
| JP | 4-47533 | 2/1992 |
| JP | 04-205726 | 7/1992 |
| JP | 6-318330 | 11/1994 |
| JP | 07-141673 | 6/1995 |
| JP | 8-306057 | 11/1996 |
| JP | 10-302319 | 11/1998 |
| JP | 11-513835 | 11/1999 |
| JP | 2000-003525 | 1/2000 |
| JP | 2000-242949 | 9/2000 |
| WO | WO 97/15923 | 5/1997 |

OTHER PUBLICATIONS

Chinese Office Action for corresponding Application No. 01814621, dated Sep. 24, 2004, with English translation.

Supplementary Partial European Search Report for Corresponding EU Application No. EP 01 94 1185 dated Mar. 16, 2007.

* cited by examiner (Tp: Information track pitch)

Information track direction (Tp: Information track pitch)

Information track direction

No optical disk tilt

Tilt in positive direction

Tilt in negative direction

US 7,304,920 B2

OPTICAL HEAD THAT DETECTS TILT IN AN OPTICAL DISK

This application is a U.S. national phase application of PCT international application PCT/JP01/05366.

TECHNICAL FIELD

The present invention relates to tracking control apparatus and method for an optical head that optically records and reproduces information on and from an information recording medium such as an optical disk.

The present invention relates to optical disk tilt detection that detects a tilt in the optical disk relative to an optical axis of condensing means such as an objective lens.

BACKGROUND ART

For optical heads for optical disks, it is important to ensure the accuracy of tracking control for allowing an optical spot to accurately follow the center of an information track. If this control is inaccurate, then during recording, a signal on an adjacent information track may be erased or cross talk may increase. Consequently, critical malfunction may occur, such as a failure to accurately reproduce information.

A three-beam tracking method has been commonly known as a tracking error signal detecting method. An optical head based on this method forms not only a main beam used for recording on or reproduction from information tracks but also two other subbeams. Accordingly, the optical head separately receives reflected beams from respective optical spots condensed on an optical disk.

FIG. 38 is a diagram illustrating optical spots on an optical disk formed by an optical head based on the three-beam tracking method. Reference numerals 100 and 102 denote optical spots of two subbeams. Reference numeral 101 denotes an optical spot of a main beam. Reference numeral 103 denotes information tracks. The optical spots 100 and 102 of the subbeams are each formed at an equal distance, e.g. a ¼ track pitch from the optical spot 101 of the main beam in a direction perpendicular to the information tracks 103.

A reflected beam from each optical spot has its intensity modulated by the information tracks. Detected signals of the two subbeams have phases shifted from that of a signal of the main signal by the ¼ track pitch in the opposite directions. The optical head based on the three-beam tracking method is constituted to detect a tracking error signal from a difference between the signals of these two subbeams.

Further, as shown in the document "Optical Disk Technologies" (Radio Technology Inc.; issued on Feb. 10, 1989; pp. 93 to 96), tracking error signal detecting methods called a "composite continuous tracking method", a "composite wobbled tracking method", and a "sample servo tracking method" are also known.

With these methods, an optical disk has zigzag marks formed on information tracks using pits or the like or a mirror surface portion formed thereon. With the first and second conventional methods, an offset that may occur in a tracking error signal based on what is called a push-pull method is corrected by using a signal detected in the zigzag marks or mirror surface portion. With the third conventional method, a tracking error signal is detected by using the zigzag marks. The entire disclosure of the document "Optical Disk Technologies" (Radio Technology Inc.; issued on Feb. 10, 1989) is incorporated herein by reference in its entirety.

First, the first conventional method, the composite continuous tracking method will be described in detail with reference to drawings. FIG. 39 is a diagram illustrating the arrangement of a mirror surface portion formed on information tracks on an optical disk. Reference numeral 104 denotes information areas in which are formed pits and guide grooves having addresses, information, or the like recorded therein. Reference numeral 105 denotes a mirror surface portion formed between a series of information areas. Reference numeral 106 denotes a centerline of each information track.

For such an optical disk, an optical head uses an objective lens to condense light to form an optical spot, and receives a reflected beam from the optical spot, the beam being received so as to be divided into two parts along a parting line parallel with the information tracks. Then, the optical head detects a tracking error signal from a difference between the detected received light signals. Since the tracking error signal is based on the push-pull method, a deviation in the optical axis of the objective lens or the like may cause an offset in the tracking error signal. However, this offset has an amount corresponding to a value for the tracking error signal measured when the optical spot passes over the mirror surface portion. The optical head detects the tracking error signal when the optical spot passes over the guide groove, and detects the offset when the optical spot passes over the mirror surface portion. The optical head thus corrects the offset in the tracking error signal.

Now, the second and third conventional methods will be described in further detail with reference to drawings. FIG. 40 is a diagram illustrating the arrangement of zigzag marks. Reference numeral 107 denotes a first pit, and reference numeral 108 denotes a second pit. This pair constitutes the zigzag marks. These marks are arranged at predetermined distances from the tangential direction of the information track and, in a direction perpendicular to the information track, at an equal distance from the center of the information track in the opposite directions. Reference numeral 109 denotes an information area in which an address, information, or the like is recorded. Reference numeral 110 denotes a centerline of the information track. An arrow 111 indicates a scanning path 1 of the optical spot. An arrow 112 indicates a scanning path 2 of the optical spot.

FIG. 41 is a diagram illustrating signal waveforms indicative of the quantity of reflected light detected when the optical spot passes over the zigzag marks. Reference numeral 113, 114, and 115 denote signal waveforms obtained on the scanning path 1, the scanning path 2, and a scanning path extending along the centerline of the information track, respectively. Points on the axis of abscissas, denoted by positions A and B, represent the positions of the first and second pits, respectively. Symbols VA and VB in the drawing indicate values for signals sampled and held at these positions.

These signal values are determined by the relative positions of the optical spot and zigzag marks and are not substantially affected by a deviation in the optical axis of the objective lens. The optical head based on the second conventional method detects a tracking error signal on the basis of the push-pull method, compares a difference between the signals VA and VB with the tracking error signal to detect an offset in the tracking error signal, and then corrects the offset. Further, the optical head based on the third conventional method detects a tracking error signal on the basis of a difference between the signals VA and VB.

Next, description will be given of an optical head having optical disk tilt detecting means according to the prior art. When the optical head records or reproduces information on or from the optical disk, the optical axis of the objective lens is desirably at 90° to a surface of the optical disk. If the optical disk is tilted, aberration such as coma aberration may occur to degrade an optical spot condensed on the optical disk. A tilt in the optical disk has been commonly detected by an exclusive optical disk tilt detector provided in the optical head. However, the reduced size of the optical head makes it difficult to obtain a space in which the exclusive detector can be provided. Thus, a configuration has been proposed which incorporates the optical disk tilt detecting means in an optical system of the optical head.

By way of example, the conventional technique disclosed in Japanese Patent Laid-Open Publication No. 7-141673 will be described. The entire disclosure of Japanese Patent Laid-Open Publication No. 7-141673 is incorporated herein by reference in its entirety.

FIG. 42 is a diagram showing a configuration of an optical disk tilt detecting means according to the prior art. Reference numerals 1101, 1102, 1103, and 1104 denote an optical disk, an objective lens, a light receiving lens, and an element that branches light, respectively. Reference numerals 1104a and 1104b denote micro prisms. Reference numerals 1105a, 1105b, 1106a, and 1106b denote light receiving elements. Reference numerals 1107 and 1108 denote addition amplifiers. Reference numeral 1109 denotes a differential amplifier.

The optical disk tilt detecting means constructed as described above operates as follows: A beam reflected by the optical disk 1101 passes through the objective lens 1102 and light receiving lens 1103 and then impinges on the element 1104 branching light. Those parts of the beam impinging on the element 1104 which are incident on two very small areas in which the micro prisms 1104a and 1104b are formed are polarized toward and received by the light receiving elements 1106a and 1106b, respectively. A beam impinging the areas other than the above described two very small areas is transmitted through the element and impinges on the light receiving elements 1105a and 1105b. That is, the beam is divided into two parts, which are then received by the respective elements. Signals detected by the respective light receiving elements are calculated by the addition amplifiers 1107 and 1108 and differential amplifier 1109, thereby detecting a tilt Trad in the optical disk.

The signal detected by each light receiving element is substituted with the name of the light receiving element, the tilt Trad in the optical disk is detected using a calculation expressed by:

$$Trad=1105a-1105b-(1106a-1106b) \quad \text{(Equation 1)}$$

FIG. 43 is a diagram illustrating the element 1104 branching light. A circle 1110 inside a rectangle indicating the element 1104 represents the shape of an incident beam. The micro prisms 1104a and 1104b are very small areas arranged laterally (in a direction perpendicular to the information tracks) symmetrically with respect to the center of the beam as shown in the drawing. Further, the dotted lines in the drawing show how the beam is guided to the light receiving elements 1105a, 1105b, 1106a, and 1106b. The beam incident on the light receiving elements 1105a and 1105b is divided into two parts at the boundary line between the elements in a direction parallel with the information tracks. Accordingly, detection of the optical disk tilt Trad based on Equation 1 corresponds to comparison of the magnitude of push-pull signals detected in the two very small areas with the magnitude of push-pull signals detected in areas other than the above very small areas.

FIGS. 44(a) to 44(c) are diagrams illustrating the distribution of light intensity of a beam incident on the element 1104 branching light. FIG. 44(a) indicates the case in which the optical disk is not tilted. FIGS. 44(b) and 44(c) indicate the case in which the optical disk is tilted in its radial direction (tilted so that a plane containing a normal of the optical disk and the optical axis of the objective lens is perpendicular to a tangent of the information tracks). For the direction of a tilt, FIG. 44(b) shows a positive direction, whereas FIG. 44(c) shows a negative direction. The shaded parts in FIG. 44(a) indicate the areas in which a positive and negative first-order diffracted beams, diffracted by the information tracks of the optical disk, are superimposed on a zero-order diffracted beam. In these areas, when the wavefront phases of the zero- and first-order diffracted beams change, interference may occur to change light intensity.

Further, the shape of the laterally asymmetric shaded parts shown in FIGS. 44(b) and 44(c) indicates the asymmetry of the distribution of light intensity. This indicates that a change in wavefront phase caused by coma aberration resulting from a tilt in the optical disk is laterally asymmetric with respect to the direction of the information tracks, so that the interference between the zero-order diffracted beam and the positive and negative first-order diffracted beams changes light intensity. Consequently, a darker and lighter parts appear in the asymmetric distribution of light intensity depending on the direction of a tilt in the optical disk.

The prior art pays attention to the lateral asymmetry of light intensity distribution, which depends on a tilt in the disk. Then, the optical disk tilt Trad is detected by comparing the magnitude of push-pull signals (1106a-1106b) detected by extracting light from the two very small areas, in which the asymmetry is most pronounced, with the magnitude of push-pull signals (1105a-1105b) detected in light from the other areas.

As described above, the conventional tracking error signal detecting methods are classified into two groups. One of the groups detects a tracking error signal by utilizing the fact that the quantity of light reflected from an optical spot varies with the relative positions of the optical spot and information tracks or marks formed on the optical disk (three-beam tracking method and sample servo tracking method). The other group uses the push-pull method to detect a tracking error signal, while detecting an offset in the tracking error signal to correct the signal itself (composite continuous tracking method and composite wobbled tracking method). These two types of detecting methods all have the advantage of reducing a possible offset in the tracking error signal, caused by a deviation in the optical axis of the objective lens.

However, when the optical disk is tilted from the optical head in its radial direction, coma aberration occurs to change the relative positions of the optical spot and information tracks, thereby changing the quantity of light reflected from the optical spot or the push-pull signal to cause a phase shift. As a result, a similar phase shift occurs in the tracking error signal. Therefore, with the above conventional tracking error detecting methods, if the optical disk is tilted, tracking control may disadvantageously be provided at a position separate from the center of the information track.

Further, the conventional techniques discussed in the latter half of the above description divide a beam into two parts along a parting line extending parallel with the information tracks to detect push-pull signals and thus a tilt in the optical disk. Thus, disadvantageously, a tilt in the optical disk cannot be accurately detected if the optical disk has information tracks in which push-pull signals cannot be properly detected, for example, information tracks having a groove depth equal to a ¼ wavelength.

Further, the above very small area is smaller than the area in which a zero-order diffracted beam and a positive and negative first-order diffracted beams diffracted by the optical disk are superimposed on one another. Thus, when the objective lens is moved in a direction perpendicular to the information tracks, the position of a detected beam is also moved. Consequently, light having that part of a light intensity distribution which does not accurately reflect a tilt in the optical disk is incident on the very small area. As a result, a tilt in the optical disk is less accurately detected.

DISCLOSURE OF THE INVENTION

In view of the conventional problems described above, it is an object of the present invention to provide an optical head having tracking error signal detecting means of being capable of providing accurate tracking control so as to track the center of an information track even if an optical disk is tilted from an optical head.

It is another object of the present invention to provide an optical head having optical disk tilt detecting means of performing an operation originally performed on an optical disk by an optical head, e.g. an operation of detecting a tilt in the optical disk using a signal detecting method such as tracking error signal detection, to improve and stabilize detection accuracy, the optical disk tilt detecting means minimizing the adverse effects of movement of an objective lens.

To achieve the above object, of the present invention is an optical head that records information on an optical disk and/or reproduces information recorded thereon, comprising:

condensing means of generating an optical spot by condensing, on said optical disk, a main beam that records or reproduces said information and two subbeams as a tracking error signal detecting beam which detect positional deviation of said main beam from an information track in said optical disk;

light receiving means of receiving a reflected beam reflected by said optical disk;

tracking error signal detecting means of detecting a tracking error signal on the basis of a difference between the received light signals of said two subbeams; and attenuating means of attenuating the quantity of light in a predetermined area of each of the reflected beams of said two subbeams incident on said light receiving means, wherein said predetermined area of said attenuating means is an almost rectangle having long sides equivalent to or longer than the diameter of a beam passing through said attenuating means and short sides shorter than the diameter of the beam passing through said attenuating means, the long sides extending in a direction perpendicular to the information tracks, the predetermined area being arranged in a central portion of the beam passing through said attenuating means, thereby reducing a phase shift in said tracking error signal relative to said information track position which shift is caused by a tilt in said optical disk.

Another aspect of the present invention is an optical head that records information on an optical disk and/or reproduces information recorded thereon, the optical disk having information tracks on which information is recorded and at least a pair of marks arranged at predetermined distances in a tangertial direction of said information tracks and at the same distance in opposite directions perpendicular to said information tracks, comprising:

condensing means of condensing light on said optical disk to generate an optical spot;

light receiving means of receiving a reflected beam reflected by said optical disk;

tracking error signal detecting means of detecting a difference in quantity of light reflected from said pair of marks on the basis of signals detected by said light receiving means, to detect positional deviation of said optical spot from said information track; and attenuating means of attenuating the quantity of light in a predetermined area of each of said reflected beams incident on said light receiving means, wherein said predetermined area of said attenuating means is an almost rectangle having long sides equivalent to or longer than the diameter of a beam passing through said attenuating means and short sides shorter than the diameter of the beam passing through said attenuating means, the long sides extending in a direction perpendicular to the information tracks, the predetermined area being arranged in a central portion of the beam passing through said attenuating means, thereby reducing a phase shift in said tracking error signal relative to said information track position which shift is caused by a tilt in said optical disk.

Still another aspect of the present invention is an optical head that records information on an optical disk and/or reproduces information recorded thereon, the optical disk having information tracks in which information is recorded and at least a pair of marks formed between pieces of a guide groove of each of said information tracks into which said guide groove is intermittently partially divided, the marks being arranged at predetermined distances in a tangential direction of said information tracks and at the same distance in opposite directions perpendicular to said information tracks, comprising:

condensing means of condensing light on said optical disk to generate an optical spot;

light receiving means of receiving a reflected beam reflected by said optical disk, the light receiving means having two light receiving areas into which the light receiving means is divided along a parting line parallel with said information tracks;

tracking error signal detecting means of detecting positional deviation of said optical spot from said information track on the basis of a difference between signals detected in said two light receiving areas when said optical spot passes over said guide groove and when said optical spot passes over said pair of marks; and attenuating means of attenuating the quantity of light in a predetermined area of each of said reflected beams incident on said light receiving means, wherein said predetermined area of said attenuating means is an almost rectangle having long sides equivalent to or longer than the diameter of a beam passing through said attenuating means and short sides shorter than the diameter of the beam passing through said attenuating means, the long sides extending in a direction perpendicular to the information tracks, the predetermined area being arranged in a central portion of the beam passing through said attenuating means, thereby reducing a phase shift in said tracking error signal relative to said information track position which shift is caused by a tilt in said optical disk.

Yet still another aspect of the present invention is an optical head that records information on an optical disk and/or reproduces information recorded thereon, the optical disk having information tracks on which information is recorded and a mirror surface portion formed by intermittently partially cutting a guide groove of each of said information tracks, comprising:

condensing means of condensing light on said optical disk to generate an optical spot;

light receiving means of receiving a reflected beam reflected by said optical disk, the light receiving means having two light receiving areas divided along a parting line parallel with said information tracks;

tracking error signal detecting means of detecting positional deviation of said optical spot from said information track on the basis of a difference between signals detected in said two light receiving areas when said optical spot passes over said guide groove and when said optical spot passes over said mirror surface portion; and attenuating means of attenuating the quantity of light in a predetermined area of each of said reflected beams incident on said light receiving means, wherein said predetermined area of said attenuating means is an almost rectangle having long sides equivalent to or longer than the diameter of a beam passing through said attenuating means and short sides shorter than the diameter of the beam passing through said attenuating means, the long sides extending in a direction perpendicular to the information tracks, the predetermined area being arranged in a central portion of the beam passing through said attenuating means, thereby reducing a phase shift in said tracking error signal relative to said information track position which shift is caused by a tilt in said optical disk.

Still yet another aspect of the present invention is an optical head that records information on an optical disk and/or reproduces information recorded thereon, comprising:

condensing means of generating an optical spot by condensing, on said optical disk, a main beam that records or reproduces said information and two subbeams as a tracking error signal detecting beam which detect positional deviation of said main beam from an information track in said optical disk;

light receiving means of receiving each reflected beam reflected by said optical disk; and tracking error signal detecting means of detecting a tracking error signal on the basis of a difference between the received light signals of said two subbeams, wherein said light receiving means has a plurality of light receiving areas that receive each of the reflected beams of said two subbeams so that a central portion of the beam is separated from peripheral portions thereof, a light receiving area receiving the central portion of said beam is an almost rectangle having long sides equivalent to or longer than the diameter of a beam incident on said light receiving means and short sides shorter than the diameter of the beam incident on said light receiving means, the long sides extending in a direction perpendicular to the information tracks, and said tracking error signal detecting means attenuates a gain of a signal from said light receiving area, which has received the central portion of said beam, to detect said tracking error signal, thereby reducing a phase shift in said tracking error signal relative to said information track position which shift is caused by a tilt in said optical disk.

A further aspect of the present invention is an optical head that records information on an optical disk and/or reproduces information recorded thereon, the optical disk having information tracks in which information is recorded and at least a pair of marks arranged at predetermined distances in a tangential direction of said information tracks and at the same distance in opposite directions perpendicular to said information tracks, comprising:

condensing means of condensing light on said optical disk to generate an optical spot;

light receiving means of receiving a reflected beam reflected by said optical disk; and tracking error signal detecting means of detecting a difference in quantity of light reflected from said pair of marks on the basis of signals received by said light receiving means, to detect positional deviation of said optical spot from said information track, wherein said light receiving means has a plurality of light receiving areas that receive said reflected beam so that a central portion of the beam is separated from peripheral portions thereof, a light receiving area receiving the central portion of said beam is an almost rectangle having long sides equivalent to or longer than the diameter of a beam incident on said light receiving means and short sides shorter than the diameter of the beam incident on said light receiving means, the long sides extending in a direction perpendicular to the information tracks, and said tracking error signal detecting means attenuates a gain of a signal from said light receiving area, which has received the central portion of said beam, to detect said tracking error signal, thereby reducing a phase shift in said tracking error signal relative to said information track position which shift is caused by a tilt in said optical disk.

A still further aspect of the present invention is an optical head that records information on an optical disk and/or reproduces information recorded thereon, the optical disk having information tracks in which information is recorded and at least a pair of marks formed between pieces of said guide groove of each of said information tracks into which said guide groove is intermittently partially divided, the marks being arranged at predetermined distances in a tangential direction of said information tracks and at the same distance in opposite directions perpendicular to said information tracks, comprising:

condensing means of condensing light on said optical disk to generate an optical spot;

light receiving means of receiving a reflected beam reflected by said optical disk, the light receiving means having two light receiving areas divided using a parting line parallel with said information tracks; and tracking error signal detecting means of detecting positional deviation of said optical spot from said information track on the basis of a difference between signals detected in said two light receiving areas when said optical spot passes over said guide groove and when said optical spot passes over said pair of marks, wherein said light receiving means further has a plurality of light receiving areas that receive said reflected beam so that a central portion of the beam is separated from a peripheral portion thereof, a light receiving area receiving the central portion of said beam is an almost rectangle having long sides equivalent to or longer than the diameter of a beam incident on said light receiving means and short sides shorter than the diameter of the beam incident on said light receiving means, the long sides extending in a direction perpendicular to the information tracks, and said tracking error signal detecting means attenuates a gain of a signal from said light receiving area, which has received the central portion of said beam, to detect said tracking error signal, thereby reducing a phase shift in said tracking error signal relative to said information track position which shift is caused by a tilt in said optical disk.

A yet further aspect of the present invention is an optical head that records information on an optical disk and/or reproduces information recorded thereon, the optical disk having information tracks in which information is recorded and a mirror surface portion formed by intermittently partially cutting a guide groove of each of said information tracks, comprising:

condensing means of condensing light on said optical disk to generate an optical spot;

light receiving means of receiving a reflected beam reflected by said optical disk, the light receiving means having two light receiving areas divided along a parting line parallel with said information tracks; and tracking error signal detecting means of detecting positional deviation of said optical spot from said information track on the basis of a difference between signals detected in said two light receiving areas when said optical spot passes over said guide groove and when said optical spot passes over said mirror surface portion, wherein said light receiving means further has a plurality of light receiving areas that receive said reflected beam so that a central portion of the beam is separated from a peripheral portion thereof, a light receiving area receiving the central portion of said beam is an almost rectangle having long sides equivalent to or longer than the diameter of a beam incident on said light receiving means and short sides shorter than the diameter of the beam incident on said light receiving means, the long sides extending in a direction perpendicular to the information tracks, and said tracking error signal detecting means attenuates a gain of a signal from said light receiving area, which has received the central portion of said beam, to detect said tracking error signal, thereby reducing a phase shift in said tracking error signal relative to said information track position which shift is caused by a tilt in said optical disk.

A still yet further aspect of the present invention is an optical head that records information on an optical disk and/or reproduces information recorded thereon, comprising:

condensing means of condensing light on said optical disk to generate an optical spot;

light receiving means of receiving a beam reflected by said optical disk;

tracking error signal detecting means of detecting positional deviation of said optical spot from said information track on the basis of a signal detected by said light receiving means; and optical disk tilt detecting means of detecting a tilt in said optical disk relative to an optical axis of said condensing means on the basis of said tracking error signals, wherein said light receiving means has a plurality of light receiving areas that separate light upon reception so that a first sub-light-receiving-area receives a central area of said reflected beam, while a second sub-light-receiving-area receives a peripheral area of said reflected beam, said first sub-light-receiving-area is an almost rectangle having long sides equivalent to or longer than the diameter of a beam incident on said light receiving means and short sides shorter than the diameter of the beam incident on said light receiving means, the long sides extending in a direction perpendicular to the information tracks, said tracking error signal detecting means detects a first sub-tracking-error-signal in a received light signal obtained from said first sub-light-receiving-area and a second sub-tracking-error-signal in a received light signal obtained from said second sub-light-receiving-area, and said optical disk tilt detecting means compares said first sub-tracking-error-signal with said second sub-tracking-error-signal to detect a phase difference in signal waveform which may occur when said optical spot crosses said information track, thereby detecting a tilt in the optical disk.

An additional aspect of the present invention is the optical head, wherein said condensing means condenses a main beam that records and/or reproduces information and at least two subbeams used to detect said tracking error signal, said light receiving means has a part that receives said main beam and a part that receives said at least two subbeams, and said tracking error signal detecting means detects said first and second sub-tracking-error-signals on the basis of a difference between said received light signals from said at least two subbeams.

A still additional aspect of the present invention is the optical head, wherein said optical disk comprises:

said tracking error signal detecting means detects said first and second sub-tracking-error-signals on the basis of a difference between said received light signal obtained from the reflected beam from one of said pair of marks and said received light signal obtained from the reflected beam from the other of said pair of marks.

A yet additional aspect of the present invention is the optical head, wherein said light receiving means is divided into two parts by at least an axis parallel with extensions of tracks in said optical disk, and said tracking error signal detecting means detects said first and second sub-tracking-error-signals on the basis of a difference between a first sub-received-light signal obtained from said tracking error signal detecting beam received by one of the two pieces into which said light receiving means is divided and a second sub-received-light signal obtained from said tracking error signal detecting beam received by the other of the two pieces into which said light receiving means is divided.

A still yet additional aspect of the present invention is the optical head, wherein said optical disk comprises:

information tracks having guide grooves and on which information is recorded; and at least a pair of marks formed between pieces of said guide groove of each of said information tracks into which said guide groove is intermittently partially divided, the marks being arranged at predetermined distances in a tangential direction of said information tracks and at the same distance in opposite directions perpendicular to said information tracks; and said tracking error signal detecting means detects said first and second sub-tracking-error-signals on the basis of a difference between said first sub-received-light signal obtained from one reflected beam from one of said pair of marks and said second sub-received-light signal obtained from another reflected beam from the other of said pair of marks, and an offset in said tracking error signal is detected using said first sub-received-light signal, said second sub-received-light signal, said first sub-tracking-error-signal, and said second sub-tracking-error-signal.

A supplementary aspect of the present invention is the optical head, wherein said optical disk comprises:

information tracks having guide grooves and in which information is recorded; and a mirror surface portion formed by intermittently partially cutting said guide grooves of said information track; and said tracking error signal detecting means detects said first and second sub-tracking-error-signals on the basis of a difference between said first sub-received-light signal obtained from the reflected beam from a reflected beam from a part of said information track and said second sub-received-light signal obtained from the reflected beam from the remaining part of said information track, and an offset in said tracking error signal is detected on the basis of a difference between said first sub-received-light signal obtained from the reflected beam from the part of said mirror surface portion and said second sub-received-light signal obtained from the reflected beam from the remaining part of said mirror surface portion.

A still supplementary aspect of the present invention is the optical head, further comprising tracking control means of carrying out tracking control using said second tracking error signal or a signal obtained by adding said first and second tracking error signals together, wherein said optical disk tilt detecting means compares the phases of said first and second tracking error signals with each other by measuring said first tracking error signal value while said tracking control means is performing a tracking control operation.

A yet supplementary aspect of the present invention is the optical head, further comprising:

tracking control signal generating means of generating a tracking control signal; and tracking control means of carrying out tracking control using said tracking control signal, wherein said tracking control signal generating means adjusts the amplitude of said first tracking error signal to a predetermined magnitude, and adds or subtracts the adjusted first tracking error signal to or from said second tracking error signal to shift a phase thereof in order to generate a tracking control signal, and said tracking control means moves a tracking control position so that a beam formed by said condensing means is located in a center of said information track.

A still yet supplementary aspect of the present invention is the optical head, wherein said tracking control signal generating means adjusts the amplitude of said first tracking error signal according to a signal corresponding to a detected tilt in the optical disk, and said tracking control means moves the tracking control position depending on said tilt.

Another aspect of the present invention is an optical head that records information on an optical disk having pits formed in all or some information tracks therein and/or reproduces information written therein, comprising:

condensing means of condensing light on said optical disk;

light receiving means of receiving a beam reflected by said optical disk to obtain a received light signal; and optical disk tilt detecting means of detecting a tilt in said optical disk relative to an optical axis of said condensing means on the basis of said received light signal, wherein said light receiving means has a light receiving element divided into a first sub-light-receiving-area that receives a central area of said reflected beam and a second sub-light-receiving-area that receives the remaining area of said reflected beam, said first sub-light-receiving-area is an almost rectangle having long sides equivalent to or longer than the diameter of a beam incident on said light receiving means and short sides shorter than the diameter of the beam incident on said light receiving means, the long sides extending in a direction parallel to the information tracks, and said optical disk tilt detecting means compares the received light signal obtained from said first sub-light-receiving-area with the received light signal obtained from said second sub-light-receiving-area to detect a phase difference between signal waveforms modulated when an optical spot passes over said pits, thereby detecting a tilt in the optical disk.

Still another aspect of the present invention is an optical disk recording apparatus comprising an optical head.

Yet still another aspect of the present invention is an optical disk reproducing apparatus comprising an optical head.

Still yet another aspect of the present invention is an optical disk recording and reproducing apparatus comprising an optical head.

A further aspect of the present invention is the optical head, wherein said light receiving means is divided into two parts by at least an axis parallel with extensions of tracks in said optical disk, and said tracking error signal detecting means detects said first and second sub-tracking-error-signal on the basis of a difference between a first sub-received-light signal obtained from one of the two pieces into which said light receiving means is divided and a second sub-received-light signal obtained from the other of the two pieces into which said light receiving means is divided.

A still further aspect of the present invention is the optical head, wherein said optical disk comprises:

information tracks having guide grooves and in which information is recorded; and at least a pair of marks formed between pieces of said guide groove of each of said information tracks into which said guide groove is intermittently partially divided, the marks being arranged at predetermined distances in a tangential direction of said information tracks and at the same distance in opposite directions perpendicular to said information tracks; and said tracking error signal detecting means detects said first and second sub-tracking-signals on the basis of a difference between said first sub-received-light signal obtained from one reflected beam from one of said pair of marks and said second sub-received-light signal obtained from another reflected beam from the other of said pair of marks, and an offset in said tracking error signal is detected using said first sub-received-light signal, said second sub-received-light signal, said first sub-tracking-error-signal, and said second sub-tracking-error-signal.

A yet further aspect of the present invention is the optical head, wherein said optical disk comprises:

information tracks having guide grooves and in which information is recorded; and a mirror surface portion formed by intermittently partially cutting said guide grooves of said information track; and said tracking error signal detection means detects said first and second sub-tracking-error-signals on the basis of a difference between said first sub-received-light signal obtained from the reflected beam from a part of said information track and said second sub-received-light signal obtained from the reflected beam from the remaining part of said information track, and an offset in said tracking error signal is detected on the basis of a difference between said first sub-received-light signal obtained from the reflected beam from the part of said mirror surface portion and said second sub-received-light signal obtained from the reflected beam from the remaining part of said mirror surface portion.

A still yet further aspect of the present invention is the optical head, further comprising tracking control means of carrying out tracking control using said second tracking error signal or a signal obtained by adding said first and second tracking error signals together, wherein said optical disk tilt detecting means compares the phases of said first and second tracking error signals with each other by measuring said first tracking error signal value while said tracking control means is performing a tracking control operation.

An additional aspect of the present invention is the optical head, further comprising:

tracking control signal generation means of generating a tracking control signal; and tracking control means of carrying out tracking control using said tracking control signal, wherein said tracking control signal generating means adjusts the amplitude of said first tracking error signal to a predetermined magnitude, and adds or subtracts the adjusted first tracking error signal to or from said second tracking error signal to shift a phase thereof in order to generate a tracking control signal, and said tracking control means moves a tracking control position so that a beam formed by said condensing means is located in a center of said information track.

A still additional aspect of the present invention is the optical head, wherein said tracking control signal generating means adjusts the amplitude of said first tracking error signal according to a signal corresponding to a detected tilt in the optical disk, and said tracking control means moves the tracking control position depending on said tilt.

A yet additional aspect of the present invention is an optical head that records information on an optical disk having pits formed in all or some information tracks therein and/or reproduces information written in said optical disk, comprising:

condensing means of condensing light on said optical disk;

light receiving means of receiving a reflected beam from said optical disk to obtain a received light signal; and optical disk tilt detecting means of detecting a tilt in said optical disk relative to an optical axis of said condensing means on the basis of said received light signal, wherein said light receiving means has a light receiving element divided into a first sub-light-receiving-area that receives a central area of said reflected beam and a second sub-light-receiving-area that receives the remaining area of said reflected beam, said first sub-light-receiving-area is an almost rectangle containing a central point of said reflected beam and having long sides in a direction parallel with information tracks in said optical disk, and said optical disk tilt detecting means detects a tilt in said optical disk by comparing a received light signal obtained from said first sub-light-receiving-area with a received light signal obtained from said second sub-light-receiving-area to detect a phase difference between signal waveforms modulated when an optical spot passes over said pits.

A still yet additional aspect of the present invention is an optical disk recording apparatus comprising an optical head.

A supplementary aspect of the present invention is an optical disk reproducing apparatus comprising an optical head.

One aspect of the present invention is an optical disk recording and reproducing apparatus comprising an optical head.

By way of one example, the optical head of the present invention described above comprises light receiving means of receiving reflected beams from an optical disk by using an objective lens to condense light on the optical disk, tracking error signal detecting means of detecting a tracking error signal in a received light signal detected by the light receiving means, and optical means of branching light of a partial area of that part of the beam incident on the light receiving means which is used for tracking detection, or reducing light intensity of this light.

Further, by way of example, the optical head of the present invention comprises light receiving means of receiving reflected beams from an optical disk by using an objective lens to condense, on the optical disk, a main beam used to record and reproduce information and two subbeams generated by branching the main beam, tracking error signal detecting means of detecting a tracking error signal on the basis of a difference between received light signals from the two subbeams, and optical means of branching light of a partial area of each of the subbeams incident on the light receiving means, or reducing light intensity of this light.

Furthermore, by way of example, the optical head of the present invention comprises light receiving means of receiving reflected beams from an optical disk by using an objective lens to condense light on the optical disk, the optical disk having at least a pair of marks arranged at predetermined distances from a tangential direction of information tracks and at the same distance in opposite directions perpendicular to the information tracks, tracking error signal detecting means of detecting a tracking error signal or an offset therein on the basis of a change in received light signal corresponding to a change in quantity of light reflected from the pair of marks, and optical means of branching light of a partial area of a beam incident on the light receiving means, or reducing light intensity of this light.

Moreover, by way of one example, the optical head of the present invention comprises light receiving means of receiving reflected beams from an optical disk by using an objective lens to condense light on the optical disk, the optical disk having at least a pair of marks formed between guide groove pieces into which a guide groove of an information track is intermittently partially cut, the marks being and arranged at predetermined distances from a tangential direction of information tracks and at the same distance in opposite directions perpendicular to the information tracks, tracking error signal detecting means of detecting a tracking error signal in two received light signals into which a beam is divided by a parting line extending parallel with the information tracks and detecting a change in received light signal corresponding to a change in quantity of light reflected from the pair of marks or detecting an offset in the tracking error signal on the basis of a change in the tracking error signal between the pair of marks, and optical means of branching light of a partial area of a beam incident on the light receiving means, or reducing light intensity of this light.

Moreover, by way of one example, the optical head of the present invention comprises light receiving means of receiving reflected beams from an optical disk by using an objective lens to condense light on the optical disk, the optical disk having a mirror surface portion formed by intermittently partially cutting a guide groove of an information track, tracking error signal detecting means of detecting a tracking error signal in two received light signals into which a beam is divided by a parting line extending parallel with the information tracks and of detecting an offset in the tracking error signal on the basis of a value for the tracking error signal detected in the mirror surface portion, and optical means of branching light of a partial area of a beam incident on the light receiving means, or reducing light intensity of this light.

Moreover, by way of one example, it is desirable that the optical head of the present invention comprises a light extinction area that reduces light intensity of a partial area of a passing beam, and a non-light-extinction area that does not reduce the light intensity thereof, and the light extinction area comprises a thin film formed of a substance that reduces transmissivity of light or an area having a diffraction grating formed therein, is an almost rectangle having long sides longer than the diameter of a passing beam, and is arranged in a direction perpendicular to the information tracks.

Alternatively, by way of one example, in the optical head of the present invention, the optical means comprises a light receiving area formed by dividing a light receiving element arranged in the light receiving means, the light receiving area corresponding to a partial area of a beam incident on the light receiving means in order to branch light thereof or reduce light intensity of this light, and the light receiving area is an almost rectangle having long sides longer than the diameter of an incident beam, and is arranged in a direction perpendicular to the information tracks, and a signal detected in the light receiving area is used to detect a tracking error signal by multiplying the detected signal by a smaller factor than a signal detected in the other area.

Alternatively, by way of one example, in the optical head of the present invention, the optical means has an area in which a diffraction grating or a prism is formed to branch passing light, and the area is an almost rectangle having a long side longer than the diameter of a passing beam, and is arranged in a direction perpendicular to the information tracks, and light branched by the area is guided to a first group of light receiving elements of the light receiving means, whereas the remaining light is guided to a second group of light receiving elements of the light receiving means, and a signal from the first group of light receiving elements is used to detect a tracking error signal by multiplying the detected signal by a smaller factor than a signal from the second group of light receiving elements.

Further, by way of one example, the optical head of the present invention is characterized by comprising means of condensing light on an optical disk using an objective lens, light receiving means of receiving light reflected by the optical disk, a tracking error signal detecting means of detecting a tracking error signal in a signal received by the light receiving means, and an optical disk tilt detecting means of detecting a tilt in the optical disk relative to an optical axis of the objective lens, and in that the light receiving means receives light from a first area arranged in a central portion of a beam incident on the light receiving means and shaped such that its width parallel with information tracks is smaller than the diameter of the beam and its width perpendicular to the information tracks is larger than the diameter of the beam, and from a second area that does not include the first area, in that the tracking error signal detecting means detects a first tracking error signal in a received light signal from the first area, while detecting a second tracking error signal in a received light signal from the second area, and in that the optical disk tilt detecting means compares the phase of the first tracking error signal with the phase of the second tracking error signal to detect a tilt in the optical disk. This configuration enables detection of a tilt in the optical disk in its radial direction. Further, this detection is carried out using a good signal equivalent to a tracking error signal detected by the optical head, thereby enabling a tilt in the optical disk to be accurately detected.

Further, by way of one example, the optical head of the present invention is characterized in that for an optical disk having a sample pit for a sample servo method formed therein, the tracking error signal detecting means detects a tracking error signal by detecting light reflected by the sample pit, and the optical disk tilt detecting means detects a tilt in the optical disk on the basis of a phase difference between the first tracking error signal and the second tracking error signal. This enables a tilt in the optical disk to be detected using an optical head based on the sample servo method.

Furthermore, by way of one example, the optical head of the present invention is characterized in that the condensing means condenses, on the optical disk, a main beam used to record and reproduce information as well as a first and second subbeams, in that the light receiving means receives each of the first and second subbeams incident on the light receiving means so that each of the subbeams, is divided into parts corresponding to said first and second areas, to detect a first tracking error signal using a difference signal between a received light signal from the first subbeam obtained from the first area and a received light signal from the second subbeam obtained from the first area, or a difference signal between a sum signal of received light signals from the first subbeam obtained from the first and second areas and a sum signal of received light signals from the second subbeam obtained from the first and second areas, while detecting a second tracking error signal using a difference signal between a received light signal from the first subbeam obtained from the second area and a received light signal from the second subbeam obtained from the second area, and in that the optical disk tilt detecting means detects a tilt in the optical disk on the basis of a phase difference between the first and second tracking error signals. This configuration enables a tilt in the optical disk to be detected using an optical head based on the three-beam tracking detecting method.

Moreover, by way of one example, the optical head of the present invention is characterized in that the light receiving means receives light from areas obtained by further dividing the first and second areas using parting lines parallel with the information tracks, in that the tracking error signal detecting means detects push-pull signals in signals received by the light receiving means, i.e. detects as a first tracking error signal a push-pull signal detected using a received light signal from the first area or a sum signal of received light signals from the first and second areas and as a second tracking error signal a push-pull signal detected along a received light signal from the second area, and in that the optical disk tilt detecting means detects a tilt in the optical disk on the basis of a phase difference between the first and second tracking error signals. This configuration enables a tilt in the optical disk to be detected using an optical head capable of tracking detection based on the push-pull method. Furthermore, a tilt in the optical disk is detected on the basis of the phase difference between the two push-pull signals, thereby eliminating the effects of an offset in the push-pull signal caused by movement of the objective lens.

Further, by way of one example, the optical head of the present invention is characterized by comprising means of condensing light by the objective lens on an optical disk having a pit formed on each information track, light receiving means of receiving light reflected by the optical disk, optical disk tilt detecting means of detecting a tilt in the optical disk relative to an optical axis of the objective lens, in a signal received by the light receiving means, and in that the light receiving means receives a beam incident on the light receiving means so that the beam is divided into two parts corresponding to first area arranged in a central portion of the beam and shaped such that its width parallel with the information tracks is larger than the diameter of the beam and its width perpendicular to the information tracks is smaller than the diameter of the beam, and a second area that does not include the first area, and the optical disk tilt detecting means compares either a received light signal from the first area or a sum signal of received light signals from the first and second areas with a received light signal from the second area to detect a phase difference between signal waveforms modulated when an optical spot passes over the pit, thereby detecting a tilt in the optical disk. This configuration enables detection of a tilt in the optical disk in a tangential direction of the information tracks.

BRIEF DESCRIPTION OF THE DRAWINGS

FIG. 17($b$) is a diagram showing another configuration of the light receiving means according to Embodiment 4 of the present invention;

FIG. 18($b$) is a diagram showing another configuration of the light receiving means according to Embodiment 5 of the present invention;

FIG. 22($a$) is a chart illustrating a first and second tracking error signals according to Embodiment 6 of the present invention;

FIG. 22($b$) is a chart illustrating a first and second tracking error signals according to Embodiment 6 of the present invention;

FIG. 26($b$) is a chart illustrating a first and second tracking error signals according to Embodiment 7 of the present invention;

FIG. 44(b) is a diagram illustrating a conventional technique; and

FIG. 44(c) is a diagram illustrating a conventional technique.

DESCRIPTION OF SYMBOLS

Figure 1:
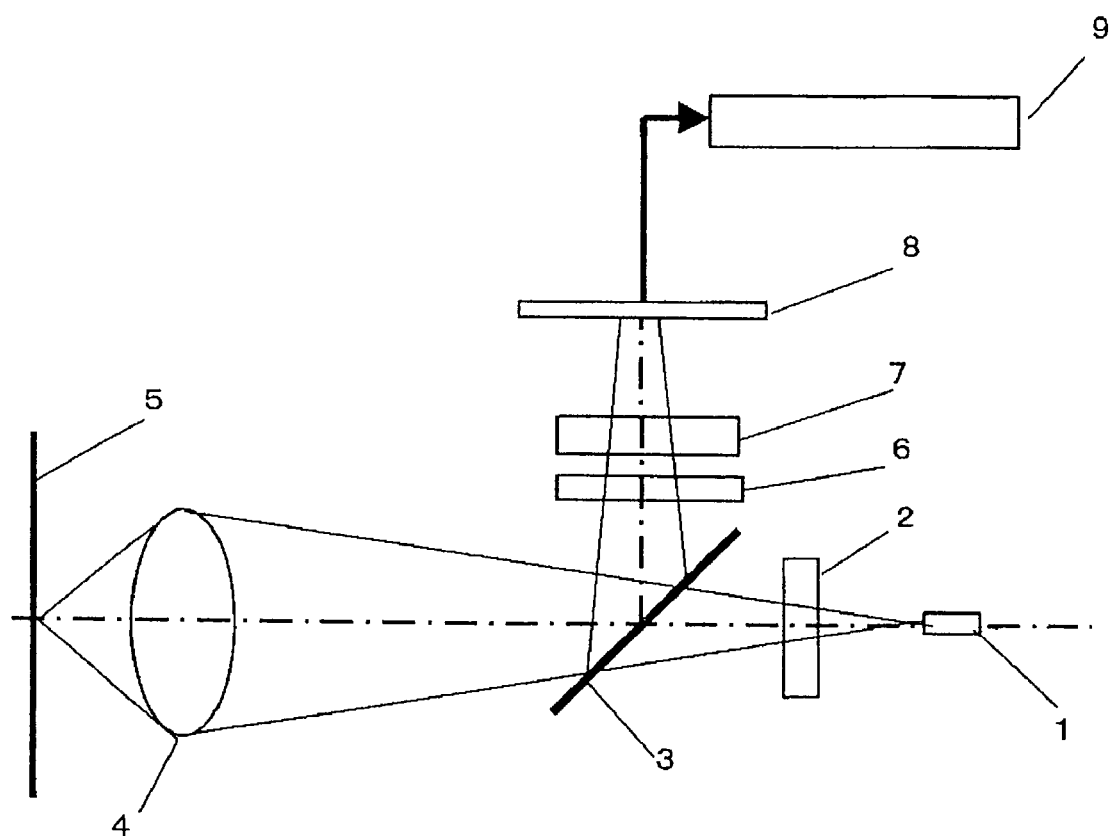
FIG. 1 is a diagram of an optical head according to Embodiment 1 of the present invention.

1 Light source
2 Diffraction element
3 Optical branching means
4 Objective lens
5 Optical disk
6, 6' Optical means
7 Detection lens
8, 30, 47, 54 Light receiving means
9, 55, 58 Tracking error signal detecting means
11, 11' Optical function areas
201 Light source
202 Optical axis of optical head
203 Beam splitter
204 Objective lens
205 Optical disk
206 Relay lens
207 Optical axis of optical head
208 Light receiving means
236 Diffraction element
237 Light receiving means
252 Objective lens moving means
257 Light receiving means

BEST MODES FOR CARRYING OUT THE INVENTION

Embodiments of the present invention will be described with reference to the drawings.

Embodiment 1

This embodiment is an example in which the problems of the conventional optical head based on the three-beam tracking method, described previously, are solved by applying the present invention thereto.

FIG. 1 is a diagram showing a configuration of an optical head according to Embodiment 1 of the present invention. In the drawing, reference numeral 1 denotes a light source. Reference numeral 2 denotes a diffraction element that branches light into a main beam and two subbeams. Reference numeral 3 denotes a beam splitter as optical branching means. Reference numerals 4 and 5 denote an objective lens and an optical disk, respectively. Reference numeral 6 denotes optical means of branching light in a partial area of a passing beam or reducing the intensity of this light. Reference numerals 7, 8, and 9 denote a detection lens, light receiving means having a plurality of light receiving elements, and tracking error signal detecting means, respectively.

Figure 2:
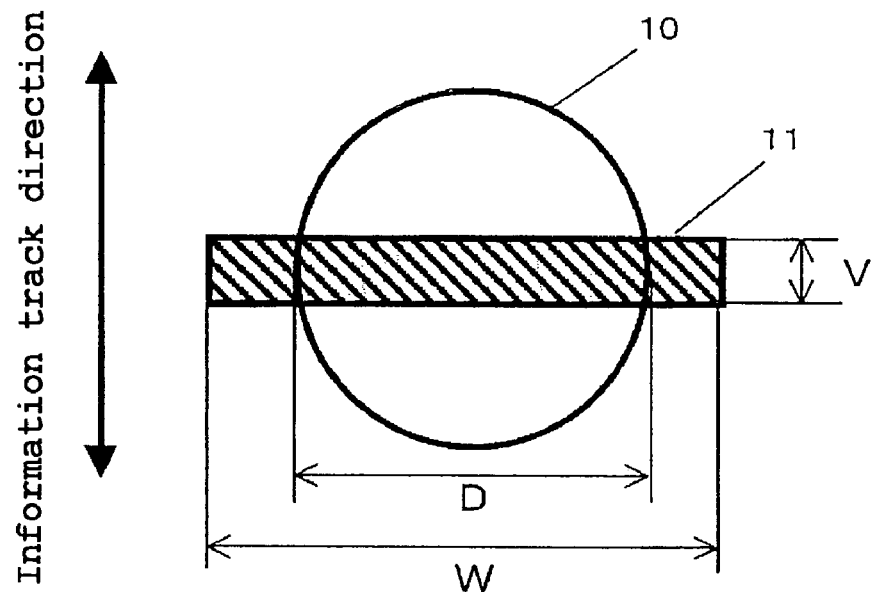
FIG. 2 is a diagram illustrating optical means according to Embodiment 1 of the present invention.

FIG. 2 is a diagram illustrating the optical means 6. In this drawing, reference numeral 10 denotes the shape of a passing beam. Reference numeral 11 denotes an optical function area that branches a passing beam or reduces the light intensity thereof. In this embodiment, the optical function area is a reflective or optically absorptive film, a diffraction grating, or the like formed on a transparent substrate of glass or resin, and has a low transmissivity.

Figure 3:
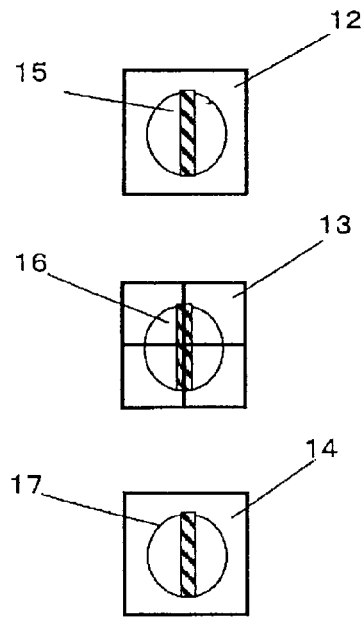
FIG. 3 is a diagram illustrating light receiving means according to Embodiment 1 of the present invention.

FIG. 3 is a diagram illustrating each light receiving element of the light receiving means 8. Reference numerals 12 and 14 denote light receiving elements. Reference numeral 13 denotes a four-piece light receiving element. Reference numerals 15 and 17 denotes subbeams. Reference numeral 16 denotes a main beam.

Description will be given of the operation of the optical head constructed as described above according to this embodiment.

Figure 38:
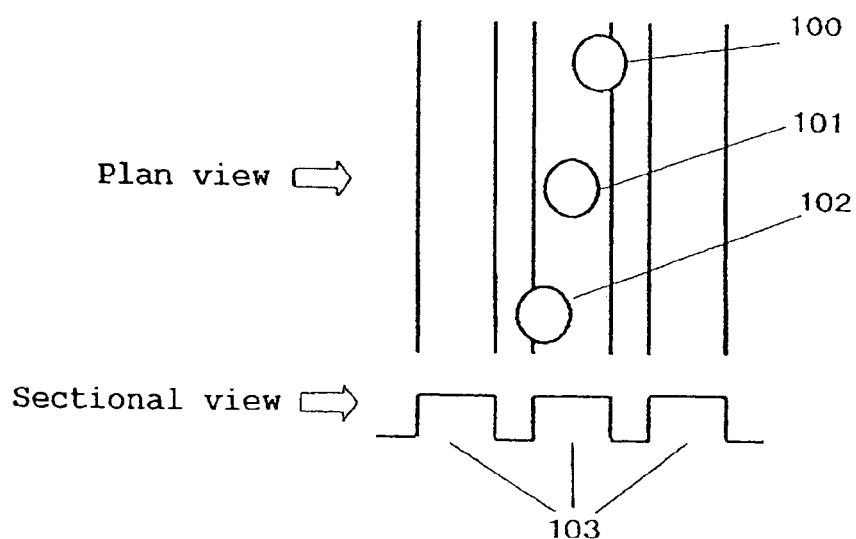
FIG. 38 is a diagram illustrating a conventional technique.

Light from the light source 1 is diffracted by the diffraction element 2 to generate a main beam as zero-order diffracted light and two subbeams as positive and negative first-order diffracted light. These three beams are transmitted through the optical branching means 3 and condensed on the optical disk 5 by the objective lens 4 to form three optical spots as shown in FIG. 38, described for the prior art.

Reflected beams from the respective optical spots reflected by the optical disk 5 pass through the objective lens 4, are reflected by the optical branching means 3, and are incident on the optical means 6. The main beam and two subbeams are not substantially separated from each other at a position where the optical means 6 is located. Accordingly, each of the beams has its light intensity at its central portion reduced by the optical function area 11 as shown by the shape 10 of the beam, shown in FIG. 2, before being incident on the detection lens 7.

If for example, an astigmatism method is used as a focus detecting method, the detection lens 7 has refractive power equal to that of a cylindrical lens and thus sufficient to generate astigmatism, and guides the beams to the light receiving means 8. The main beam is incident on the four-piece light receiving element 13, while the subbeams are incident on the light receiving elements 12 and 14, respectively as shown in FIG. 3. A central shaded part of each of the beams 15 to 17 represents a part thereof having its light intensity reduced by the optical means 6. The astigmatism of the detection lens 7 has caused these parts to be rotated through 90°.

Further, the tracking error signal detecting means 9 shown in FIG. 1 differentially amplifies signals detected by the light receiving elements 12 and 14 to detect a tracking error signal. A signal detected by the four-piece light receiving element 13 is used by focus detecting means and information signal detecting means (neither of them are shown) to carry out the respective signal detecting operations.

Figure 4:
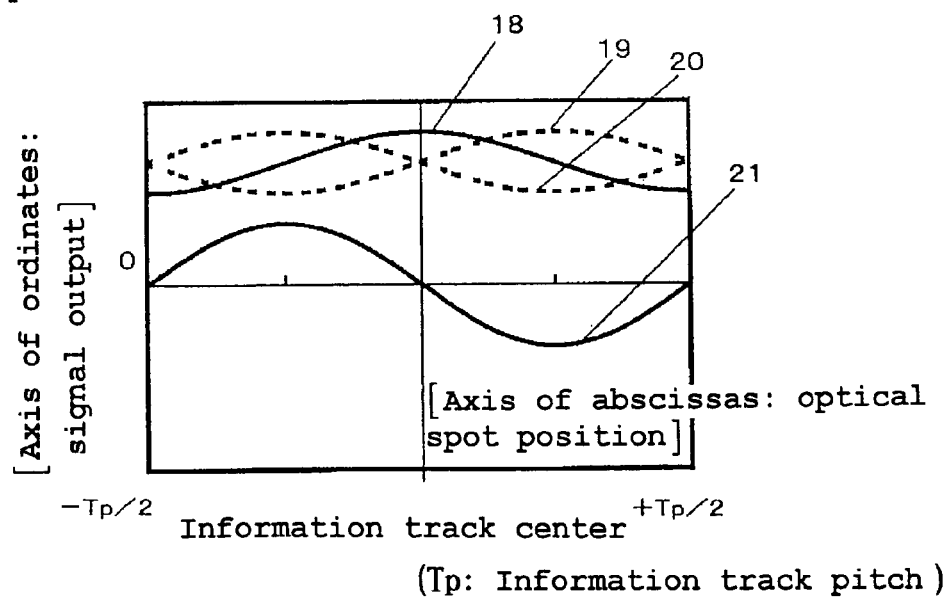
FIG. 4 is a chart illustrating signals according to Embodiment 1 of the present invention.

FIG. 4 illustrates changes in signals from the main beam and two subbeams which occurred when the relative positions of the optical spot of the main beam and of information tracks were changed. In this drawing, reference numeral 18 denotes the waveform of a signal from the main beam. Reference numerals 19 and 20 denote the waveforms of signals from the subbeams. Reference numeral 21 denotes the waveform of a tracking error signal. In this case, the width of each information track is larger than the width of the groove between the information tracks. Accordingly, the signal 18 for the main beam exhibits a waveform that has a maximum value at the center of the information track. The signals 19 and 20 for the subbeams exhibit waveforms having phases shifted by a ¼ track pitch in opposite direction. The tracking error signal 21 is a difference signal between the waveforms 19 and 20 and thus exhibits a waveform that is zero at the center of the information track.

Now, description will be given of a phase shift in the tracking error signal which may occur when the optical disk is tilted from the optical head in its radial direction (this will hereinafter be referred to as a "radial tilt"), i.e. a direction in which a plane containing a normal of the optical disk and the optical axis of the objective lens is perpendicular to a tangent of the information tracks. Typically, the optical spots of the main beam and subbeams have substantially the same shape, and received light signals therefor thus have the same waveform. Consequently, the position at which the tracking error signal is zero coincides with the peak position of the main beam signal. Thus, only the waveform of a signal from the main beam will be described later.

Figure 5:
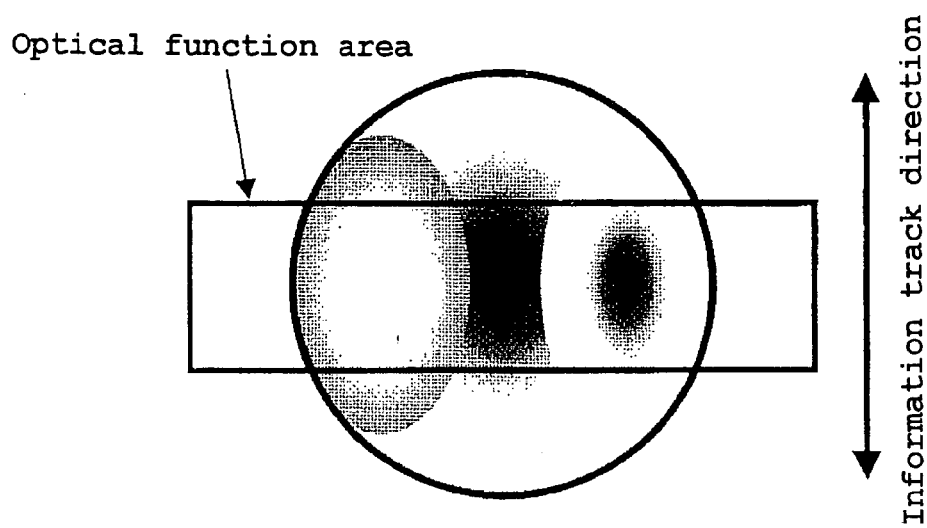
FIG. 5 is a diagram illustrating reflected light from an optical disk.

FIG. 5 is a diagram schematically illustrating the distribution of the quantity of light reflected by the optical disk when a radial tilt in the optical disk is present. The density of black and white in the drawing corresponds to light intensity. This asymmetric intensity distribution is obtained, as shown in the drawing, because coma aberration occurring when light passes through the transparent substrate of the optical disk causes asymmetric wavefront aberration on the wavefront of incident light, so that the wavefront phase in an area of the optical disk in which the zero-order diffracted light interferes with the positive and negative first-order diffracted light varies in a direction opposite each other. This asymmetry shifts the peak position of a signal from the main beam from the center of the information track.

In this embodiment, the optical function area 11 of the optical means 6 is used to reduce the light intensity in the area in which the asymmetric intensity distribution is observed. This suppresses the effects of the asymmetric light intensity in this area on the tracking error signal. The effects will be described below in detail.

Figure 6:
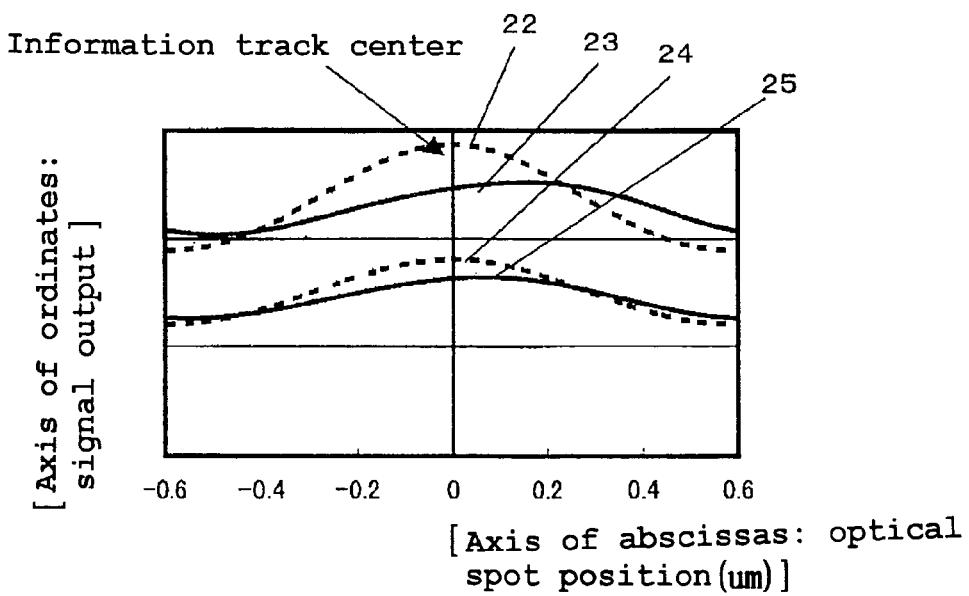
FIG. 6 is a diagram illustrating effects of Embodiment 1 of the present invention.

FIG. 6 shows the results of simulation of a signal from the main beam under the assumption of the following parameters: the wavelength $\lambda$ of a light source for the optical head=660 nm, NA=0.6, the pitch of the information tracks of the optical disk=1.2 μm, the depth of a guide groove=$\lambda/8$, the width of the guide groove=0.8 μm, the thickness of the substrate=0.6 mm. Reference numeral 22 denotes a waveform observed when no radial tilt occurs. Reference numeral 23 denotes a waveform observed in a conventional optical head with a radial tilt=1.2°. The waveform 23 has a phase shifted relative to the waveform 22, and the peak of the phase of the waveform 23 deviates from the center of the information track by about 0.15 μm.

Waveforms 24 and 25 in FIG. 6 indicate the results of simulation of the waveform of a signal from the main beam using the optical head of the present invention wherein V/D=0.25 as the width V of the optical function area 11 represented by the ratio of the width V and the diameter D of a beam and wherein the optical function area has a zero transmissivity. Reference numeral 24 denotes a waveform observed when no radial tilt occurs. Reference numeral 25 denotes a waveform observed when the radial tilt=1.2°. In spite of a decrease in amplitude, the deviation of the peak position of the waveform 25 decreases to only about 0.05 μm.

Figure 7:
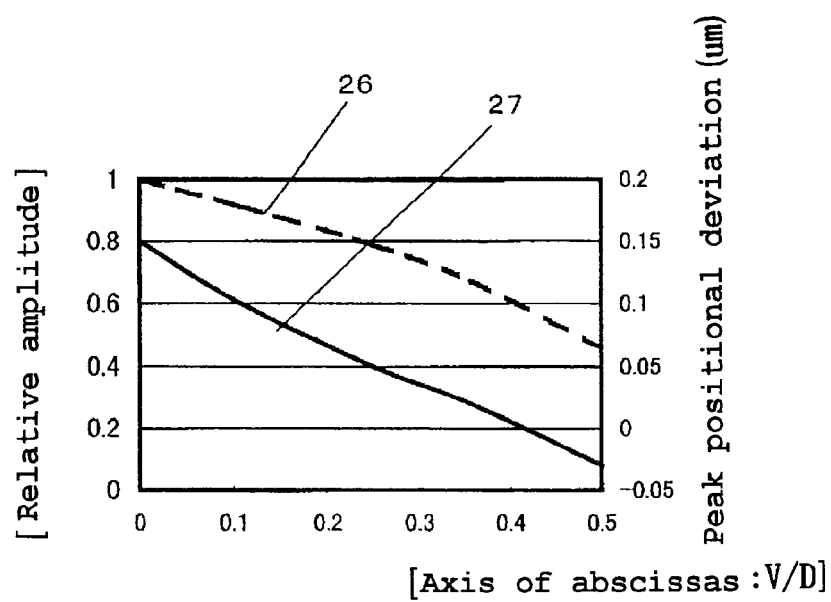
FIG. 7 is a diagram illustrating the effects of Embodiment 1 of the present invention.

Further, FIG. 7 is a graph showing a variation in amplitude of the waveform of a signal from the main beam and a variation in peak position deviation, both variations being observed when the ratio V/D is varied with a radial tilt of 1.2°. Reference numeral 26 denotes the amplitude, and reference numeral 27 denotes a deviation in the peak position. The relative amplitude in the drawing refers to a normalized amplitude obtained by setting the amplitude obtained with a V/D of 0 to 1. In FIG. 7, if for example, V/D=0.4, the relative amplitude 26 decreases to 0.6. However, the deviation 27 of the peak position is substantially zero.

The above simulation results mean that if there is a radial tilt of 1.2°, then with the conventional optical head, a target point for tracking control corresponding to the peak position of a signal from the main beam (position at which the tracking error signal becomes zero) deviates from the center of the information track by about 0.15 μm, whereas the present invention can reduce a possible deviation in the target point for tracking control, i.e. a possible phase shift in the tracking error signal substantially to zero.

Figure 8:
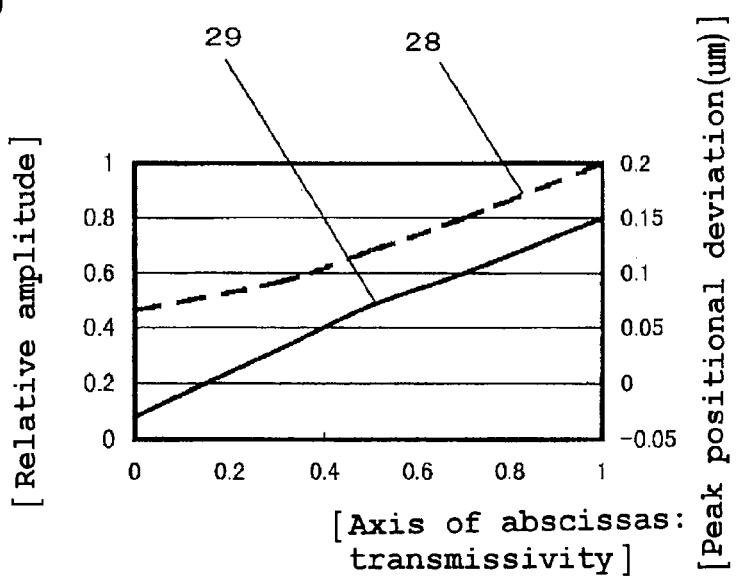
FIG. 8 is a diagram illustrating the effects of Embodiment 1 of the present invention.

Furthermore, FIG. 8 shows the results of simulation of variations in amplitude, shown at 28, and peak position deviation, shown at 29, effected by varying the transmissivity of the optical function area 11 when the V/D is 0.5. When the transmissivity is zero, the deviation of the peak position has a negative value. This is expected to be because suppression of the peak position deviation is excessively effective. However, the effects of suppression of the peak position deviation can be freely changed by changing the transmissivity. That is, the effects of suppression of a phase shift in the tracking error signal in the presence of a radial tilt can be adjusted not only by properly setting the width of the optical function area 11 but also by appropriately changing the transmissivity thereof.

As described above, according to the embodiment of the present invention, in an optical head based on the three-beam tracking method, the light intensity of the central portion of each of two subbeams used to detect a tracking error signal is reduced in band-shape, to reduce the effects of light from an area with a large wavefront aberration caused by a radial tilt in an optical disk on the tracking error signal. This enables suppression of a phase shift in the tracking error signal in the presence of a radial tilt to improve tracking accuracy.

In this embodiment, the optical means 6 is arranged in front of the detection lens 7. However, in an optical path through which subbeams reflected by the optical disk 5 propagate to the light receiving means 8, a mirror may be provided which turns back the optical path. Alternatively, optical means of reducing the light intensity of the central portion of a beam may be provided in another optical branching means or the like provided in an optical head using another light receiving element to detect an information signal, the optical branching means branching a beam into two parts for tracking detection and for information signal detection.

Furthermore, in the above description, the length W of the optical function area 11 is sufficiently larger than the diameter D of a beam. However, the length W may be substantially equal to the width D or may be slightly smaller than it. These arrangement can still suppress a phase shift in the tracking error signal.

Embodiment 2

Embodiment 2 of the present invention realizes further features of the present invention by partially changing the configuration of Embodiment 1.

Figure 9:
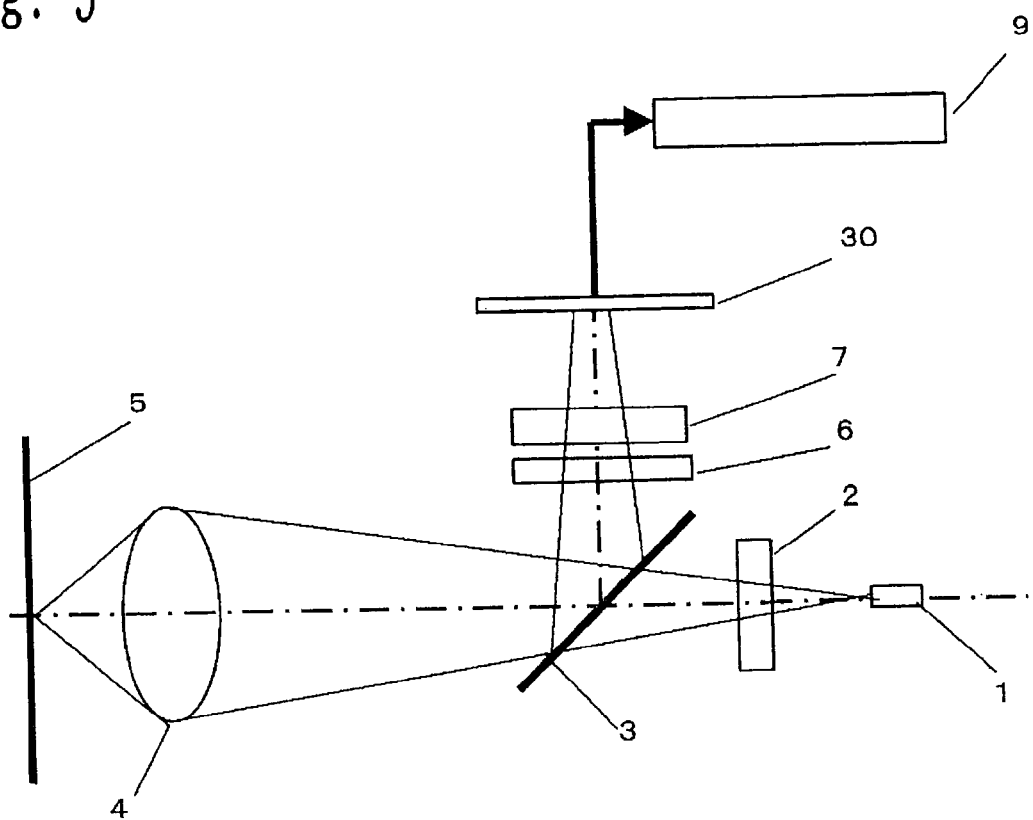
FIG. 9 is a diagram illustrating a configuration of Embodiment 2 of the present invention.

FIG. 9 is a diagram showing the configuration of this embodiment. Components common to those shown in FIG. 1 are denoted by the same reference numerals, and description thereof is omitted. This embodiment differs from Embodiment 1 in that light receiving means 30 is provided in place of the light receiving means 8 in FIG. 1 and in that an optical function area 11' having means such as a diffraction grating formed therein to branch light is provided as optical means 6' so that a branched beam is guided to the light receiving means 30. In this case, the shape of the optical function area 11' is the same as that of the optical function area 11, shown in FIG. 2.

Figure 10:
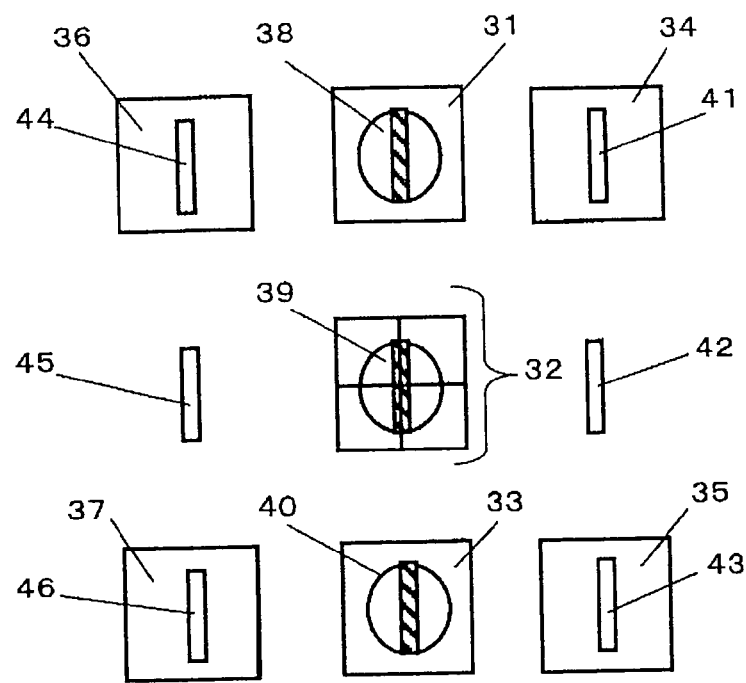
FIG. 10 is a diagram illustrating light receiving means according to Embodiment 2 of the present invention.

FIG. 10 is a diagram showing light receiving areas of the light receiving means 30. In this drawing, reference numerals 31, 33, and 34 to 37 denote light receiving elements, and reference numeral 32 is a four-piece light receiving element. Reference numerals 38 and 40 denote beams of subbeams, and reference numeral 39 denotes a beam of main beam. Reference numerals 41 and 44 denote beams branched from the subbeam 38 by the optical function area 11'. Reference numerals 42 and 45 similarly denote beams branched from the main beam 39. Reference numerals 43 and 46 similarly denote beams branched from the subbeam 40. In this drawing, the shaded portions each denote a portion occupied by the optical function area 11'. The light receiving elements 31, 32, and 33 do not receive parts of beams of the subbeam 38, main beam 39, and subbeam 40, respectively, which correspond to the optical function area 11'. Further, description of focus detection and information detection by the main beam 39 is omitted.

The numbers of the light receiving elements are provided as signal names, and signals from the subbeams are mathematically expressed. Then, a signal from the first subbeam is given by:

$$31+k1\times(34+36) \quad \text{(Equation 2)}$$

A signal from the second subbeam is given by:

$$33+k2\times(35+37) \quad \text{(Equation 3)}$$

In the above equations, k1 and k2 are fixed factors (k1, k2<1). Changing these factors to change the values for the subbeams is equivalent to changing the transmissivity of the optical function area 11 as described in Embodiment 1. Accordingly, the tracking error signal detecting means 9 can electrically calculate a detection signal to arbitrarily set or change the effects of suppression of a phase shift in the tracking error signal.

Accordingly, according to this embodiment, the appropriate suppression effect can be set or switched when, for example, because of a difference in substrate thickness between optical disks, a different wavefront aberration, caused by a radial tilt in the optical disk, must be dealt with or when a different amount of phase shift in the tracking error signal must be suppressed, e.g. when in use by changing numerical aperture of the objective lens. The beams 42 and 45 branched from the main beam are not used to detect a tracking error signal or to detect focus or information.

As described above, according to the embodiment of the present invention, an optical head based on the three-beam tracking method receives light by using a diffraction element to branch a part of a central portion of each of the two subbeams used to detect a tracking error signal, to reduce the contribution to the tracking error signal of light from an area with large wavefront aberration caused by a radial tilt in the optical disk, i.e. a received branched received light signal. This suppresses a phase shift in the tracking error signal in the presence of a radial tilt and improves the accuracy of tracking control. Further, the effects of suppression of a phase shift can be adjusted on the basis of electrical calculations. Consequently, optimal adjustments are possible, and settings can be changed.

In this embodiment, the exclusive diffraction element is used to branch a part of the subbeam. However, for an optical head having a diffraction element that branches a beam for focus detection, its diffraction element may be provided with similar functions.

Embodiment 3

Figure 11:
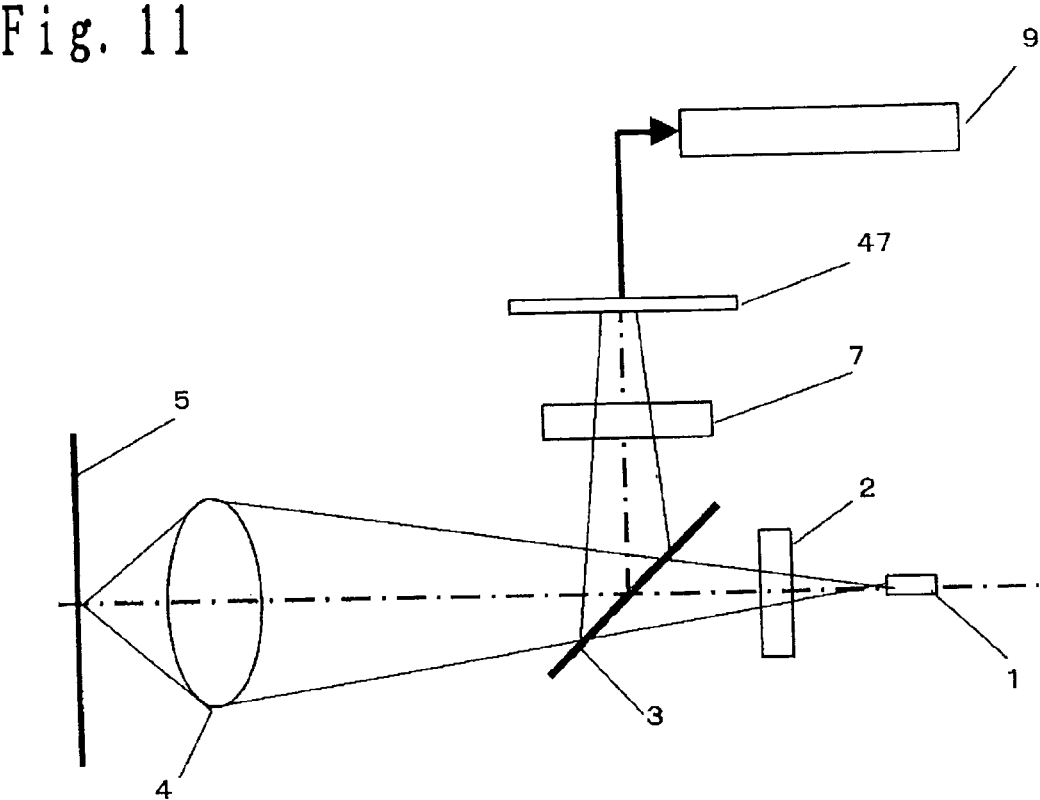
FIG. 11 is a diagram illustrating a configuration of Embodiment 3 of the present invention.

FIG. 11 is a diagram showing the configuration of this embodiment. Components common to those shown in FIG. 1 are denoted by the same reference numerals, and description thereof is omitted. Only differences from the configuration in FIG. 1 will be described. This embodiment differs from the configuration in FIG. 1 in that the optical means 6 in FIG. 1 is omitted, while light receiving means 47 is provided with the functions (not shown) of the optical means 6. That is, the light receiving means 47 has the functions of both light receiving means 8 and optical means 6 in Embodiment 1.

Figure 12:
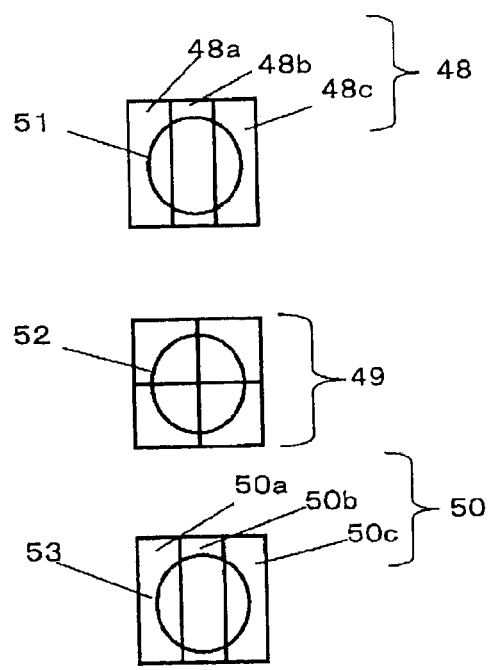
FIG. 12 is a diagram illustrating light receiving means according to Embodiment 3 of the present invention.

FIG. 12 is a diagram showing a configuration of light receiving elements of the light receiving means 47. In this drawing, reference numerals 48 and 50 denote three-piece light receiving elements, and reference numeral 49 denotes a four-piece light receiving element. Reference numerals 48a to 48c and 50a to 50c denotes light receiving areas of the three-piece light receiving elements. Reference numerals 51 to 53 denote beams of subbeams, and reference numeral 52 denotes a beam of a main beam. The astigmatism of the detection lens 7 causes each beam to be incident on the light receiving element after having its distribution rotated through 90°. Thus, the parting lines on the three-piece light receiving elements extend in the vertical direction of the sheet of the drawings.

The numbers of the light receiving areas of the three-piece light receiving elements 48 and 50 are provided as signal names, and signals from the subbeams are mathematically expressed. Then, a signal from the first subbeam is given by:

$$(48a+48c)+k3\times 48b \quad \text{(Equation 4)}$$

A signal from the second subbeam is given by:

$$(50a+50c)+k4\times 50b \quad \text{(Equation 5)}$$

A tracking error signal is detected on the basis of a difference between signals of these two subbeams. Description of a focus signal and an information signal obtained from the main beam 52 is omitted. In the above equations, k3 and k4 are fixed factors (k3, k4<1). Thus, electrical calculations can be executed to change these factors so as to arbitrarily set the magnitude of the effects of suppression of a phase shift in the tracking error signal, as in the case of Embodiment 2.

As described above, according to the embodiment of the present invention, an optical head based on the three-beam tracking method uses light receiving elements to divide two subbeams used to detect a tracking error signal and changes an addition ratio between a detection signal from light in a central portion of the beam and a detection signal from the remaining part of the beam, to reduce the contribution to the tracking error signal of light from an area with large wavefront aberration caused by a radial tilt in the optical disk, i.e. light in the central portion of the beam. This suppresses a phase shift in the tracking error signal in the presence of a radial tilt and improves the accuracy of tracking control. Further, the effects of suppression of a phase shift can be adjusted on the basis of electrical calculations. Consequently, optimal adjustments are possible, and settings can be changed.

Embodiment 4

This embodiment is an example in which the problems of the above conventional optical head based on the sample servo tracking method are solved by applying the present invention to this optical head.

Figure 13:
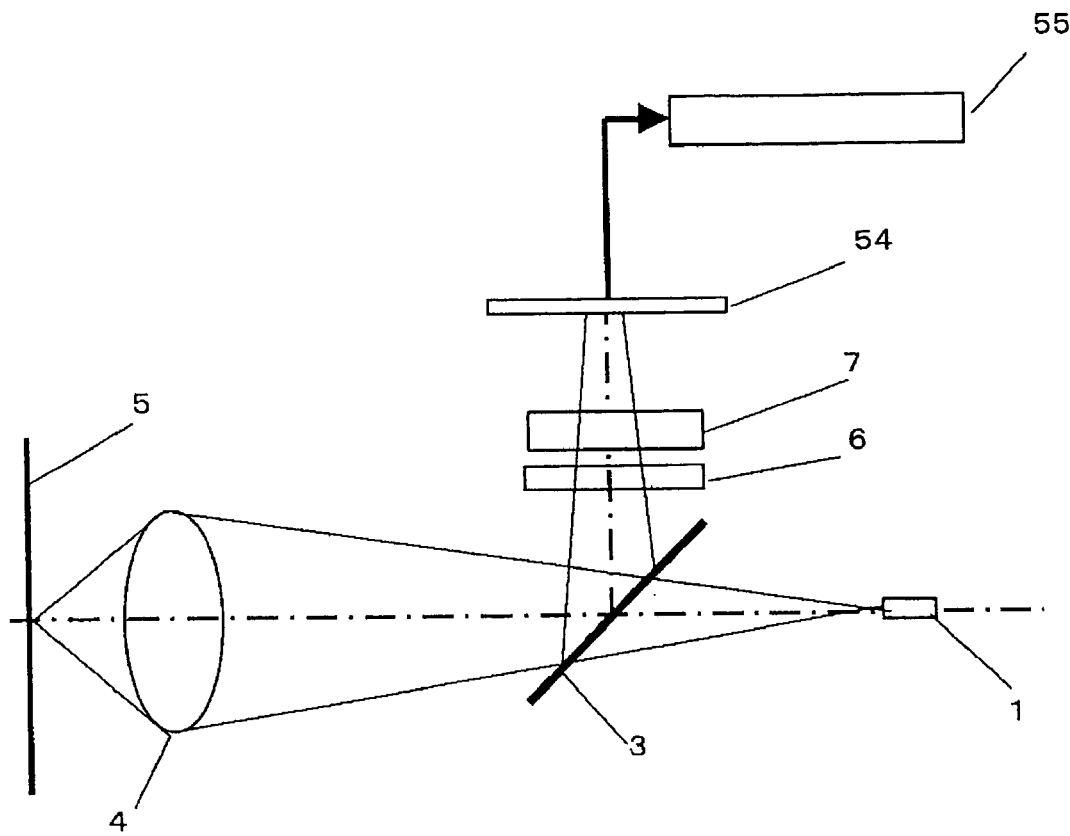
FIG. 13 is a diagram illustrating a configuration of Embodiment 4 of the present invention.

FIG. 13 is a diagram showing a configuration of an optical head according to Embodiment 4 of the present invention. Components common to those shown in FIG. 1 are denoted by the same reference numerals, and description thereof is omitted. Only differences from the configuration in FIG. 1 will be described. The arrangements of this embodiment include light receiving means 54 and tracking error signal detecting means 55 in place of the light receiving means 8 and tracking error signal detecting means 9 in FIG. 1, and the diffraction element 2 in FIG. 1 is omitted.

Figure 14:
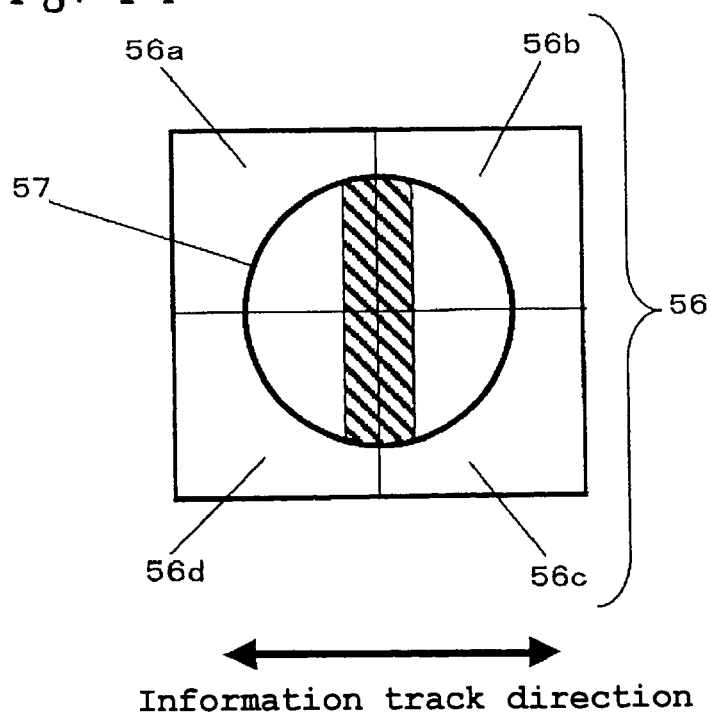
FIG. 14 is a diagram illustrating light receiving means according to Embodiment 4 of the present invention.

Further, FIG. 14, is a diagram illustrating each light receiving element of the light receiving means 54. In this drawing, reference numeral 56 denotes a four-piece light receiving element. Reference numerals 56a to 56d denote light receiving areas of the four-piece light receiving element 56, and reference numeral 57 denotes the shape of a beam incident on the four-piece light receiving element 56.

Description will be given of the operation of the optical head constructed as described above according to Embodiment 4 of the present invention.

Light from the light source 1 is transmitted through the optical branching means 3 and condensed on the optical disk 5 by the objective lens 4. A beam reflected by the optical disk 5 passes through the objective lens 4 again and is reflected by the optical branching means 3. The beam is then incident on the optical means 6. In this embodiment, the beam incident on the optical means 6 has its light intensity at its central portion reduced by the optical function area 11, shown in FIG. 2, as with Embodiment 1, described previously. The beam is then guided to the light receiving means 54 via the detection lens 7.

A central shaded part of the beam 57 shown in FIG. 14 represents a portion thereof having its light intensity reduced by the optical means 6. The astigmatism of the detection lens 7 has caused this part to be rotated through 90°.

Further, the tracking error signal detecting means 55 in FIG. 13 is based on the sample servo tracking method, and thus detects a sum signal of signals detected by the four-piece light receiving element 56, the sum signal corresponding to the quantity of light reflected by the optical disk, i.e. detects a tracking error signal using all detection signals from the light receiving elements 56a to 56d as described in the description of the prior art. Focus detecting means and information signal detecting means (neither of them are shown) perform respective predetermined signal detecting operations using detection signals from the light receiving elements 56a to 56d of the four-piece light receiving element 56.

Now, tracking detection carried out by the optical head constructed as described above will be described in further detail. The sum of signals detected by the four-piece light receiving element 56 is defined as a signal S. Then, the tracking error signal detecting means 55 samples and holds the signal S at positions A and B shown in FIG. 41 when an optical spot passes over the zigzag marks shown in FIG. 40. Thus, the tracking error signal detecting means 55 detects signal values VA and VB. A larger number of zigzag marks are present along the information tracks. Since the optical disk is rotating, the optical spot passes over a large number of zigzag marks while crossing the information tracks. It is assumed that signals S1 and S2 are obtained by temporally joining together the signal values VA and VB sampled and held at the zigzag marks. Then, the tracking error signal corresponds to a difference signal S1−S2.

Here, the waveforms of the signals S1 and S2 obtained when the optical spot crosses the information tracks each have a minimum (or maximum) value at pit positions corresponding to the zigzag marks. These signals are similar to those of the two subbeams based on the three-beam tracking method shown in FIG. 4.

Further, signals from the subbeams and the signals S1 and S2 are obtained by detecting the quantity of reflected light modulated by the contiguous guide groove or zigzag marks. Thus, these signals are similarly affected by aberration occurring in the optical spot owing to a radial tilt in the optical disk.

Consequently, as with Embodiment 1, the optical head of this embodiment can suppress a phase shift in the tracking error signal attributed to a radial tilt in the optical disk.

As described above, according to the embodiment of the present invention, an optical head based on the sample servo tracking method reduces the light intensity of a part of a beam used to detect a tracking error signal in band-shape, to reduce the contribution to the tracking error signal of light from an area with large wavefront aberration caused by a radial tilt in the optical disk. This suppresses a phase shift in the tracking error signal in the presence of a radial tilt.

In the four-piece light receiving element 56, the sum signal from the light receiving element 56 contributes to the tracking error detecting operation of the present invention. The light receiving element is divided into the four pieces 56a to 56d because the astigmatism method is used as a focus detecting method, as in the case of Embodiment 1. Accordingly, the light receiving means 54 may be composed of one light receiving element in order to detect only a tracking error.

Further, this embodiment is constructed as shown in FIGS. 13 and 14. However, the means applied to the subbeams in Embodiments 2 and 3 may be applied to the beams in this embodiment.

Figure 17:
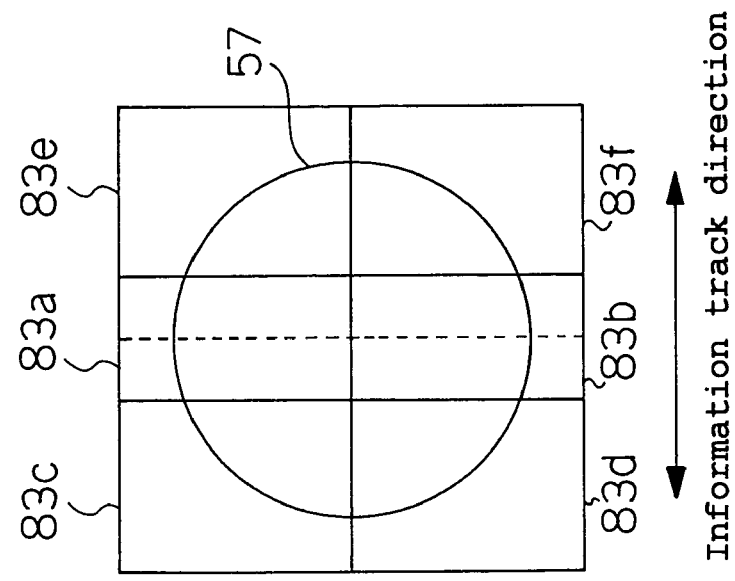
FIG. 17($a$) is a diagram showing another configuration of the light receiving means according to Embodiment 4 of the present invention.
Figure 17:
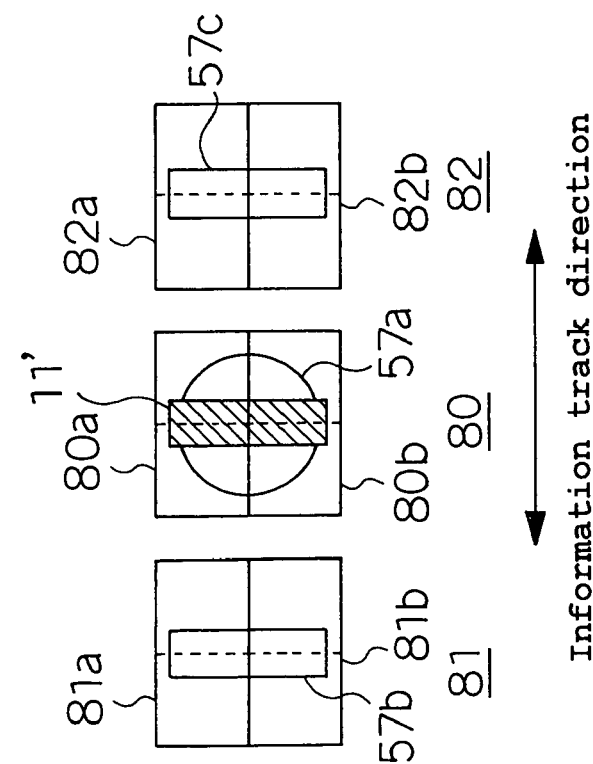

FIG. 17(a) is a diagram showing a configuration of the light receiving means 54 in the case in which the arrangements of the light receiving means 30 and optical means 6' in Embodiment 2 are applied to the sample servo tracking method in this embodiment. FIG. 17(b) is a diagram showing the arrangement of the light receiving means 54 in the case in which the arrangement of the light receiving means 47 in Embodiment 3 is applied to the sample servo tracking method in this embodiment. In FIGS. 17(a) and 17(b), in order to mainly describe the operation of detecting a tracking error, the parting lines used to divide the light receiving element 57 into four areas because of the use of the astigmatism method as a focus detecting method are shown as dotted lines. The operation of these lines is omitted. The arrangement of the light receiving element for the main beams is also omitted.

As shown in FIG. 17(a), the light receiving means 54 has light receiving elements 70, 71, and 72 that receive beams 57a, 57b, and 57c obtained by using the optical means 6' to divide the beam 57 into three. Further, that part of the beam 57a which corresponds to the optical function area 11' is not received. On the other hand, the beams 57b and 57c are composed of that part of the beam 57 which corresponds to the optical function area 11'.

The numbers of the light receiving elements are provided as signal names, and signals from the beams are mathematically expressed. Then, a signal from the beam 57 is expressed by:

$$57a + k5 \times (57b + 57c) \quad \text{(Equation 6)}$$

(k5 is a fixed factor (k5<1))

Thus, as with Embodiment 2, the effects of suppression of a phase shift in the tracking error signal can be arbitrarily set or changed by changing the value of the factor k5 to change the value for the signal obtained from the beam 57.

Now, as shown in FIG. 17(b), the light receiving means 54 has three-piece light receiving elements 73a, 73b, and 73c each of which receives the beam 57.

The numbers of the light receiving elements are provided as signal names. Then, a signal from the beam 57 is expressed by:

$$(73b+73c)+k6\times 73a \quad \text{(Equation 7)}$$

(k6 is a fixed factor (k6<1))

Thus, as with Embodiment 3, the effects of suppression of a phase shift in the tracking error signal can be arbitrarily set or changed by changing the value of the factor k6 to change the value for the signal obtained from the beam 57.

Embodiment 5

This embodiment is an example in which the problems of the above conventional optical head based on the composite wobbled tracking method or composite continuous tracking method are solved by applying the present invention to this optical head.

Figure 15:
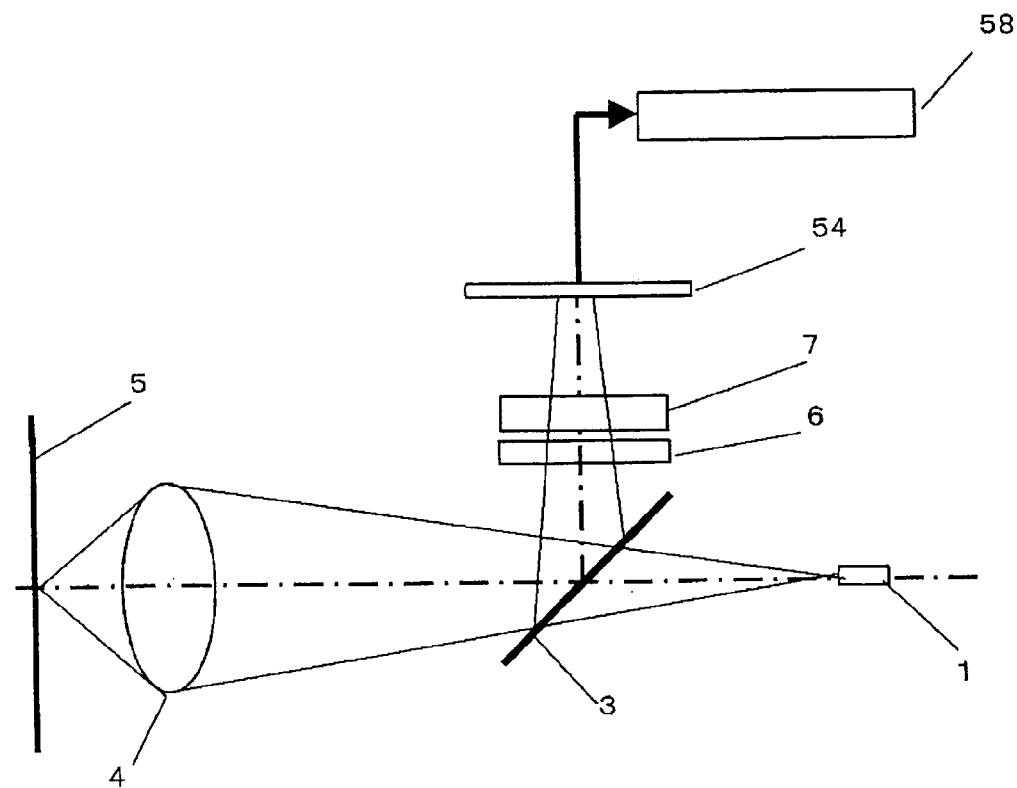
FIG. 15 is a diagram illustrating a configuration of Embodiment 5 of the present invention.

FIG. 15 is a diagram showing a configuration of an optical head according to Embodiment 5 of the present invention. The same components as those in FIGS. 13 and 14, which show the configuration of Embodiment 4, are denoted by the same reference numerals, and description thereof is omitted. The arrangements of this embodiment include tracking error signal detecting means 58 instead of the tracking error signal detecting means 55 in FIG. 13.

This embodiment differs from Embodiment 4 in an operation performed by the tracking error signal detecting means 58 to process received light signals obtained by the light receiving means 54. The operation of the tracking error signal detecting means 58 will be described below with reference to FIG. 14.

The reference numerals 56a to 56b of light receiving areas of the four-piece light receiving element 56 are used to define signals T, T1, T2, and TE.

$$T=56a+56b+56c+56d \quad \text{(Equation 8)}$$

$$T1=56a+56b \quad \text{(Equation 9)}$$

$$T2=56c+56d \quad \text{(Equation 10)}$$

$$TE=T1-T2 \quad \text{(Equation 11)}$$

The signal T is a sum signal from the four-piece light receiving element 57. The signal TE is a push-pull signal. The tracking error signal detecting means 58 detects the signals T, T1, T2, and TE, expressed by the above equations.

Figure 39:
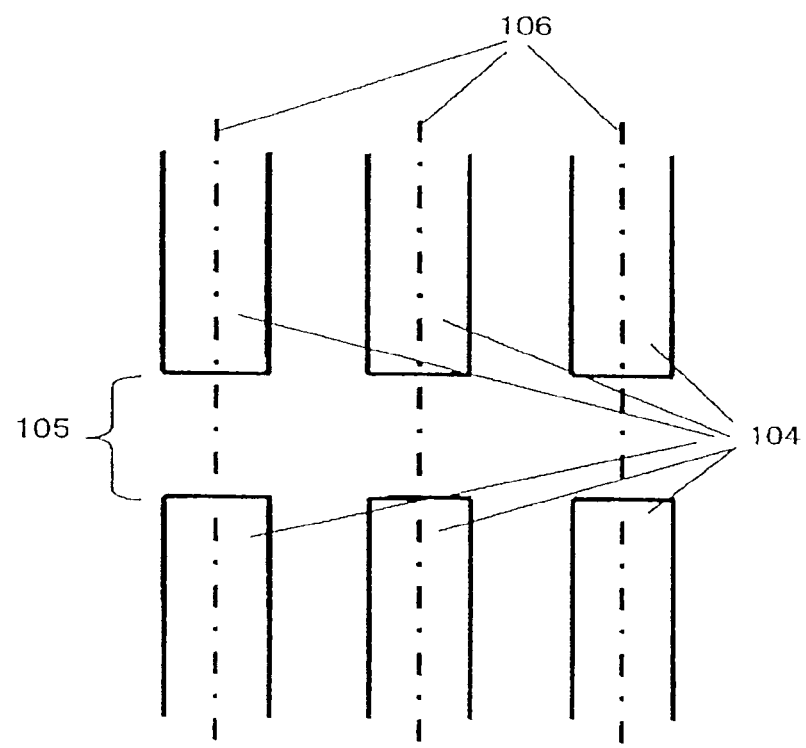
FIG. 39 is a diagram illustrating a conventional technique.

With the composite continuous tracking method, described in the prior art section, the information tracks of the optical disk are composed of guide groove portions 104 and a mirror surface portion 105, as shown in FIG. 39. Accordingly, the tracking error signal detecting means 58 samples and holds the signal TE when the optical spot passes over the mirror surface portion 105. The tracking error signal detecting means 58 then uses a value for the signal TE to correct an offset in the signal TE, thereby detecting a tracking error signal. The offset in the signal TE refers to the positional deviation of the optical axis of the optical head from the objective lens 4 or DC voltage generated in the push-pull signal owing to the positional deviation of a reflected beam from the optical disk caused by a radial tilt in the optical disk.

Figure 40:
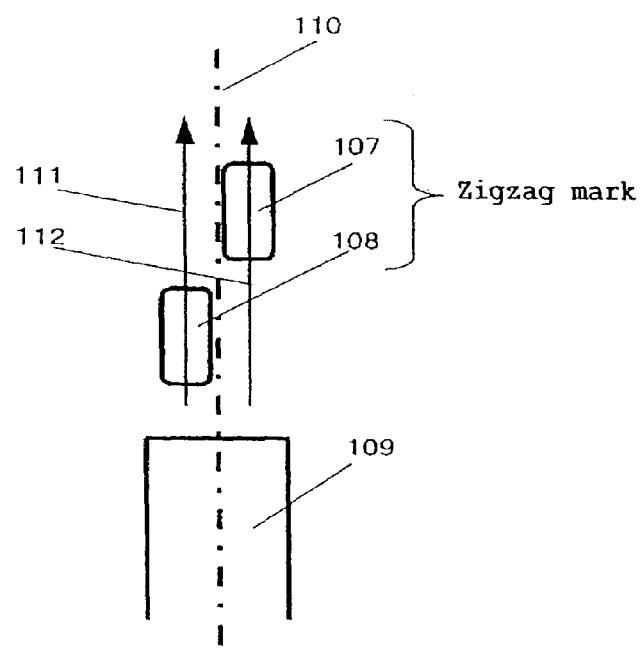
FIG. 40 is a diagram illustrating a conventional technique.

Further, in the composite wobbled tracking method, described in the prior art section, the information tracks of the optical disk are composed of guide groove portions and zigzag mark portions as shown in FIG. 40. A signal detected using the same method as that used by the tracking error signal detecting means 55 in Embodiment 4, described previously, is defined as TE2. Then, when the optical spot passes over the zigzag mark portions, the tracking error signal detecting means 58 compares the offset in the signal TE2 with the offset in the signal TE to detect a tracking error signal with the offset corrected. This is because an offset such as the one described previously is hard to occur in the signal TE2, so that the offset in the signal TE can be extracted through comparison. Further, the offset in the signal TE can also be extracted by sampling and holding the signal TE when the optical spot passes over the zigzag marks.

The above described tracking detecting methods have means of correcting an offset in the tracking error signal. However, these offset correcting means are ineffective on a phase shift in the tracking error signal caused by coma aberration resulting from a radial tilt in the optical disk.

Figure 16:
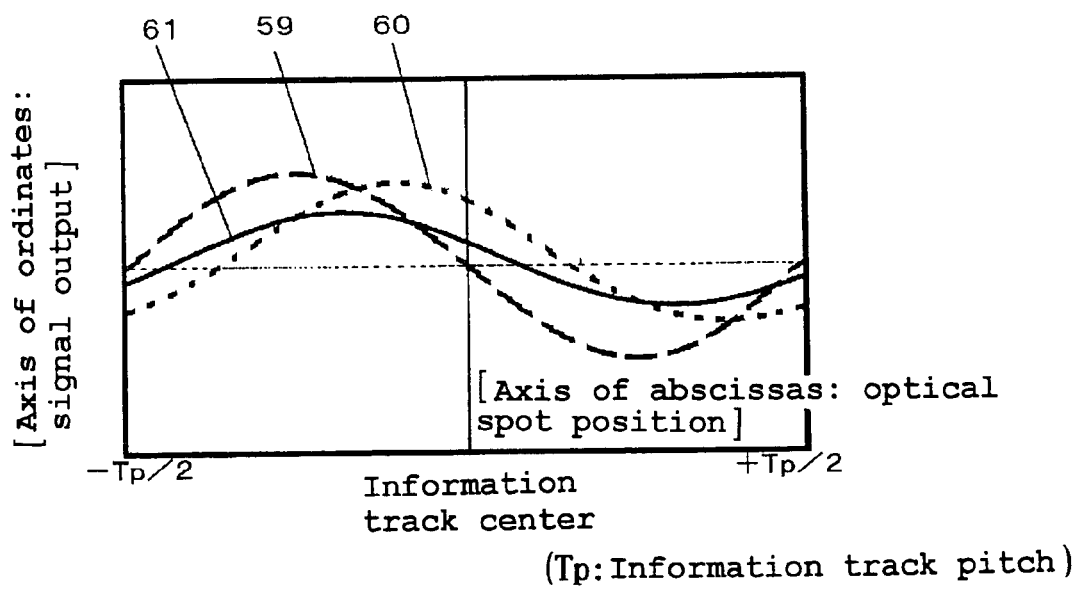
FIG. 16 is a chart illustrating signals according to Embodiment 5 of the present invention.

FIG. 16 shows the results of simulation of the waveform of the push-pull signal TE under the assumption of the following parameters: the wavelength of a light source for the optical head=660 nm, NA=0.6, the pitch of the information tracks of the optical disk=1.2 μm, the depth of a guide groove=λ/8, the width of the guide groove=0.8 μm, the thickness of the substrate=0.6 mm. Reference numeral 59 denotes a waveform observed when no radial tilt occurs. Reference numeral 60 denotes a waveform observed in a conventional optical head with a radial tilt=1.2°. Reference numeral 61 denotes a waveform observed in the optical head of this embodiment.

Not only a phase shift induced by a radial tilt but also an offset may occur in each waveform. Accordingly, when attention is paid to peak positions in comparing these waveforms, the phase shift in the waveform 61 is equal to or smaller than the half of the phase shift in the waveform 60. The waveform 61 indicates the results of calculations for the case in which the width of the optical function area 11 of the optical means 6 is such that V/D=0.25 and in which the transmissivity is zero. The results indicate that the optical means 6 effectively suppresses even a phase shift in the push-pull signal attributed to a radial tilt. Therefore, the optical means 6 is effective on each of the above tracking detecting methods.

As described above, according to this embodiment, optical heads based on the composite wobbled tracking method and composite continuous tracking method reduce the light intensity of a part of a beam used to detect a tracking error signal in band-width, to reduce the contribution to the tracking error signal of light from an area with large wavefront aberration caused by a radial tilt in the optical disk. This suppresses a phase shift in the tracking error signal in the presence of a radial tilt, thereby improving the accuracy of tracking control.

In the four-piece light receiving element 56, the sum signal from the light receiving element 56, the sum of signals from the light receiving elements 56a and 56b, and the sum of signals from the light receiving elements 56c and 56d contribute to the tracking error detecting operation of the present invention. The light receiving element is divided into the four pieces 56a to 56d because the a stigmatism method is used as a focus detecting method, as in the case of Embodiment 1. Accordingly, in order to detect only a tracking error, the light receiving means 54 may be composed of a light receiving element divided into two parts in a direction parallel with the direction of the information tracks.

In this regard, a similar optical head can be implemented by introducing, instead of the arrangements of this embodiment, the approach applied to beams to detect a tracking error signal in Embodiments 2 and 3.

Figure 18:
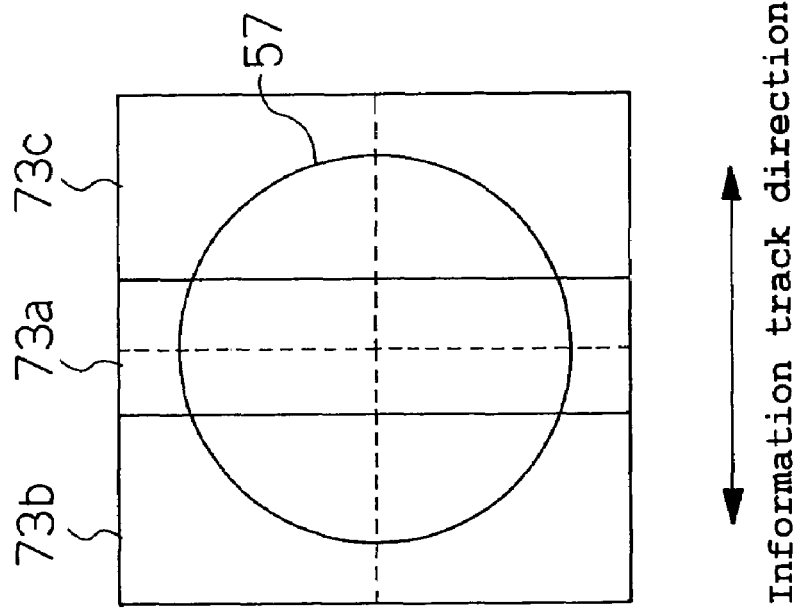
FIG. 18($a$) is a diagram showing another configuration of the light receiving means according to Embodiment 5 of the present invention.
Figure 18:
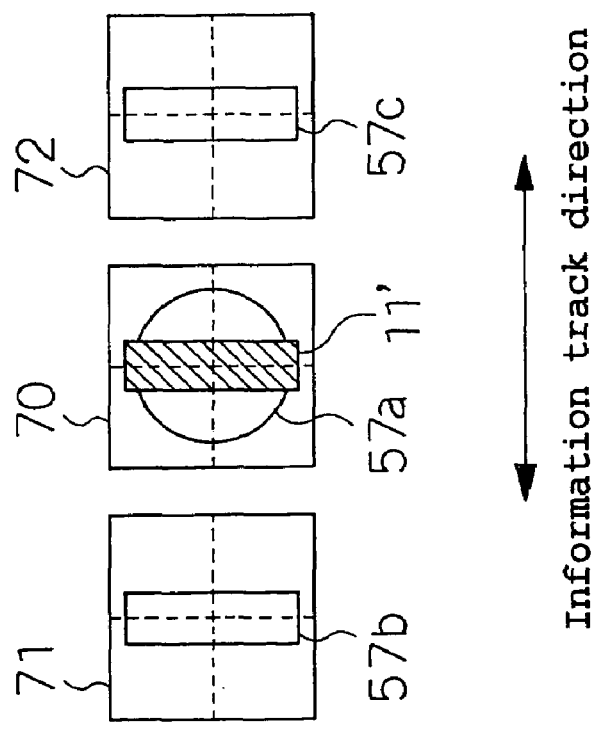

FIG. 18(a) is a diagram showing a configuration of the light receiving means 54, wherein the arrangements of the light receiving means 30 and optical means 6' according to Embodiment 2 are applied to the composite wobbled tracking method or composite continuous tracking method according to this embodiment. FIG. 18(b) is a diagram showing a configuration of the light receiving means 54, wherein the arrangement of the light receiving means 47 according to Embodiment 3 is applied to the composite wobbled tracking method or composite continuous tracking method according to this embodiment. In FIGS. 18(a) and 18(b), in order to mainly describe the operation of detecting a tracking error, the parting lines used to divide the light receiving element 57 into four areas because of the use of the astigmatism method as a focus detecting method are shown as dotted lines. The operation of these lines is omitted. The arrangement of the light receiving element for the main beams is also omitted.

As shown in FIG. 18(a), the light receiving means 54 has a two-piece light receiving element 80 (including light receiving elements 80a and 80b), a two-piece light receiving element 81 (including light receiving elements 81a and 81b), and a two-piece light receiving element 82 (including light receiving elements 82a and 82b) that receive beams 57a, 57b, and 57c, respectively, obtained by using the optical means 6' to divide the beam 57 into three. Further, that part of the beam 57 which corresponds to the optical function area 11' is not received. On the other hand, the beams 57b and 57c are composed of that part of the beam 57a which corresponds to the optical function area 11'.

The numbers of the light receiving elements are provided as signal names, and signals from the beams are mathematically expressed. Then, a signal from the beam 57 is expressed by:

$T = 80a + 80b + k7 \times (81a + 81b + 82a + 82b)$ (Equation 12)

$T1 = 80a + k7 \times (81a + 82a)$ (Equation 13)

$T2 = 80b + k7 \times (81b + 82b)$ (Equation 14)

$TE = T1 - T2$ (Equation 15)

(k7 is a fixed factor (k7<1))

Consequently, as with Embodiment 2, the effects of suppression of a phase shift in the tracking error signal can be arbitrarily set or changed by changing the value of the factor k7 to change the value for the signal obtained from the beam 57.

As shown in FIG. 18(b), the light receiving means 54 has six-piece light receiving elements 83a~83f each of which receives the beam 57.

The numbers of the light receiving elements are provided as signal names. Then, a signal from the beam 57 is expressed by:

$T = 83c + 83d + 83e + 83f + k8 \times (83a + 83b)$ (Equation 16)

$T1 = k8 \times 83a + (83c + 83e)$ (Equation 17)

$T2 = k8 \times 83b + (83d + 83f)$ (Equation 18)

$TE = T1 - T2$ (Equation 19)

(k8 is a fixed factor (k8<1))

Consequently, as with Embodiment 3, the effects of suppression of a phase shift in the tracking error signal can be arbitrarily set or changed by changing the value of the factor k8 to change the value for the signal obtained from the beam 57.

The optical head of the above embodiment detects a tracking error signal using the composite wobbled tracking method or composite continuous tracking method. The optical head of the present invention may use another method as long as the light receiving elements are each divided into two parts using an axis parallel with the information tracks so as to detect a tracking error on the basis of the push-pull method.

Embodiment 6

This embodiment is an example in which the conventional problems with a tilt in an optical disk are solved by applying the present invention to a conventional optical head having tracking error signal detecting means based on the push-pull method.

Figure 19:
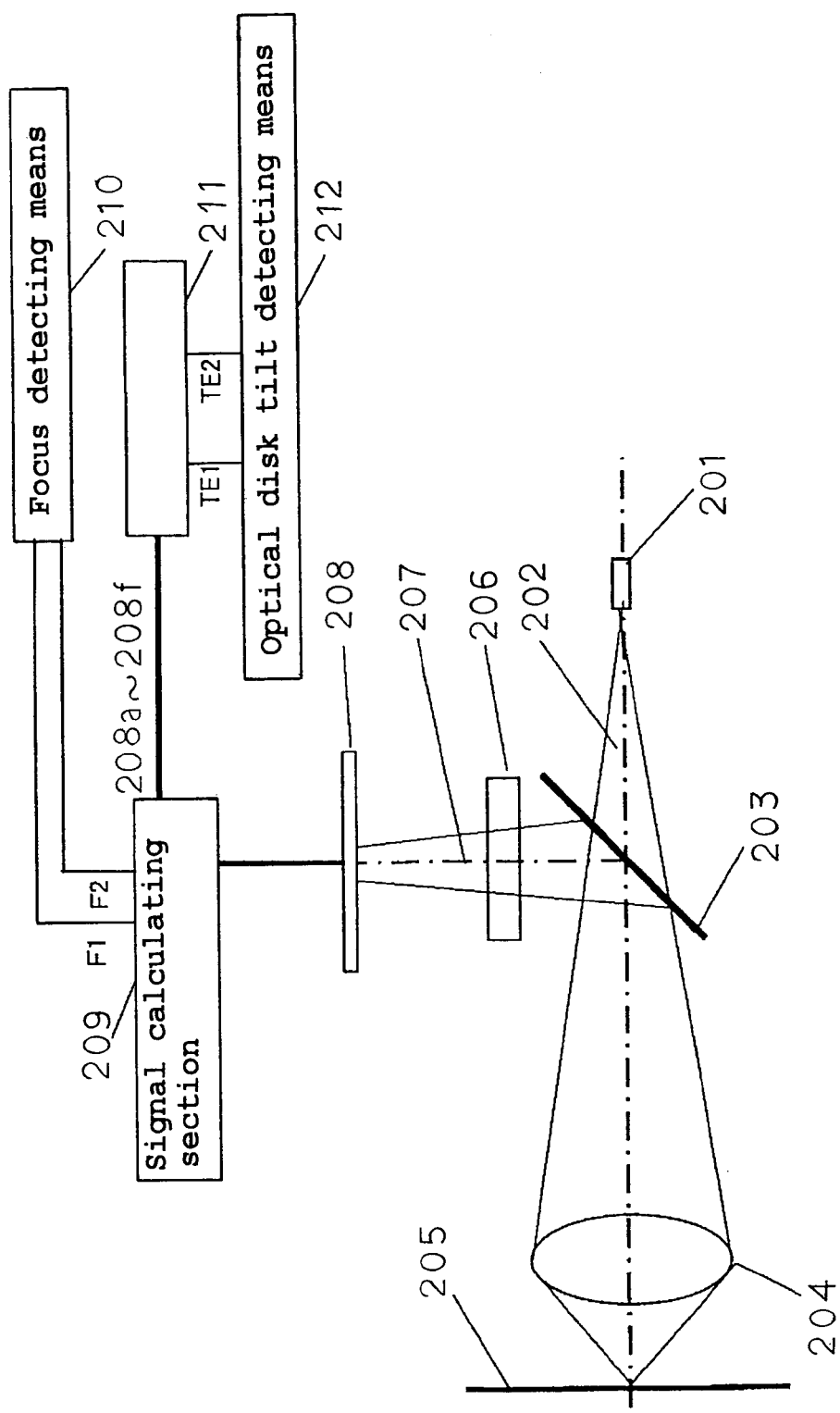
FIG. 19 is a diagram showing a configuration of an optical head according to Embodiment 6 of the present invention.

FIG. 19 is a diagram showing a configuration of an optical head according to Embodiment 6 of the present invention. In the drawing, reference numeral 201 denotes a light source, and reference numerals 202 and 207 denote optical axes of the optical head. Reference numeral 203 denotes a beam splitter that allows part of incident light to pass through, while reflecting part thereof. Reference numerals 204 and 205 denote an objective lens and an optical disk, respectively. Reference numeral 206 denotes a relay lens that guides light to light receiving elements. Reference numeral 208 denotes light receiving means, and reference numeral 209 denotes a signal calculating section that amplifies and calculates a received light signal. Reference numerals 210, 211, and 212 denote focus detecting means, tracking error signal detecting means, and optical disk tilt detecting means, respectively.

Figure 20:
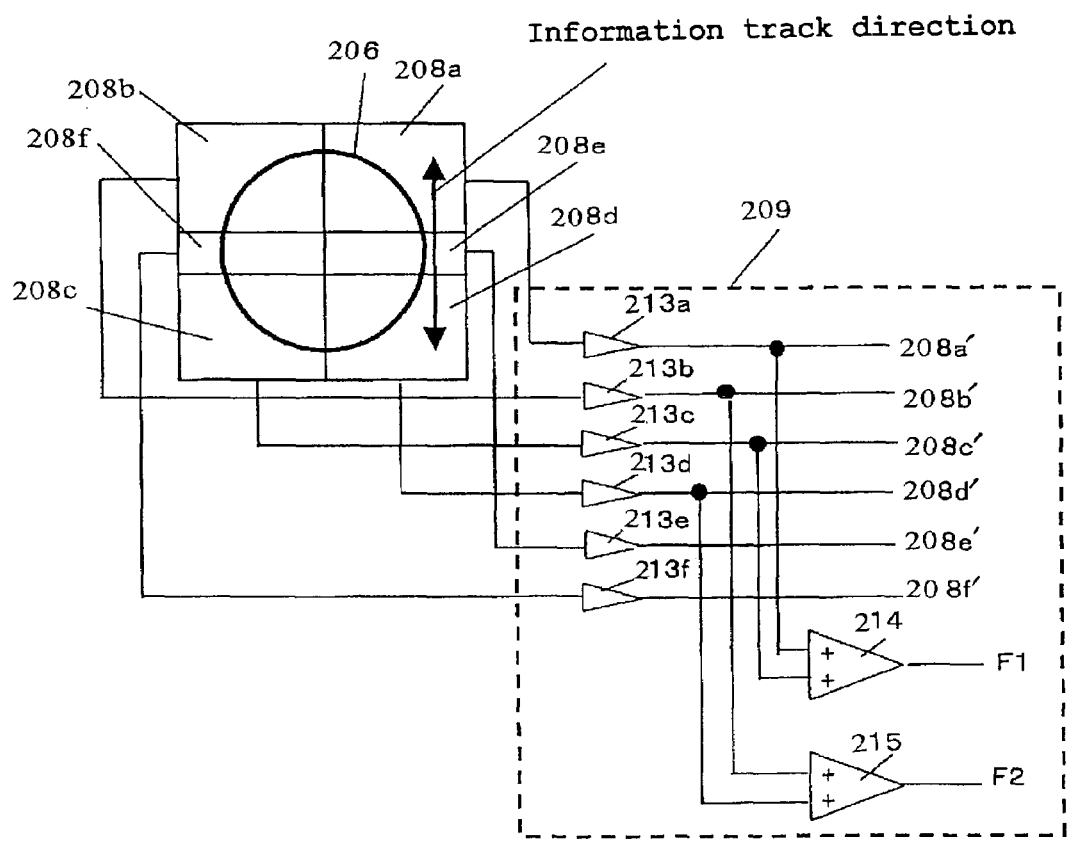
FIG. 20 is a diagram illustrating light receiving means and a signal calculating section according to Embodiment 6 of the present invention.

FIG. 20 is a diagram illustrating the light receiving means 208 and the signal calculating section 209. Reference numerals 208a to 208f denote light receiving areas of the light receiving means 208. Reference numerals 213a to 213f denote amplifiers. Reference numerals 214 and 215 denote addition amplifiers. Reference numeral 216 denotes the shape of a beam incident on the light receiving means 208.

Description will be given of the operation of the optical head constructed as described above according to this embodiment.

Light from the light source 201 is transmitted through the beam splitter 203 and condensed on the optical disk 205 by the objective lens 204. Light reflected by the optical disk 205 passes through the objective lens 204 again and is reflected by the beam splitter 203. The light is then incident on the relay lens 206. If for example, the astigmatism method is used as a focus detecting method, the relay lens 206 has refractive power equal to that of a cylindrical lens and thus sufficient to cause astigmatism, and guides beams to the light receiving means 208.

As shown in FIG. 20, the beam incident on the light receiving means 208 is received so as to be divided into six parts corresponding to the light receiving areas 208a to 208f. Each received light signal is calculated and amplified by the signal calculating section 209. Received light signals from the light receiving areas 208a to 208f are amplified by the amplifiers 213a to 213f and then output as signals 208a' to 208f'. Further, signals 208a' and 208c' are added together by the addition amplifier 214 and then output as a signal F1.

Signals 208b' and 208d' are added together by the addition amplifier 215 and then output as a signal F2.

The focus detecting means 210 detects a focus error signal using the signals F1 and F2. The tracking error signal detecting means 211 detects a signal TE1 as a first tracking error signal using the signals 208e' and 208f' from light received by the light receiving areas 208e and 208f as a first area. The tracking error signal detecting means 211 also detects a signal TE2 as a second tracking error signal using the signals 208a' to 208d' from light received by the light receiving areas 208a to 208d as a second area. As shown in the drawing, the first and second areas have a length larger than the diameter of the detected beam 216 in a direction perpendicular to the information tracks.

Since the tracking error signal according to this embodiment is a push-pull signal, the signals TE1 and TE2 are expressed by:

$$TE1 = 208e' - 208f' \quad \text{(Equation 20)}$$

$$TE2 = (208a' + 208d') - (208b' + 208c') \quad \text{(Equation 21)}$$

The optical disk tilt detecting means 212 detects a tilt in the optical disk by comparing the phase of the first tracking error signal TE1 with the phase of the second tracking error signal TE2.

Figure 21:
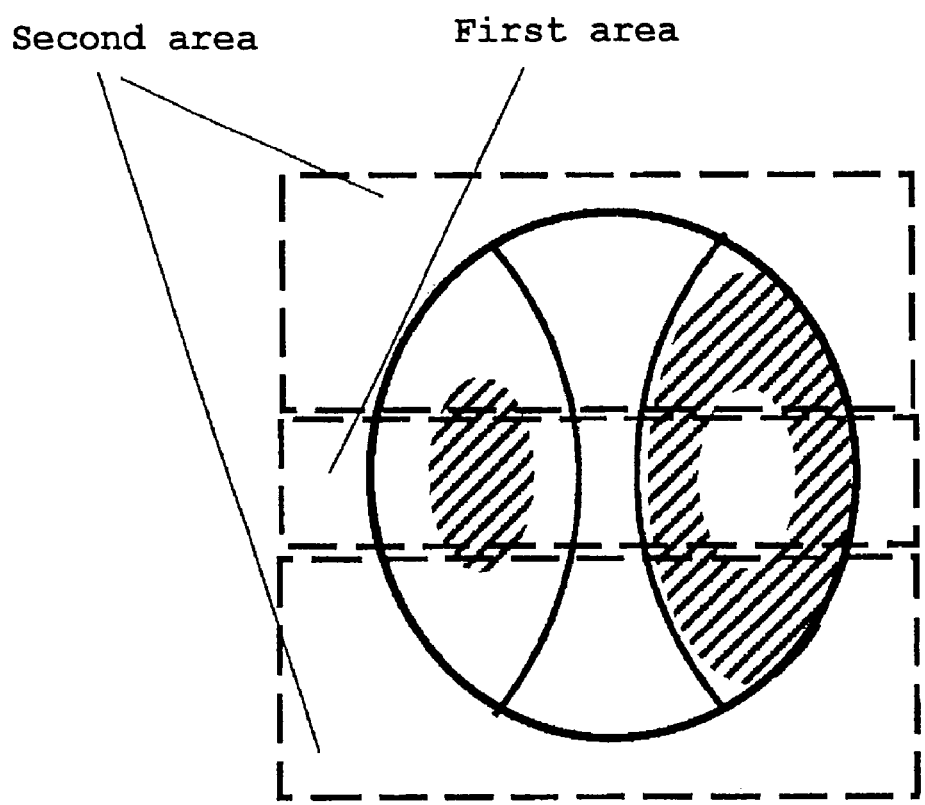
FIG. 21 is a diagram illustrating a first and second areas according to the present invention.

Next, optical disk tilt detection will be described in detail. FIG. 21 is a diagram showing that the first and second areas overlap the distribution of light intensity of the detected beam observed when the optical disk is tilted in its radial direction. As described in the prior art section, the distribution of light intensity of the beam exhibits asymmetry depending on the tilt in the optical disk. As shown in the drawing, most of the asymmetry is present in the first area. Thus, the effects of the tilt in the optical disk vary between the signal TE1, detected in the first area and the signal TE2, detected in the second area.

Figure 22:
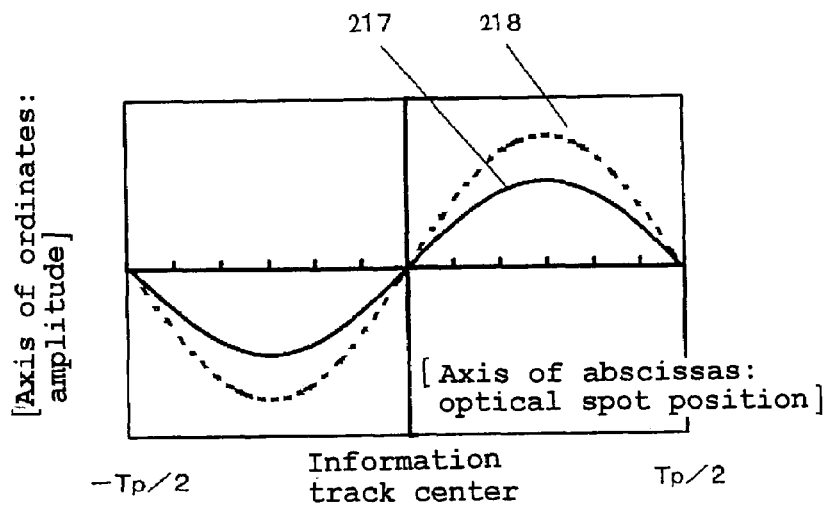
FIG. 22 is a diagram illustrating a first and second areas according to the present invention.
Figure 22:
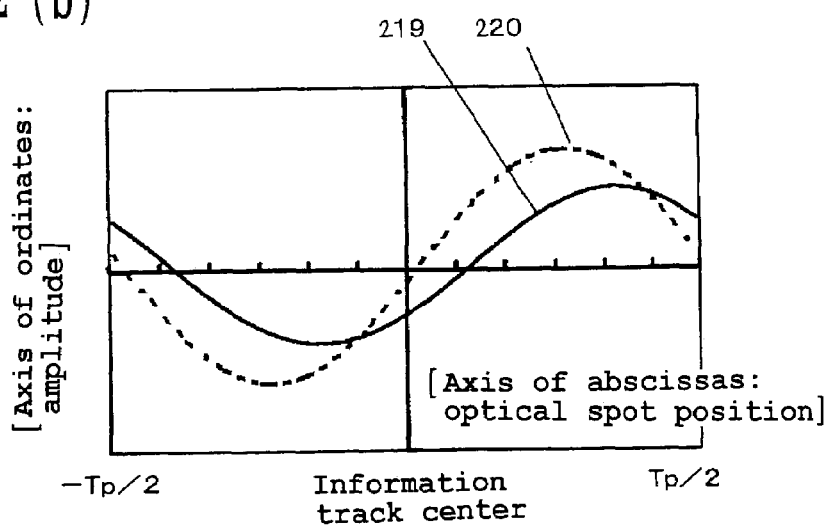

FIG. 22 shows the results of calculations of the waveforms of the signals TE1 and TE2. The conditions for the calculations are as follows: the wavelength of the light source is 660 nm, the numerical aperture of the objective lens is 0.6, the pitch of the contiguous grooves is 1.2 μm, the depth of the groove is equal to a one-eighth wavelength, and the thickness of the optical disk substrate is 0.6 mm. FIG. 22(a) shows the waveform obtained when the optical disk is not tilted. FIG. 22(b) shows the wave form obtained when the optical disk is tilted through 0.6° in its radial direction. In FIG. 22(a), reference numerals 217 and 218 denote the signals TE1 and TE2. In FIG. 22(b), reference numerals 219 and 220 denote the signals TE1 and TE2. The axis of abscissas of the chart indicates the position of an optical spot with respect to the center of the information track. In this case, the position of the optical spot refers to the peak position of the distribution of light intensity.

When the optical disk is not tilted, the phases of the two signals coincide with each other and the waveforms thereof each cross the axis of abscissas when the optical spot is located at the center of the information track, as in the case of the waveforms 217 and 218. However, when the optical disk is tilted, each waveform has its phase shifted and crosses the axis of abscissas at a position deviating from the center of the information track similarly as the waveforms 219 and 220. Since a tilt in the optical disk produces different levels of effects on the respective signals, the signal TE1, represented by the waveform 219, undergoes a larger phase shift than the signal TE2, represented by the waveform 220. Consequently, a tilt in the optical disk can be detected by comparing the phase of the first tracking error signal TE1 with the phase of the second tracking error signal TE2.

When the optical disk is tilted in the opposite direction, the direction of asymmetry of the distribution of light intensity of a beam is reversed as described for the conventional example. Accordingly, it can be easily assumed that the direction of the phase shift of a signal is reversed. Further, when the objective lens is moved in a direction perpendicular to the information tracks, the position of the beam 216 incident on the light receiving means 208 is moved, thus causing a DC offset in the push-pull signal. However, since the length of the first area in the direction perpendicular to the information tracks is larger than the diameter of the beam, that part of the distribution of light intensity which is contained in the first area remains unchanged even if the beam 216 moves.

Consequently, the effects of movement of the objective lens can be eliminated by allowing the signals TE1 and TE2 to pass through a highpass filter (not shown) composed of a typical electric circuit to eliminate a DC offset and subsequently comparing the phases of the two signals with each other. The phase comparison may be carried out using a general phase comparing method, e.g. a method of detecting a value for the signal TE1 when the signal TE2 crosses a reference voltage (corresponding to the axis of abscissas in FIG. 22).

Further, in the above description, the signal TE1 is used as a first tracking error signal, and the signal TE2 is used as a second tracking error signal. However, when the conventional push-pull signal, i.e. the signals 208a' to 208f' are used, a tilt in the optical disk can be detected using a signal obtained by the calculation $(208a' + 208d' + 208e') - (208b' + 208c' + 208f')$ as a first tracking error. This is because the conventional push-pull signal corresponds to the sum signal of the signals TE1 and TE2, so that a sufficiently detectable phase difference occurs between the first and second tracking error signals.

As described above, according to Embodiment 6 of the present invention, an optical head having tracking error signal detecting means based on the push-pull method can detect a tilt in an optical disk without an exclusive optical disk tilt detector by comparing the phases of a first and second tracking error signals with each other, which phases are detected by using the received light signals in the first and second areas. Further, according to this embodiment, a first and second areas have a length larger than the diameter of a detected beam in the direction perpendicular to the information tracks, and a tilt in the optical disk is detected by comparing the phases of signal waveforms with each other instead of detecting a DC signal. Consequently, a tilt in the optical disk can be detected without being substantially affected by a DC offset in the push-pull signal associated with movement of an objective lens.

The above operation uses all of the signals 208a', 208b', 208c', 208d', 208e', and 208f'. However, it is possible that only the signals 208a', 208b', 208e' and 208f' are used, while the signals 208c' and 208d' are not used. In contrast, it is also possible that only the signals 208c', 208d', 208e' and 208f' are used, while the signals 208a' and 208b' are not used.

Further, the tracking error signal detecting method based on the push-pull method may be the composite continuous tracking method or composite wobbled tracking method, described in the prior art section and Embodiment 5. Alternatively, another method may be used.

Embodiment 7

This embodiment is an example in which the problems with detection of a tilt in the optical disk are solved by applying the present invention to the conventional optical head based on the sample servo method.

Figure 23:
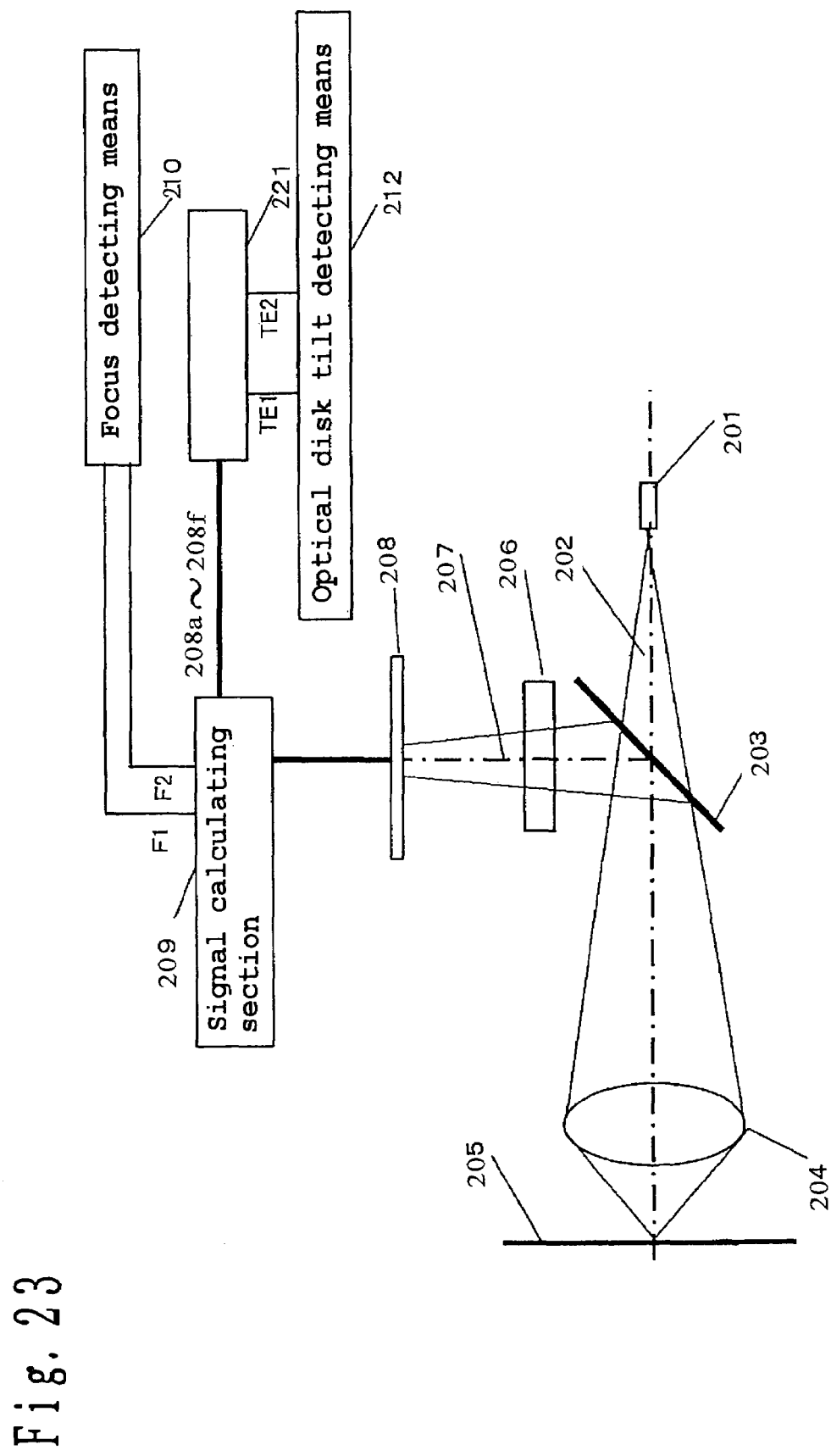
FIG. 23 is a diagram showing a configuration of an optical head according to Embodiment 7 of the present invention.

FIG. 23 is diagram of an optical head according to Embodiment 7 of the present invention. This drawing differs from FIG. 19 only in tracking error signal detecting means 211'. Description of the configuration of the optical head is omitted. The tracking error signal detecting means 211' is constructed to detect the signal TE1 as a first tracking error signal using the sum signal of the signals 208e' and 208f', output by the signal calculating section 209, shown in FIG. 20, while detecting the signal TE2 as a second tracking error signal using the sum signal of the signals 208a', 208b', 208c', and 208d'.

Figure 24:
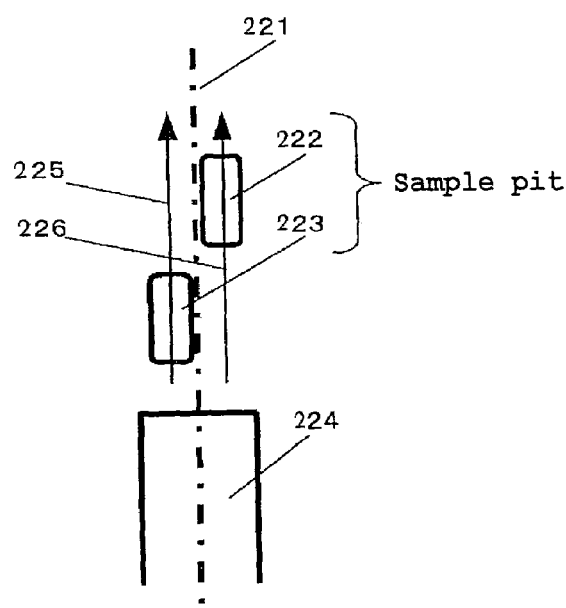
FIG. 24 is a diagram illustrating information tracks based on a sample servo method.

Now, the tracking detecting method will be described. FIG. 24 is a diagram illustrating an information track in the optical disk. In this embodiment, the optical head is based on the sample servo method and thus records or reproduces information on or from an optical disk having sample pits discontinuously formed on information tracks. The sample pits refer to pairs of two pits formed along the information tracks at fixed intervals and in which each pair of pits are formed at an equal distance from the center of the information track to detect a tracking error signal.

In FIG. 24, reference numerals 221 denotes a centerline of the information track, and reference numerals 222 and 223 denote the sample pits. Reference numeral 224 denotes an information area in which an address or information is recorded. Arrows 225 and 226 denote positions scanned by an optical spot. When the optical spot passes over the sample pit, a detected received light signal is modulated depending on the relative positions of the optical spot and the sample pit.

Figure 25:
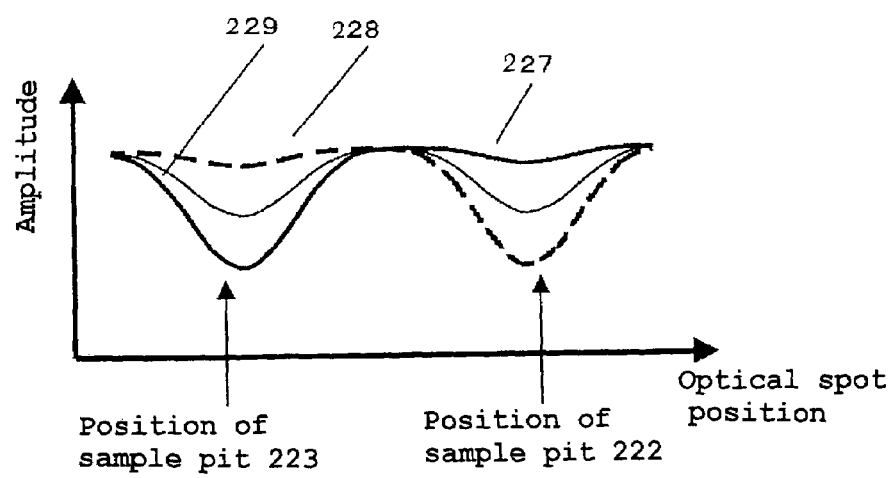
FIG. 25 is a chart illustrating tracking detection based on the sample servo method.

FIG. 25 is a chart showing how the signal is modulated. This figure shows the modulated waveform of the detected quantity of light, i.e. the waveform of the sum signal of the signals 208a' to 208f' for each optical spot scanned position. Reference numeral 227 denotes a signal waveform detected when the optical spot is scanned along the scanned position 225. Reference numeral 228 denotes a signal waveform detected at the scanned position 226. Reference numeral 229 denotes a signal waveform detected when the scanned position coincides with the centerline 221 of the information track. The tracking detection based on the sample servo method has been known to sample and hold detection signals when the optical spot passes over the sample pits 222 and 223 (two optical spot positions shown by arrows in FIG. 25) and to detect a tracking error signal on the basis of a difference between the two sampled and held detection signal values. Thus, the tracking error signal detecting means 211' executes a signal process similar to the conventional tracking detection based on the sample servo method to detect the signals TE1 and TE2 as a first and second tracking error signals, respectively.

Figure 26:
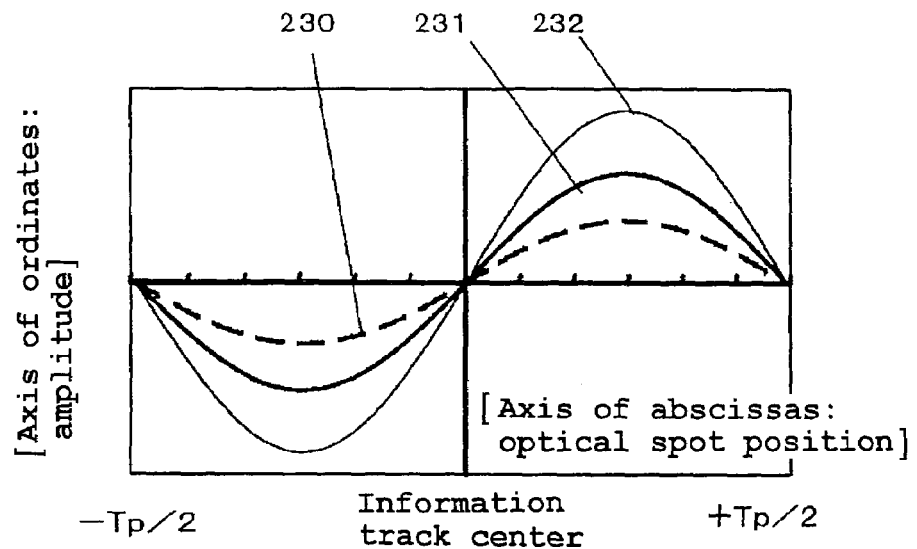
FIG. 26($a$) is a chart illustrating a first and second tracking error signals according to Embodiment 7 of the present invention.
Figure 26:
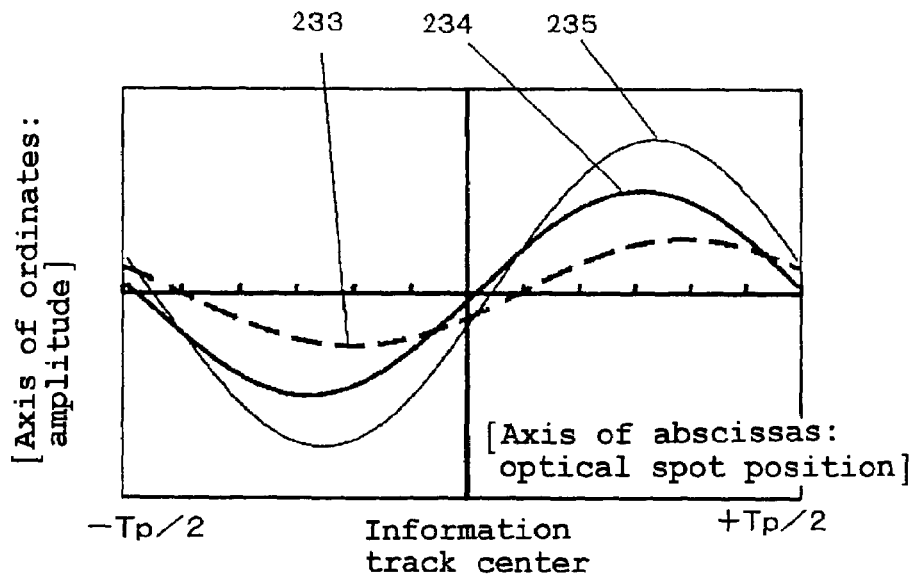

Next, the detection of a tilt in the optical disk will be described. FIGS. 26(a) and 26(b) show the results of simulation of the waveforms of the tracking error signals based on numerical calculations. FIG. 26(a) shows the waveform obtained when the optical disk is not tilted. FIG. 26(b) shows the waveform obtained when the optical disk is tilted through 0.6° in its radial direction. The conditions for the calculations are as follows: the wavelength of the light source is 660 nm, the numerical aperture of the objective lens is 0.6, the thickness of the substrate of the optical disk is 0.6 mm, the pitch of the information tracks is 1.2 µm, the length and width of the light receiving areas 208e and 208f, shown in FIG. 20, to the diameter of the beam shape 206 is 0.25.

In FIG. 26(a), reference numerals 230 and 231 denote the first and second tracking error signals TE1 and TE2. Reference numeral 232 denotes a tracking error signal detected using the sum signal of the signals 208a' to 208f'. Since the signal 232 is the same as the conventional tracking error signal based on the sample servo method, it will hereinafter be referred to as the "conventional tracking error signal". Further, in this drawing, the axis of abscissas indicates the position of the optical spot with respect to the center of the information track. Reference character Tp denotes the pitch of the information tracks. The three waveforms all cross the axis of abscissas when the optical spot coincides with the center of the information track.

In FIG. 26(b), reference numeral 233 denotes the first tracking error signal TE1, reference numeral 234 denotes the second tracking error signal TE2 and reference numeral 235 denotes the waveform of the conventional tracking error signal. Compared to FIG. 26(a), each waveform has its phase shifted and crosses the axis of abscissas at a position deviating from the center of the information track. The waveform 233 of the first tracking error signal has the largest phase shift. The waveform 235 of the conventional tracking error signal has the second largest phase shift. The waveform 234 of the second tracking error signal TE2 has the smallest phase shift.

Accordingly, a tilt in the optical disk can be detected by comparing the phases of the second tracking error signal TE2 with first tracking error signal TE1 or conventional tracking error signal. A phase difference occurs in each signal because also when the optical spot passes over the sample pit, the distribution of light intensity of a detected beam is asymmetric owing to the effects of coma aberration caused by a tilt in the optical disk and because the first and second areas contain different amounts of asymmetric light intensity distribution, as discussed for Embodiment 6 with reference to FIG. 21.

The optical head of this embodiment carries out tracking detection based on the sample servo method and thus detects a tracking error signal using the sum signal of detected signals. Accordingly, even if the objective lens is moved in the direction perpendicular to the information tracks, no offset occurs in the tracking error signal. Further, the first and second areas have a length larger than the diameter of a detected beam in the direction perpendicular to the information tracks, so that the amount of light intensity distribution contained in each area remains unchanged in spite of movement of the beam. Therefore, detection of a tilt in the optical disk can be carried out without being affected by movement of the objective lens.

Further, the second tracking error signal TE2 does not have its phase substantially shifted even with a tilt in the optical disk. Accordingly, a tilt in the optical disk can also be detected by using the second tracking error signal for tracking control and detecting a value for the first tracking error signal TE1 or conventional tracking error signal. Thus, the tracking control fixes the optical spot to the information tracks. Accordingly, the phases of the two signals can be compared with each other using a detecting method similar to detection of DC components of the signals.

As described above, according to this embodiment, an optical head based on the sample servo method can stably detect a tilt in the optical disk without being affected by movement of the objective lens without an exclusive detector for detecting a tilt in the optical disk by comparing the phase of a first tracking error signal with the phase of a second tracking error signal.

Embodiment 8

This embodiment is an example in which the problems with detection of a tilt in the optical disk are solved by applying the present invention to the conventional optical head based on the three-beam tracking method.

Figure 27:
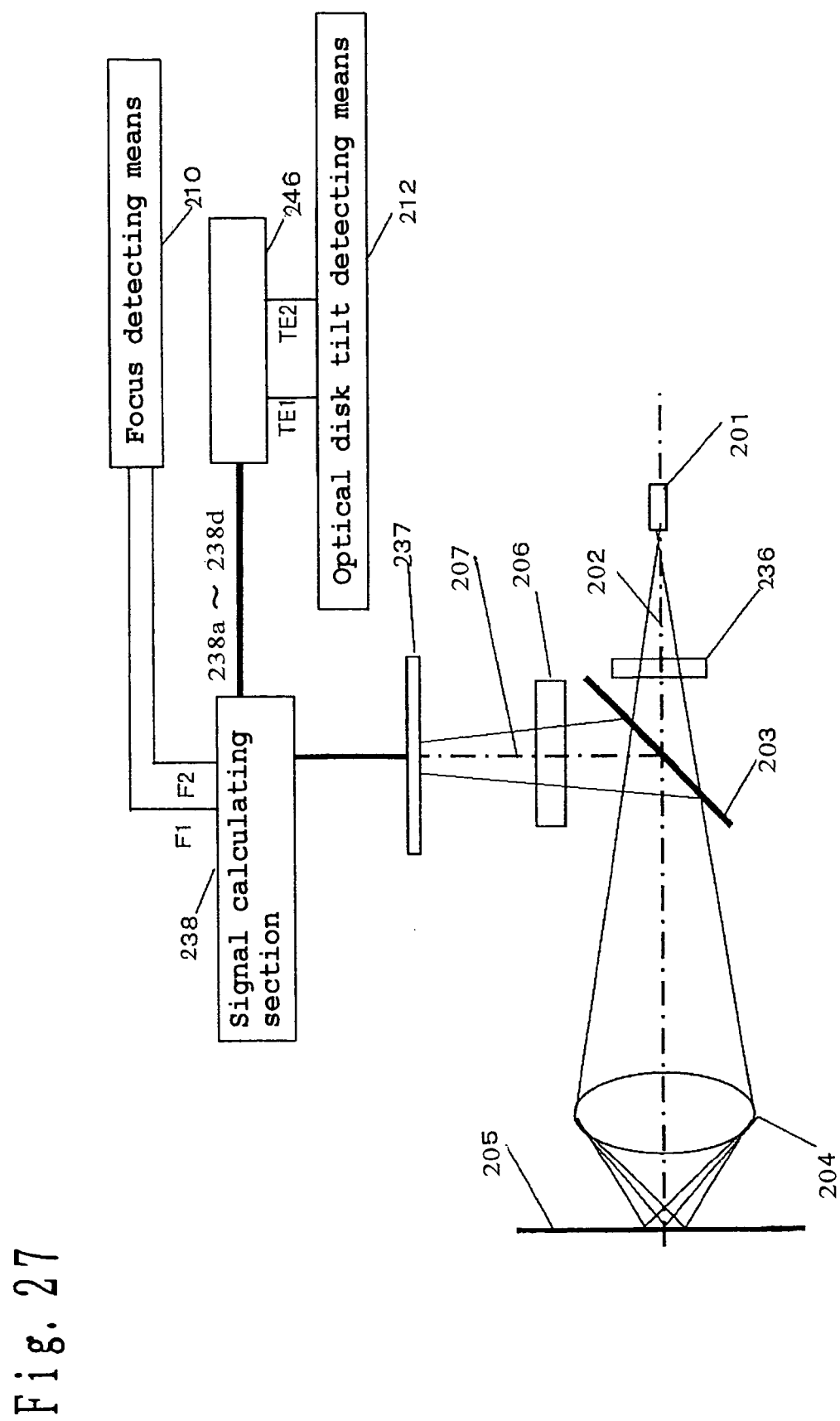
FIG. 27 is a diagram showing the configuration of an optical head according to Embodiment 8 of the present invention.

FIG. 27 is a diagram showing a configuration of an optical head according to Embodiment 8 of the present invention. The same components as those in FIG. 19 are denoted by the same reference numerals, and description thereof is omitted. Reference numeral 236 denotes a diffraction element that branches light into a main beam and two subbeams. Reference numerals 237, 238, and 246 denote light receiving means, a signal calculating section that amplifies and calculates signals, and tracking error signal detecting means, respectively.

Figure 28:
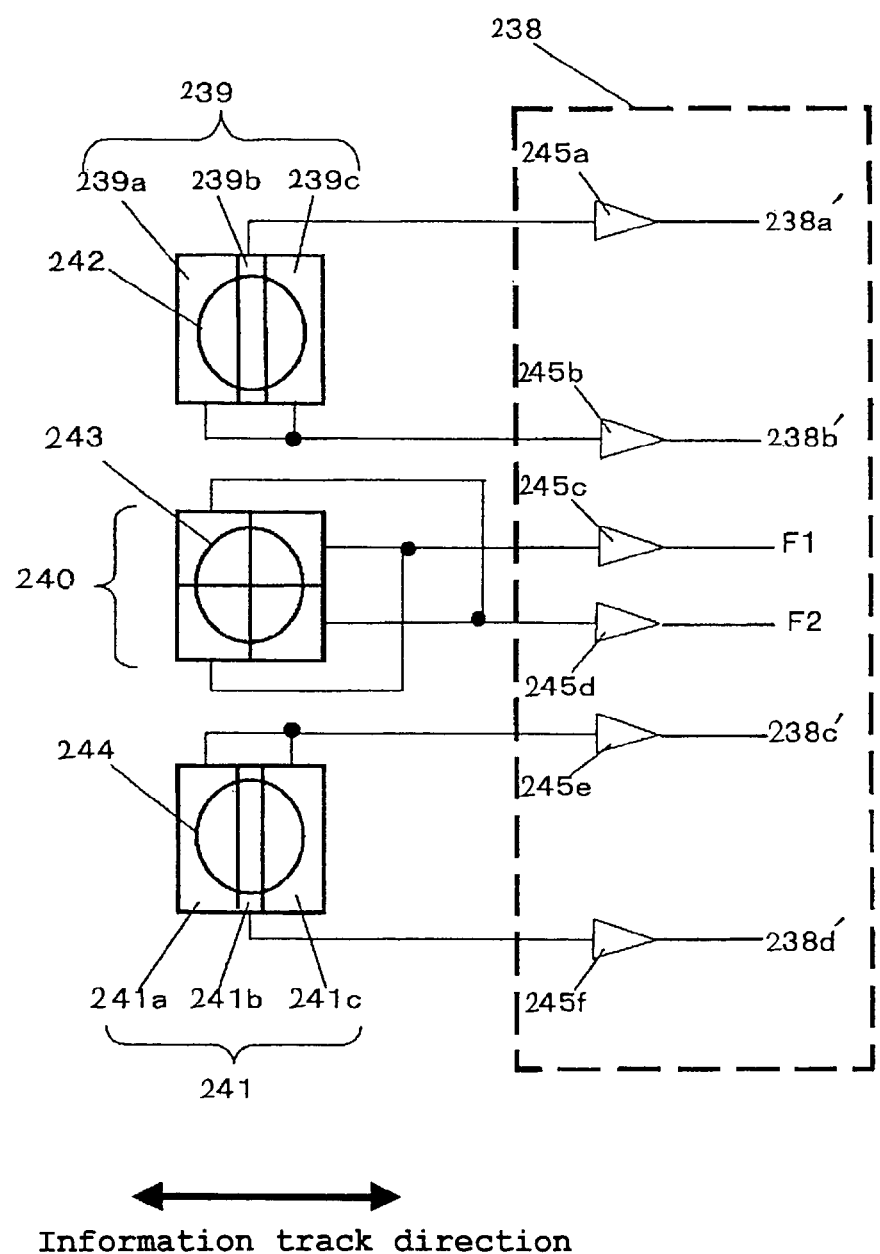
FIG. 28 is a diagram illustrating light receiving means and a signal calculating section according to Embodiment 8 of the present invention.

FIG. 28 is a diagram illustrating light receiving elements of the light receiving means 237, and the signal calculating section 238. Reference numerals 239 and 241 denote three-piece light receiving elements, and reference numerals 239a to 239c and 241a to 241c denote light receiving areas of the three-piece light receiving elements. Reference numeral 240 denotes a four-piece light receiving element. Reference numerals 242 and 244 denote beams of the subbeams, and reference numeral 243 denotes a beam of the main beam. Reference numerals 245a to 245f and 238a' to 238d' denote amplifiers and signals output by the signal calculating section, respectively.

Description will be given of the operation of the optical head constructed as described above according to this embodiment.

Light from the light source 201 is diffracted by the diffraction element 236 to generate a main beam as zero-order diffracted light and two subbeams which are a first and second subbeams as positive and negative first-order diffracted light. These three beams are transmitted through the beam splitter 203 and condensed on the optical disk 205 by the objective lens 204 to form an optical spot of the main beam on the optical axis 202 of the optical head and optical spots of the two subbeams above and below the optical axis 202 in the drawing.

Reflected beams from the respective optical spots reflected by the optical disk 205 pass through the objective lens 204 again, are reflected by the beam splitter 203, and are incident on the relay lens 206. If for example, the astigmatism method is used as a focus detecting method, the relay lens 206 has refractive power equal to that of a cylindrical lens and thus sufficient to cause astigmatism, and guides the beams to the light receiving means 237. As shown in FIG. 28, the main beam is incident on the four-piece light receiving element 240, the first subbeam is incident on the three-piece light receiving element 239, and the second subbeam is incident on the three-piece light receiving element 241. The main beam 243 incident on the four-piece light receiving element 240 is received so as to be divided into four parts. A calculation is executed on the basis of the wire connection shown in the drawing to detect signals F1 and F2.

Further, the light receiving areas of the light receiving elements 239 and 241 are arranged to receive the incident beam so as to divide it into three parts corresponding to the first and second areas similarly to the cases of Embodiments 6 and 7. The first subbeam is divided into three parts. The light receiving areas 239b receives light corresponding to the first area. The light receiving areas 239a and 239c receive light corresponding to the second area. The second subbeam is divided into three parts. The light receiving area 241b receives light corresponding to the first area. The light receiving areas 241a and 241c receive light corresponding to the second area.

After the calculation through the illustrated wire connection, the beams are processed by the amplifiers 245a, 245b, 245e, and 245f to detect signals 238a' to 238d'. The signal 238a' is a received light signal from the first subbeam corresponding to the first area. The signal 238b' is a received light signal from the first subbeam corresponding to the second area. The signal 238d' is a received light signal from the second subbeam corresponding to the first area. The signal 238c' is a received light signal from the second subbeam corresponding to the second area.

The tracking error signal detecting means 246 is constructed to detect the signal TE1 as a first tracking error signal using the signals 238a' and 238d', while detecting the signal TE2 as a second tracking error signal using the signals 238b' and 238c'. Thus, the signals TE1 and TE2 are expressed by:

$$TE1 = 238a' - 238d' \quad \text{(Equation 22)}$$

$$TE2 = 238b' - 238c' \quad \text{(Equation 23)}$$

The optical disk tilt detecting means 212 detects a tilt in the optical disk by comparing the phases of the signals TE1 and TE2 as the first and second tracking error signals with each other.

Figure 29:
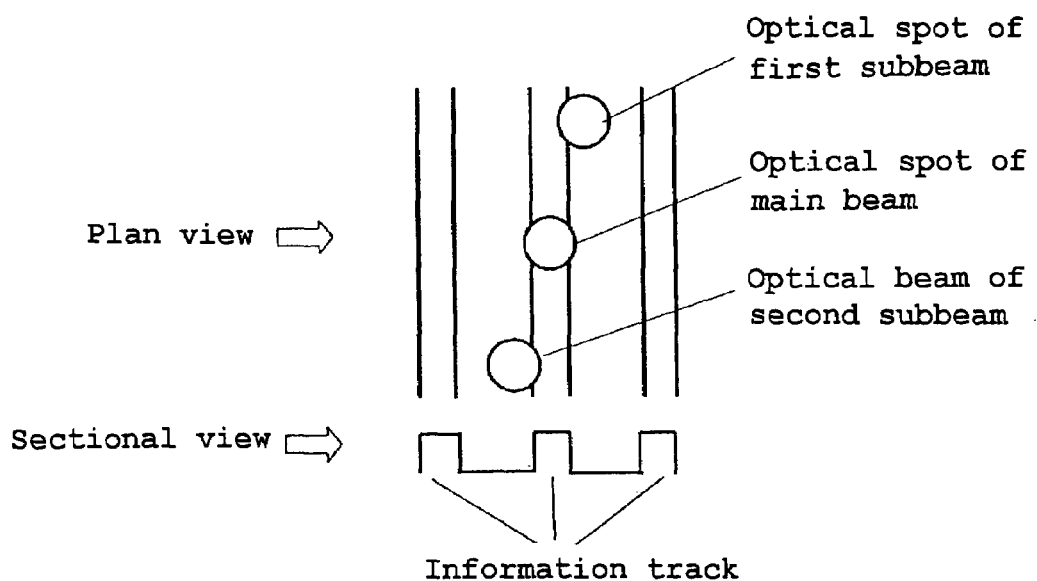
FIG. 29 is a diagram illustrating an arrangement of optical spots of a main beam and subbeams according to Embodiment 8 of the present invention.

Next, detection of a tilt in the optical disk will be described in detail. FIG. 29 is a diagram showing how the optical spots of the two main beam and subbeams are arranged relative to the information tracks. As shown in the drawing, the optical spots of the two subbeams are each arranged at a distance equal to a ¼ track pitch from the optical spot of the main beam in the direction perpendicular to the information tracks.

Figure 30:
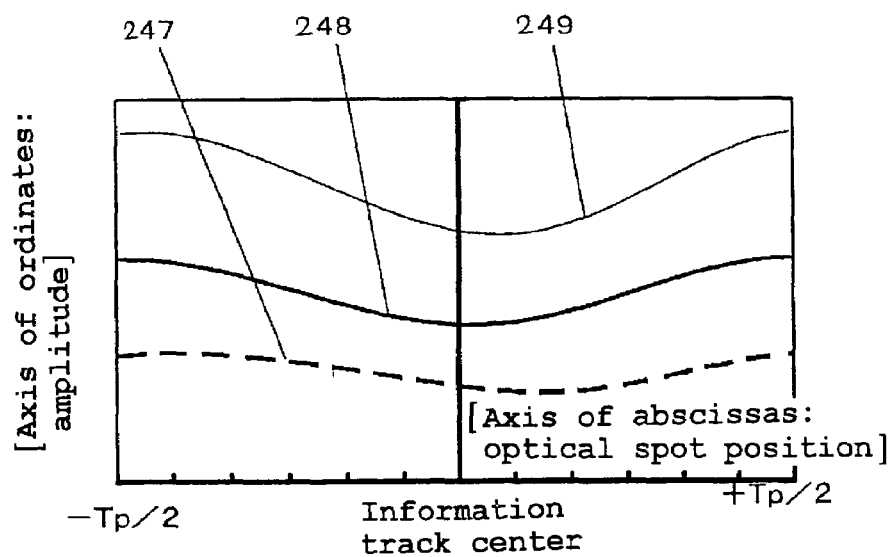
FIG. 30 is a diagram illustrating signals of subbeams according to Embodiment 8 of the present invention.

FIG. 30 shows the results of simulation of signal waveforms based on numerical calculations obtained when the optical spot of the first subbeam is scanned in the direction perpendicular to the information tracks. Reference numerals 247 and 248 denote the waveforms of the signals 238a' and 238b' respectively. Reference numeral 249 denotes the waveform of the sum signal of the signals 238a' and 238b'. The conditions for the calculations are as follows: the numerical aperture of the objective lens is 0.6, the wavelength of the light source is 660 nm, the pitch of the information tracks is 1.2 µm, the width of the contiguous grooves as information tracks is 0.4 µm, the depth of the groove is equal to a ⅛ wavelength, and the optical disk is tilted through 0.6° in its radial direction.

The information tracks are composed of narrow grooves. Accordingly, if the optical disk is not tilted, each signal waveform should have a minimum value when the optical spot is located at the center of the information track. However, in FIG. 30, because of a tilt in the optical disk, the phase shifts of each signal waveform occur. The waveform 247 undergoes the largest phase shift. The waveform 249 undergoes the second largest phase shift. The waveform 248 undergoes the smallest phase shift. Here, the optical spot position refers to the peak position of light intensity of the optical spot.

As can be seen in FIG. 29, the optical spot of the second subbeam deviates from the optical spot of the first subbeam by a ½ track pitch. Accordingly, each signal from the second subbeam has a phase difference from any signal from the first subbeam, the difference corresponding to the ½ track pitch. However, a phase shift in a signal caused by a tilt in the optical disk is attributed to the asymmetry of the distribution of light intensity of a detected beam. Consequently, a phase shift occurs in both signals from the first and second subbeams.

Thus, the first tracking error signal TE1, detected using the signal 238a' from the first subbeam and the signal 238d' from the second subbeam, and the second tracking error signal TE2, detected using the signal 238b' from the first subbeam and the signal 238c' from the second subbeam, both have a phase difference corresponding to a tilt in the optical disk as with the waveforms 219 and 220 of the two tracking error signals in Embodiment 6, shown in FIG. 22(b). Thus, the tilt in the optical disk can be detected by comparing the phases of the signals TE1 and TE2 as a first and second tracking error signals with each other.

In the above description, the first tracking error signal is detected using the signals 238a' and 238d', detected in the first area. However, as shown in FIG. 30, the waveform 249 also has a phase difference from the waveform 248. Thus, a tilt in the optical disk can also be detected by detecting a first tracking error signal using the sum signal of signals detected in the first and second areas, i.e. the sum signal of the signals 238a' and 238b' and the sum signal of the signals 238c' and 238d'.

Further, in the tracking detection based on the three-beam tracking method, signals are detected utilizing the fact that the light intensity of the subbeams is modulated by the information tracks. Accordingly, even if the objective lens is moved in the direction perpendicular to the information tracks, no offset occurs in the tracking error signal. Further, the first and second areas have a length larger than the diameter of a detected beam in the direction perpendicular to the information tracks, so that the amount of light intensity distribution contained in each area remains unchanged in spite of movement of the beam. Therefore, detection of a tilt in the optical disk can be carried out without being affected by movement of the objective lens.

As described above, according to this embodiment, an optical head based on the three-beam tracking method can stably detect a tilt in the optical disk without being affected by movement of the objective lens without an exclusive detector for detecting a tilt in the optical disk by comparing the phase of a first tracking error signal with the phase of a second tracking error signal.

Embodiment 9

This embodiment is an example of signal processing that improves the suitability of the characteristics of signals detected by the optical head of each of the above described embodiments, the signals depending on a tilt of the optical disk. In the following description, this signal processing means is contained in the arrangement of each of the optical heads described previously, e.g. the optical disk tilt detecting means 212, shown in FIG. 23.

A tilt in the optical disk is detected by measuring a phase difference between the first tracking error signal TE1 and the second tracking error signal TE2 as described previously. The measurement of a phase difference will be described with reference to FIG. 26(b). In this drawing, the waveform 233 indicates the signal TE1, the waveform 234 indicates the signal TE2, and the waveform 235 indicates the sum signal of the signals TE1 and TE2. However, if a signal value for the waveform 233 or 235 is measured when the waveform 234 crosses the axis of abscissas, it is positive or negative depending on the direction of a phase difference from the waveform 234. Thus, this measurement constitutes a phase difference measuring method.

Figure 31:
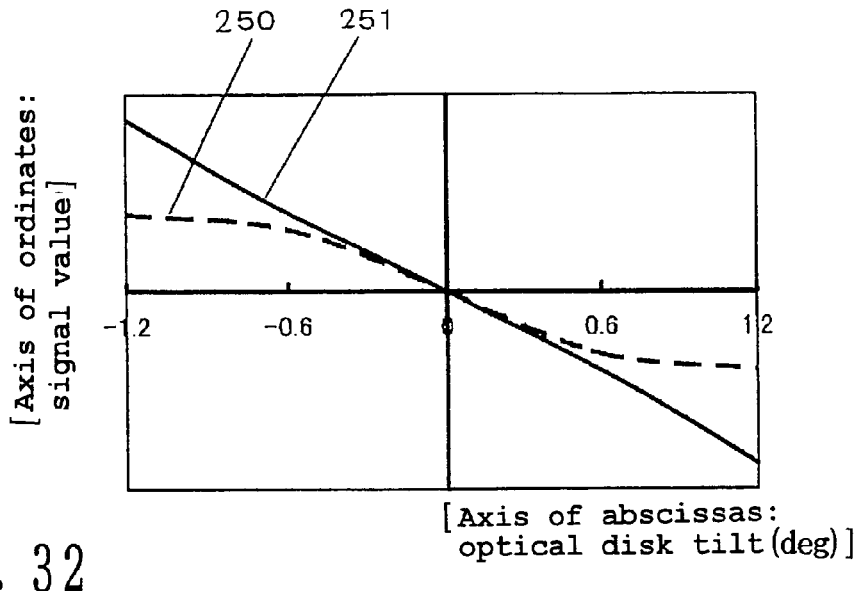
FIG. 31 is a diagram illustrating effects of Embodiment 9 of the present invention.

FIG. 31 shows the results of calculations of the relationship between the signal value corresponding to a phase difference, measured as described above, and the amount of a tilt in the optical disk. The conditions for the calculations are similar to those for the calculations in FIG. 26. The axis of abscissas indicates the amount of a tilt in the optical disk, whereas the axis of ordinates indicates the signal value. This graph has been created by multiplying the signal value by an appropriate constant for scaling. Reference numeral 250 denotes the results of calculations for the signal value. Reference numeral 251 denotes the results of calculations for the signal value normalized using an amplitude value of the signal TE1. The signal TE1 has an amplitude decreasing with increasing magnitude of a tilt in the optical disk. Accordingly, the curve 250 in the graph has poor linearity, but the linearity of the curve 251 in the graph has been drastically improved by normalization using the amplitude value of the signal TE1. Specifically, general electric signal processing means can be used to normalize the signal value on the basis of the amplitude value. Thus, description thereof is omitted.

As described above, an optical disk tilt detection signal that exhibits high linearity relative to the amount of a tilt in the optical disk is obtained by measuring the signal value of the signal TE1 when the signal TE2 crosses the reference voltage and normalizing the signal value using the amplitude value of the signal TE1 to obtain an optical disk tilt detection signal.

Embodiment 10

This embodiment is an example of an optical head that generates a control signal suitable for tracking control using the first and second tracking error signals detected by the optical heads of Embodiments 6 to 9, described previously, as well as the optical disk tilt detection signal.

Figure 32:
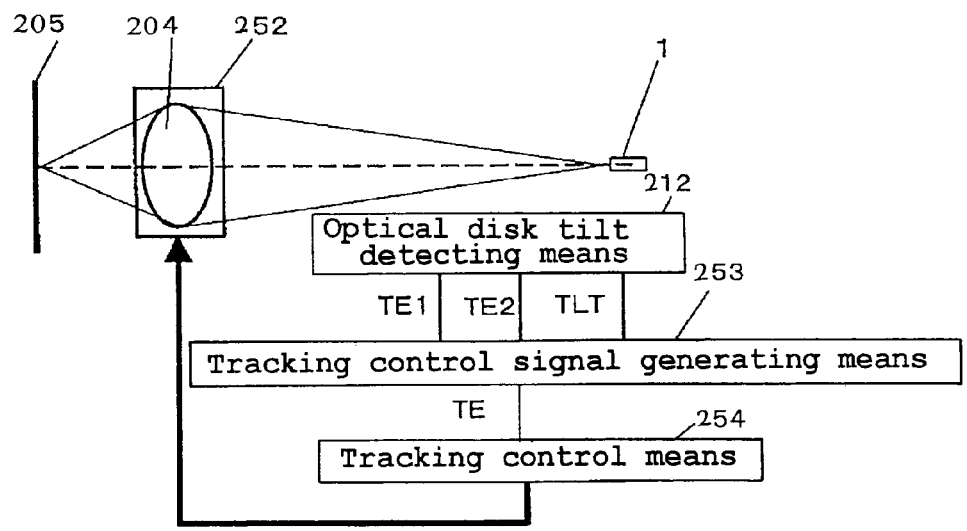
FIG. 32 is a diagram showing a configuration of an optical head according to Embodiment 10 of the present invention.

FIG. 32 is a diagram illustrating a configuration of an optical head according to Embodiment 10 of the present invention. Components common to the embodiments described previously are denoted by the same reference numerals, and description thereof is omitted except for components required for description. Reference numerals 252, 253, and 254 denote objective lens moving means, tracking control signal generating means, and tracking control means respectively. The optical disk tilt detecting means 212 outputs an optical disk tilt detection signal TLT, and the signals TE1 and TE2, the first and second tracking error signals. These three signals are input to the tracking control signal generating means 253, which then calculates these signals. The tracking control signal generating means 253 outputs a tracking control signal TE, which is then used as a control signal for the tracking control means 254. The tracking control means 254 drives the objective lens moving means 252 to control the position of the objective lens 204 so that an optical spot follows the center of the information track.

Figure 33:
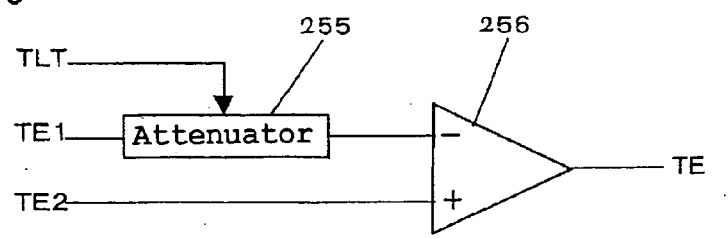
FIG. 33 is a diagram illustrating tracking control signal generating means according to Embodiment 10 of the present invention.

FIG. 33 is a diagram illustrating a configuration of the tracking control signal generating means 253. Reference numeral 255 denotes an attenuator that attenuates the amplitude of signals, and reference numeral 256 denotes a differential amplifier. The attenuator 255 allows an attenuation factor for an input signal to be adjusted depending on the magnitude of the signal TLT, thereby varying the amplitude of the signal TE1. The differential amplifier 256 subtracts the signal TE1 with its amplitude changed from the signal TE2 to output the signal TE.

This embodiment, constructed as described above, will be described with reference to FIG. 26(*b*). The waveform 233 corresponds to the signal TE1. The waveform 234 corresponds to the signal TE2. Since these two waveforms have a phase difference, the waveform 233 can be subtracted from the waveform 234 to generate a signal waveform corresponding to the waveform 234 moved leftward. Thus, by adjusting the amplitude of the waveform 233 and subtracting the adjusted waveform 233 from the waveform 234, the waveform obtained can have its phase arbitrarily changed.

That is, the signal TE having an arbitrary phase difference from the signal TE2 can be generated by causing the attenuator 255 to adjust the amplitude of the signal TE1 depending on the signal TLT and causing the differential amplifier 256 to subtract the adjusted signal TE1 from the signal TE2. Thus, the point at which the waveform of the signal TE crosses the reference voltage can be arbitrarily set around the center of the information track. A tracking control position can be arbitrarily set by using the signal TE for tracking control.

Consequently, by properly adjusting the attenuation factor for the attenuator 255 beforehand, which factor is adjusted by the signal TLT, tracking control can be carried out while using the signal TLT to correct the positional deviation of the optical spot position from the information track center, caused by a tilt in the optical disk.

As described above, the optical head of this embodiment can provide accurate tracking control by detecting a radial tilt in the optical disk and using the corresponding optical disk tilt detection signal to correct the deviation of the optical spot position from the information track center, caused by the tilt in the optical disk.

Further, the tracking control position is conventionally adjusted by applying a DC offset to a tracking control signal. As a result, the control system is disadvantageously unstable. However, according to this embodiment, stable tracking control is possible because the control position can be adjusted by shifting the phase of the control signal instead of applying a DC offset.

If a tracking control signal is generated by using the whole range of received signals as in the prior art, modifications for a radial tilt using such a control signal must be more than those using a control signal obtained in the above embodiments on the basis of a tilt in the optical disk.

Embodiment 11

This embodiment is an example in which the present invention is applied to an optical head that detects a tangential tilt in the optical disk.

FIG. 32 is a diagram illustrating a configuration of an optical head according to Embodiment 10 of the present invention. Components common to the embodiments described previously are denoted by the same reference numerals, and description thereof is omitted except for components required for description. Reference numerals 252, 253, and 254 denote objective lens moving means, tracking control signal generating means, and tracking control means respectively. The optical disk tilt detecting means 212 outputs an optical disk tilt detection signal TLT, and the signals TE1 and TE2, the first and second tracking error signals. These three signals are input to the tracking control signal generating means 253, which then calculates these signals. The tracking control signal generating means 253 outputs a tracking control signal TE, which is then used as a control signal for the tracking control means 254. The tracking control means 254 drives the objective lens moving means 252 to control the position of the objective lens 204 so that an optical spot follows the center of the information track.

Figure 34:
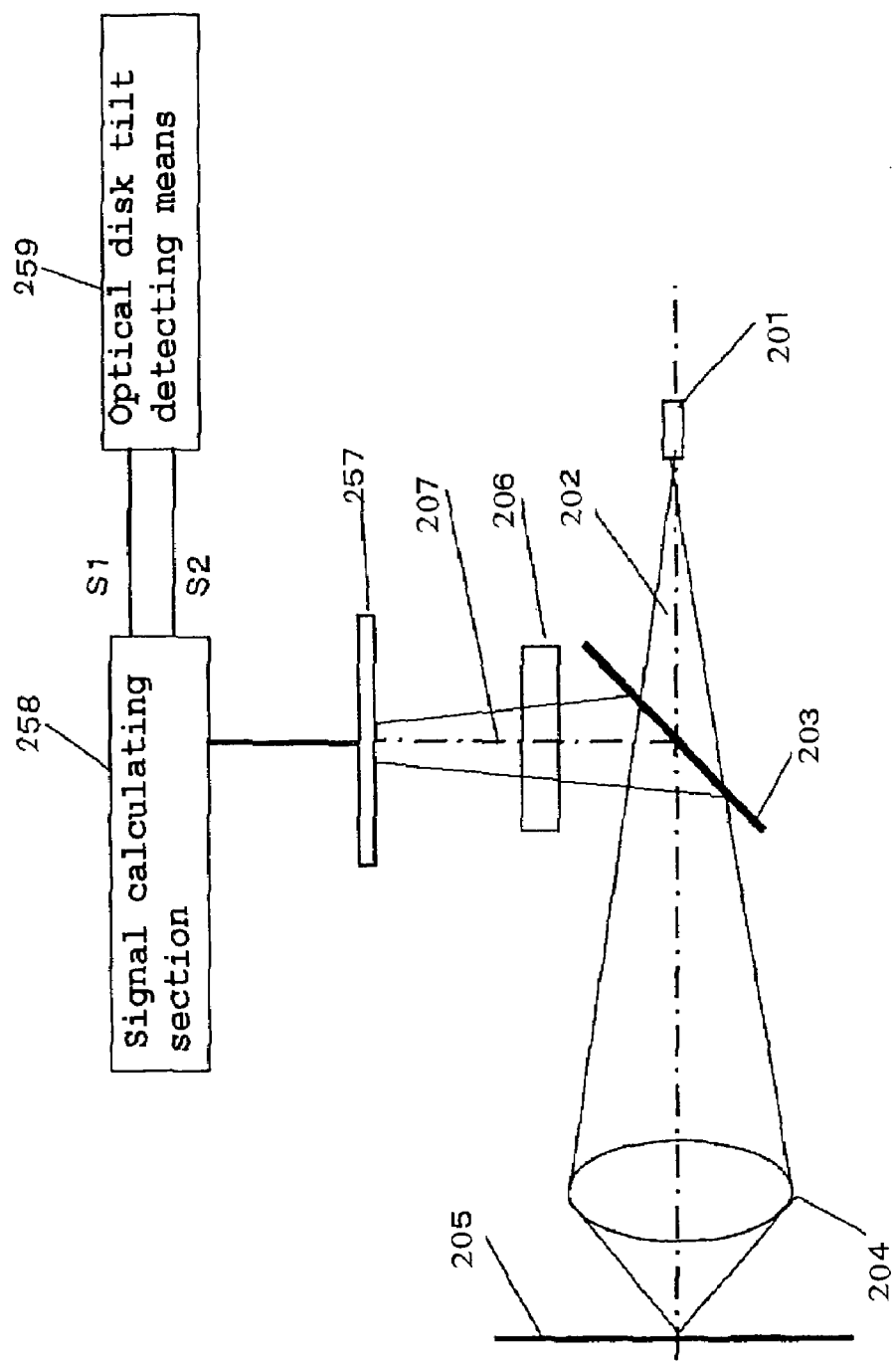
FIG. 34 is a diagram showing a configuration of an optical head according to Embodiment 11 of the present invention.

FIG. 34 is a diagram showing an optical head according to Embodiment 11 of the present invention. The same components as those in the embodiments described previously are denoted by the same reference numerals. Further, the focus detecting means and the tracking error signal detecting means are not shown because they are similar to those used in the embodiments described previously. Reference numerals 257, 258, and 259 denote light receiving means, a signal calculating section, and optical disk tilt detecting means respectively. Description of the operation performed after light from the light source 1 is reflected by the optical disk 205 and before the light is guided to the light receiving means 257 is omitted because it is similar to that for the embodiments described previously. Further, the optical disk has information tracks formed of pits.

Figure 35:
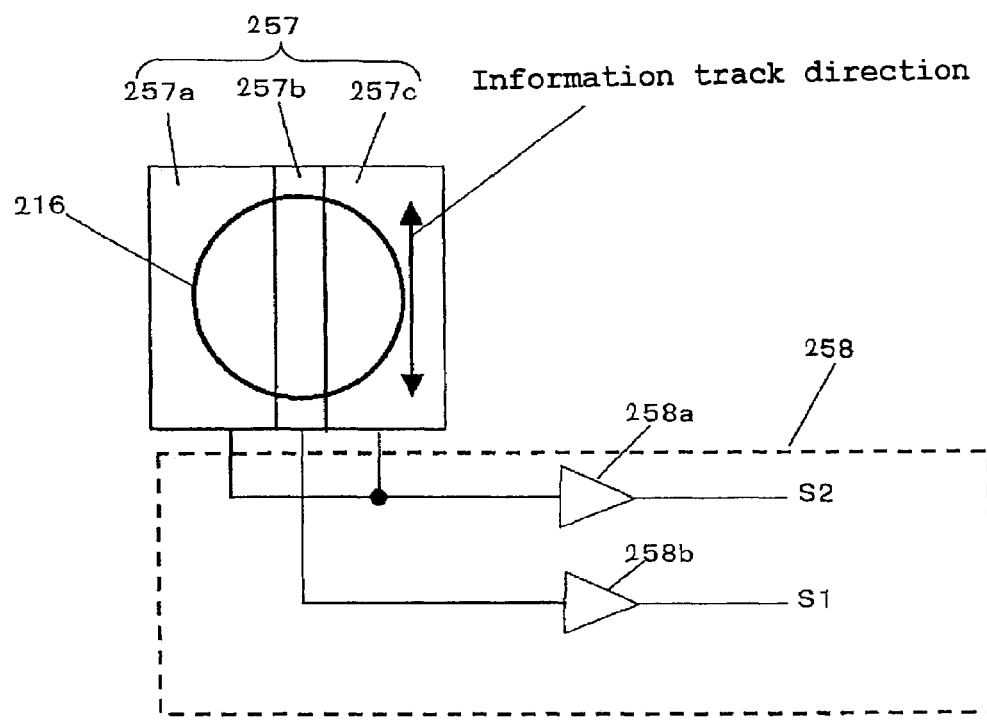
FIG. 35 is a diagram illustrating light receiving means and a signal calculating section according to Embodiment 11 of the present invention.

FIG. 35 is a diagram illustrating the light receiving means 257 and the signal calculating section 258. Reference numeral 256 denotes the shape of an incident beam, and reference numerals 257*a* to 257*c* denote light receiving areas of the light receiving means 257. Reference numerals 258*a* and 258*b* denote amplifiers, and reference characters S1 and S2 denote signals output by the signal calculating section 258. The light receiving area of the light receiving means 257 is divided into three areas: a light receiving area 257*b* as a first area which is longer in the direction parallel with the information tracks and which is located in a central portion of a beam, and light receiving areas 257*a* and 257*c* as second areas which are the areas of the light receiving section 257 other than the first area. After received light signals have been added together through the wire connection, the amplifiers 258*a* and 258*b* output signals S1 and S2. The signal S1 is composed of a received light signal corresponding to the first area. The signal S2 is composed of a received light signal corresponding to the second area.

Figure 36:
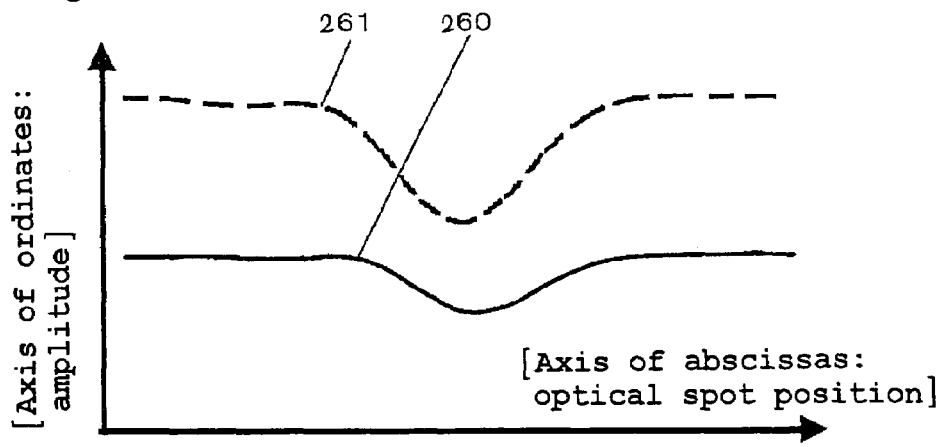
FIG. 36 is a diagram illustrating a signal detecting method according to Embodiment 11 of the present invention.

FIG. 36 is a diagram showing the waveforms of signals detected when the optical spot passes over the pits and if the optical disk is tilted in its tangent direction (such a tilt in the optical disk that a normal of the optical disk is contained in a plane containing the optical axis of the objective lens and the tangent of the information tracks). Reference numeral 260 denotes the waveform of the signal S1, and reference numeral 261 denotes the waveform of the signal S2. A trough of waveform of the signal S1 deviates from a trough of waveform of the signal S2. This phase shift is due to coma aberration caused by a tilt in the optical disk. The distribution of light intensity of a beam detected on the basis of a tangential tilt in the optical disk is asymmetric as described in FIG. 21 when the optical spot passes over the pits. This asymmetric distribution extends parallel with the information tracks.

The first and second areas in this embodiment are longer in the direction parallel with the information tracks and thus contain different amounts of asymmetric light intensity distribution. Consequently, a phase difference occurs between the signals S1 and S2. Further, when the optical disk is tilted in the opposite direction, the direction of a phase shift in the signal is reversed, as in the embodiments described previously. Therefore, the optical disk tilt detecting means 259 can detect a tilt in the optical disk by detecting a phase difference between the signals S1 and S2.

Figure 37:
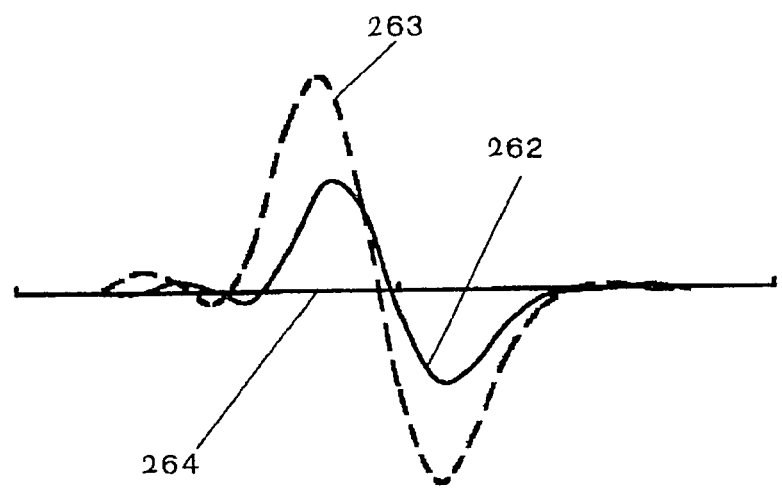
FIG. 37 is a diagram illustrating the signal detecting method according to Embodiment 11 of the present invention.

FIG. 37 is a diagram illustrating an example of a method of detecting a phase difference between the signals S1 and S2. A waveform 262 is the differential waveform of the signal S1. A waveform 263 is the differential waveform of the signal S2. Reference numeral 264 denotes the reference voltage. The waveforms 262 and 263 vary substantially symmetrically with respect to the reference voltage 264 in a positive and negative directions. Thus, by measuring a signal value of the waveform 262 when the waveform 263 crosses the reference voltage 264, a signal is obtained which varies in the positive and negative directions depending on the direction of a phase difference between the two differential waveforms. The phase difference between the differential waveforms corresponds to the phase difference between the signals S1 and S2. Thus, an optical disk tilt detection signal is obtained.

As described above, according to this embodiment, a tangential tilt in an optical disk having pits formed therein can be detected by comparing the phase of a detection signal corresponding to the first area with the phase of a detection signal corresponding to the second area when the optical spot passes over the pits.

In this embodiment, the information tracks are formed of pits. However, the optical disk may be formed of contiguous grooves and pits. That is, all or some of the information tracks may be formed of pits.

Moreover, a tilt in the optical disk can be detected in all directions without any external exclusive optical disk tilt detector by combining together detection of a radial tilt in the optical disk carried out by the optical heads shown in Embodiments 6 to 8 of the present invention and detection of a tangential tilt in the optical disk carried out by the optical head shown in Embodiment 11.

Further, the present invention is not limited to the configurations of the embodiments described previously. The present invention is easily applicable to any optical head in which the light receiving means of detecting a tracking error signal can be easily constructed to receive light in the first and second areas shaped as described previously.

In Embodiments 1 to 5, the objective lens 4 corresponds to condensing means according to the present invention. The light receiving means 8, 30, 47, and 54 correspond to light receiving means according to the present invention. The tracking error signal detecting means 9, 55 and 58 correspond to tracking error detecting means according to the present invention. The optical means 6 and 6' correspond to attenuating means according to the present invention.

Further, the optical function area 11 of the optical means 6 corresponds to a light extinction area according to the present invention, whereas the other part corresponds to a non-light-extinction area. The optical means 6' corresponds to branching means according to the present invention. Further, the light receiving elements 34 to 37 of the light receiving means 30 correspond to a part corresponding to a first sub-light-receiving-area of a light receiving element according to the present invention. Furthermore, the light receiving elements 34 to 37 correspond to a part receiving subbeams according to the present invention. Moreover, the light receiving elements 31 and 33 correspond to a part corresponding to a second sub-light-receiving-area of the light receiving element according to the present invention. Further, the light receiving elements 31 and 33 correspond to apart receiving a main beam according to the present invention.

Furthermore, in the light receiving means 47, the four-piece light receiving element 49 corresponds to a part of the light receiving element which receives the main beam according to the present invention. The three-piece light receiving elements 48 and 50 correspond to a part of the light receiving element which receives the subbeams according to the present invention. Moreover, the light receiving areas 48b and 50b correspond to the first sub-light-receiving-area, whereas the light receiving areas 48a, 48c, 50a, and 50c correspond to the second sub-light-receiving-area according to the present invention.

Further, in the light receiving means 54, the light receiving elements 72, 73a, 81a, 81b, 82a, 82b, 83a, and 83b correspond to a part of the light receiving element which corresponds to the first sub-light-receiving-area according to the present invention. Furthermore, the light receiving elements 70, 73b, 73c, 80a, 80b, 83c, 83d, 83e, and 83f correspond to a part of the light receiving element which corresponds to the second sub-light-receiving-area according to the present invention.

Moreover, the zigzag marks 107 and 108 correspond to a pair of marks according to the present invention.

Figure 41:
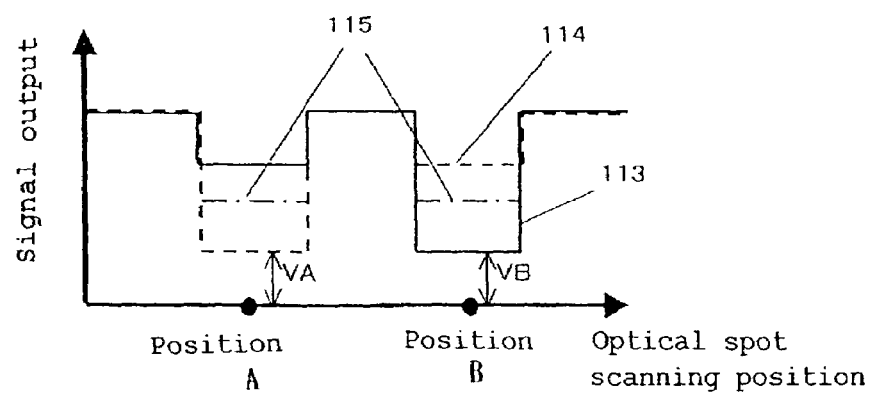
FIG. 41 is a diagram illustrating a conventional technique.
Figure 42:
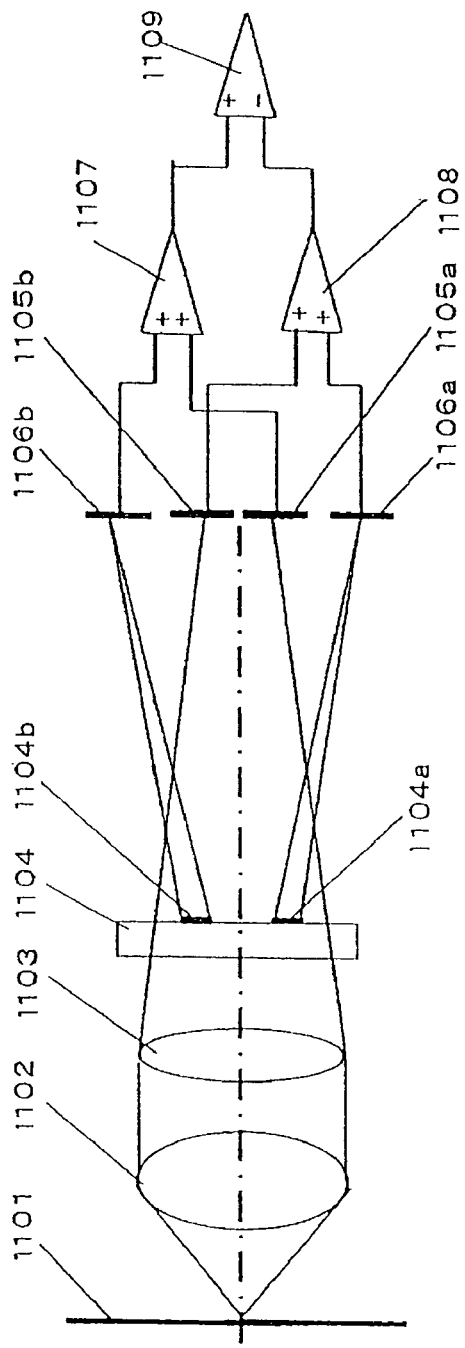
FIG. 42 is a diagram showing a configuration of conventional optical head.
Figure 43:
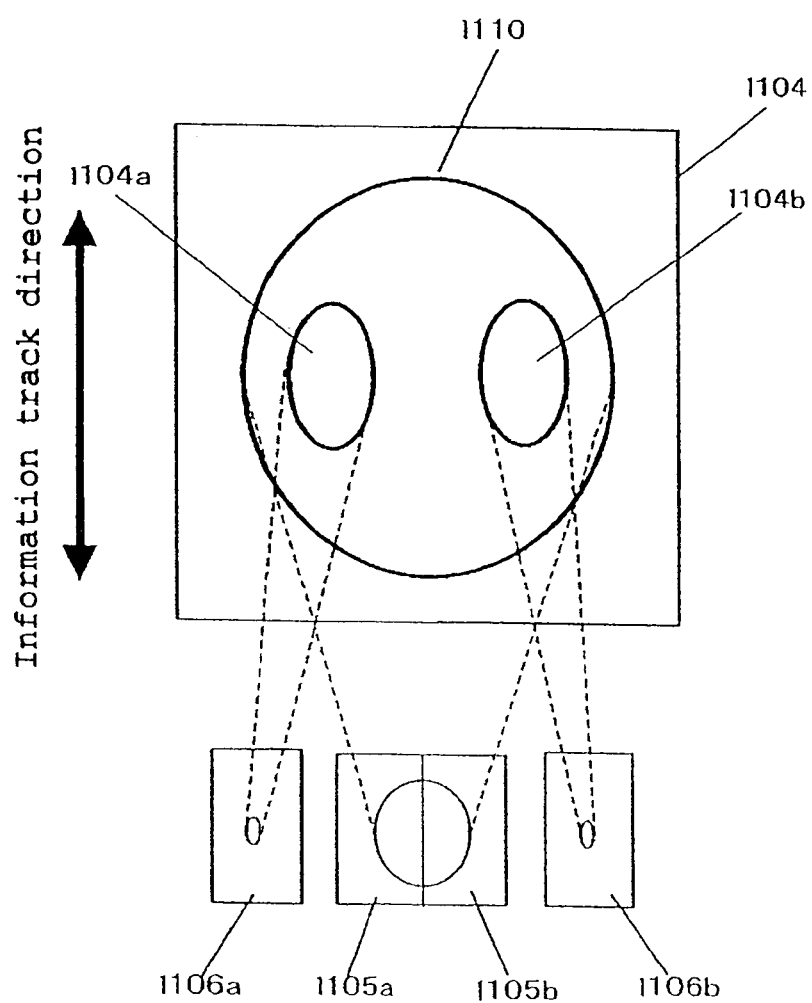
FIG. 43 is a diagram illustrating a conventional technique.
Figure 44:
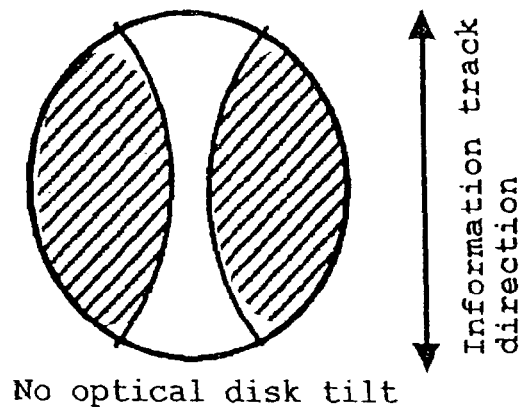
FIG. 44($a$) is a diagram illustrating a conventional technique.
Figure 44:
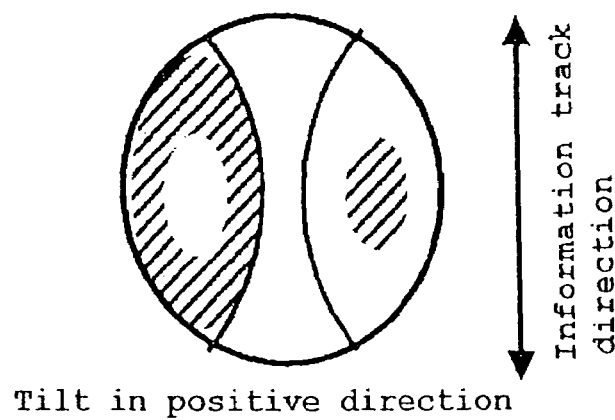
Figure 44:
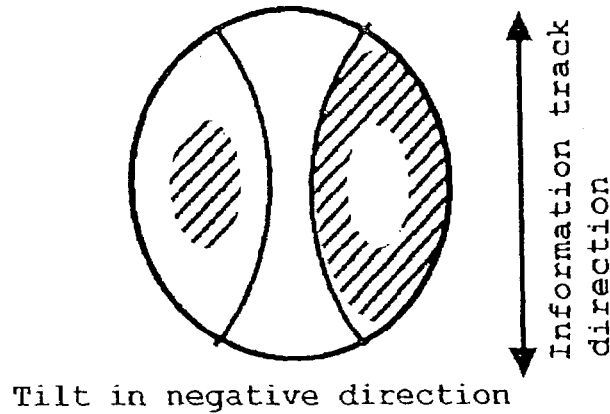

Further, the signal S sampled and held at the position A shown in FIG. 41 corresponds to the received light signal obtained from a reflected beam from one of the pair of marks and used by the tracking error signal detecting means according to the tenth aspect of the present invention. The signal S sampled and held at the position B shown in FIG. 41 corresponds to the received light signal obtained from a reflected beam from the other of the pair of marks and used by the tracking error signal detecting means according to the tenth aspect of the present invention.

Furthermore, in the light receiving means 54, a first sub-received-light signal according to the present invention corresponds to received light signals received by the light receiving elements 56a and 56b, received light signals received by the light receiving elements 80a, 81a, and 82a, and received light signals received by the light receiving elements 83a, 83c, and 83e. A second sub-received-light signal according to the present invention corresponds to received light signals received by the light receiving elements 56c and 56d, received light signals received by the light receiving elements 80b, 81b, and 82b, and received light signals received by the light receiving elements 83b, 83d, and 83f.

Moreover, in Embodiments 6 to 11, the objective lens 204 corresponds to condensing means according to the present invention. The light receiving means 208, 237, and 257 correspond to light receiving means according to the present invention. The tracking error signal detecting means 211 and 211' correspond to tracking error detecting means according to the present invention. Optical disk tilt detecting means 212 and 259 correspond to optical disk tilt detecting means according to the present invention.

Further, in the light receiving means 208, the light receiving areas 208f and 208e correspond to first sub-light-receiving-area according to the present invention. The light receiving areas 208a, 208b, 208c, and 208d correspond to second sub-light-receiving-area according to the present invention.

Furthermore, in the light receiving means 237, the light receiving areas 239b and 241b correspond to the first sub-light-receiving-area according to the present invention. The light receiving areas 239a, 239c, 241a, and 241c correspond to the second sub-light-receiving-area according to the present invention.

Moreover, in the light receiving means 257, the light receiving area 257b corresponds to the first sub-light-receiving-area according to the present invention. T-he light receiving areas 257a and 257c correspond to the second sub-light-receiving-area according to the present invention.

Further, in the light receiving means 237 and 257, the three-piece light receiving elements 239 and 241 correspond to a part of the light receiving means which receives two subbeams according to the present invention. The four-piece light receiving element 240 corresponds to a part of the light receiving means which receives at least two subbeams according to the present invention.

Furthermore, the set of sample pits 222 and 223 are an example of a pair of marks according to the present invention.

Moreover, in Embodiment 7, the detection signal sampled and held upon passage over the sample pit 222 is an example of the received light signal obtained from a reflected beam from one of the pair of marks according to the 21st aspect of the present invention. The detection signal sampled and held upon passage over the sample pit 223 is an example of the received light signal obtained from a reflected beam from the other of the pair of marks according to the 21st aspect of the present invention.

Further, the signals 208a', 208e', and 208d' are an example of a first sub-received-light signal according to the present invention. The signals 208b', 208f', and 208c' are an example of a second sub-received-light signal according to the present invention.

Furthermore, the tracking control signal generating means 253 is an example of the tracking control signal generating means according to the present invention. The tracking control means 234 is an example of tracking control means according to the present invention.

Moreover, the present invention may be implemented as an optical disk recording apparatus comprising an optical head according to the present invention to record information on an optical disk.

Further, the present invention may be implemented as an optical disk reproducing apparatus comprising an optical head according to the present invention to reproduce information from an optical disk.

Furthermore, the present invention may be implemented as an optical disk recording and reproducing apparatus comprising an optical head according to the present invention to record and reproduce information on and from an optical disk.

Furthermore, the optical disk according to the present invention is not limited in terms of its configuration or format as long as information can be optically recorded therein or reproduced therefrom. The optical disk according to the present invention may be, for example, a CD, a CD-R, a CD-RW, a DVD, a DVD-R, a DVD-RW, or a DVD-ROM.

INDUSTRIAL APPLICABILITY

As described above, the present invention provides an optical head which suppresses a phase shift in a tracking error signal conventionally caused by a tilt in an optical disk and which can provide tracking control with drastically increased accuracy.

According to the present invention, a radial or tangential tilt in the optical disk can be accurately detected without any exclusive optical disk tilt detector, while minimizing the adverse effects of movement of the position of an objective lens. Further, regardless of differences in shape between optical disks, a tilt can still be accurately and safely detected.

The invention claimed is:

1. An optical head that records information on an optical disk and/or reproduces information recorded thereon, comprising:

condensing means of condensing light on said optical disk to generate an optical spot;

light receiving means of receiving a beam reflected by said optical disk;

tracking error signal detecting means of detecting positional deviation of said optical spot from said information track on the basis of a signal detected by said light receiving means; and optical disk tilt detecting means of detecting a tilt in said optical disk relative to an optical axis of said condensing means on the basis of said tracking error signals, wherein said light receiving means has a plurality of light receiving areas that separate light upon reception so that a first sub-light-receiving-area receives a central area of said reflected beam, while a second sub-light-receiving-area receives a peripheral area of said reflected beam, said first sub-light-receiving-area is an almost rectangle having long sides equivalent to or longer than the diameter of a beam incident on said light receiving means and short sides shorter than the diameter of the beam incident on said light receiving means, the long sides extending in a direction perpendicular to the information tracks, said tracking error signal detecting means detects a first sub-tracking-error-signal in a received light signal obtained from said first sub-light-receiving-area and a second sub-tracking-error-signal in a received light signal obtained from said second sub-light-receiving-area, and said optical disk tilt detecting means compares said first sub-tracking-error-signal with said second sub-tracking-error-signal to detect a phase difference in signal waveform which may occur when said optical spot crosses said information track which phase difference indicates a tilt of a normal of the optical disk in a plane containing an optical axis of the condensing means, which plane is normal to a tangent of the information track of the optical disk.

2. The optical head according to claim 1, wherein said light receiving means is divided into two parts by at least an axis parallel with extensions of tracks in said optical disk, and said tracking error signal detecting means detects said first and second sub-tracking-error-signals on the basis of a difference between a first sub-received-light signal obtained from said tracking error signal detecting beam received by one of the two pieces into which said light receiving means is divided and a second sub-received-light signal obtained from said tracking error signal detecting beam received by the other of the two pieces into which said light receiving means is divided.

3. The optical head according to claim 2, wherein said optical disk comprises:

information tracks having guide grooves and on which information is recorded; and at least a pair of marks formed between pieces of said guide groove of each of said information tracks into which said guide groove is intermittently partially divided, the marks being arranged at predetermined distances in a tangential direction of said information tracks and at the same distance in opposite directions perpendicular to said information tracks; and said tracking error signal detecting means detects said first and second sub-tracking-error-signals on the basis of a difference between said first sub-received-light signal obtained from one reflected beam from one of said pair of marks and said second sub-received-light signal obtained from another reflected beam from the other of said pair of marks, and an offset in said tracking error signal is detected using said first sub-received-light signal, said second sub-received-light signal, said first sub-tracking-error-signal, and said second sub-tracking-error-signal.

4. The optical head according to claim 2, wherein said optical disk comprises:

information tracks having guide grooves and in which information is recorded; and a mirror surface portion formed by intermittently partially cutting said guide grooves of said information track; and said tracking error signal detecting means detects said first and second sub-tracking-error-signals on the basis of a difference between said first sub-received-light signal obtained from the reflected beam from a reflected beam from a part of said information track and said second sub-received-light signal obtained from the reflected beam from the remaining part of said information track, and an offset in said tracking error signal is detected on the basis of a difference between said first sub-received-light signal obtained from the reflected beam from the part of said mirror surface portion and said second sub-received-light signal obtained from the reflected beam from the remaining part of said mirror surface portion.

5. The optical head according to claim 1, further comprising tracking control means of carrying out tracking control using said second sub-tracking-error signal or a signal obtained by adding said first and second sub-tracking-error signals together, wherein said optical disk tilt detecting means compares the phases of said first and second sub-tracking-error signals with each other by measuring said first sub-tracking-error signal value while said tracking control means is performing a tracking control operation.

6. An optical head that records information on an optical disk having pits formed in all or some information tracks therein and/or reproduces information written therein, comprising:

condensing means of condensing light on said optical disk;

light receiving means of receiving a beam reflected by said optical disk to obtain a received light signal; and optical disk tilt detecting means of detecting a tilt in said optical disk relative to an optical axis of said condensing means on the basis of said received light signal, wherein said light receiving means has a light receiving element divided into a first sub-light-receiving-area that receives a central area of said reflected beam and a second sub-light-receiving-area that receives the remaining area of said reflected beam, said first sub-light-receiving-area is an almost rectangle having long sides equivalent to or longer than the diameter of a beam incident on said light receiving means and short sides shorter than the diameter of the beam incident on said light receiving means, the long sides extending in a direction parallel to the information tracks, and said optical disk tilt detecting means compares the received light signal obtained from said first sub-light-receiving-area with the received light signal obtained from said second sub-light-receiving-area to detect a phase difference between signal waveforms modulated when an optical spot passes over said pits which phase difference indicates a tilt of a normal of the optical disk in a plane containing an optical axis of the condensing means, which plane is parallel to a tangent of the information track of the optical disk.

7. An optical head that records information on an optical disk and/or reproduces information recorded thereon, comprising:

condensing means of condensing light on said optical disk to generate an optical spot;

light receiving means of receiving a beam reflected by said optical disk;

tracking error signal detecting means of detecting positional deviation of said optical spot from said information track on the basis of a signal detected by said light receiving means; and optical disk tilt detecting means of detecting a tilt in said optical disk relative to an optical axis of said condensing means on the basis of said tracking error signals, wherein said light receiving means has a plurality of light receiving areas that separate light upon reception so that a first sub-light-receiving-area receives a central area of said reflected beam, while a second sub-light-receiving-area receives a peripheral area of said reflected beam, said first sub-light-receiving-area is an almost rectangle having long sides equivalent to or longer than the diameter of a beam incident on said light receiving means and short sides shorter than the diameter of the beam incident on said light receiving means, the long sides extending in a direction perpendicular to the information tracks, said tracking error signal detecting means computes a first sub-tracking-error-signal by comparing signals representing intensities of light detected in said first sub-light-receiving-area and computes a second sub-tracking-error-signal by comparing signals representing intensities of light detected in said second sub-light-receiving-area, and said optical disk tilt detecting means compares said first sub-tracking-error-signal with said second sub-tracking-error-signal to detect a phase difference in signal waveform which may occur when said optical spot crosses said information track, thereby detecting a tilt in the optical disk.

* * * * *